(12) United States Patent
Shiraki

(10) Patent No.: US 9,174,622 B2
(45) Date of Patent: Nov. 3, 2015

(54) PARKING BRAKE SYSTEM

(75) Inventor: Takahiro Shiraki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 978 days.

(21) Appl. No.: 12/675,857

(22) PCT Filed: Sep. 30, 2008

(86) PCT No.: PCT/JP2008/068137
§ 371 (c)(1),
(2), (4) Date: Mar. 1, 2010

(87) PCT Pub. No.: WO2009/044908
PCT Pub. Date: Apr. 9, 2009

(65) Prior Publication Data
US 2010/0206677 A1  Aug. 19, 2010

(30) Foreign Application Priority Data

Oct. 4, 2007  (JP) ................. 2007-260734
Oct. 22, 2007 (JP) ................. 2007-273994

(51) Int. Cl.
*F16D 51/00* (2006.01)
*B60T 13/74* (2006.01)
(Continued)

(52) U.S. Cl.
CPC ............. *B60T 13/746* (2013.01); *B60T 13/741* (2013.01); *F16D 2121/24* (2013.01); *F16D 2125/30* (2013.01); *F16D 2125/32* (2013.01); *F16D 2125/34* (2013.01); *F16D 2125/40* (2013.01);
(Continued)

(58) Field of Classification Search
USPC .................. 188/162, 158, 325–343
See application file for complete search history.

(56) References Cited

U.S. PATENT DOCUMENTS 3,380,559 A * 4/1968 McElwrath et al. .......... 188/326
4,603,763 A 8/1986 Mikina
(Continued)

FOREIGN PATENT DOCUMENTS

GB  1 187 767  4/1970
JP  10 103391  4/1998
(Continued)

OTHER PUBLICATIONS

Abstract and maching translation of JP2003184916A.*
(Continued)

*Primary Examiner* — Robert A Siconolfi
*Assistant Examiner* — Mahbubur Rashid
(74) *Attorney, Agent, or Firm* — Oblon, McClelland, Maier & Neustadt, L.L.P.

(57) ABSTRACT

A vehicle parking brake system for a vehicle including: a non-rotary body; a rotary drum; brake shoes; an anchor member disposed between anchor-member-side end portions of the respective brake shoes; a transmitting member interconnecting transmitting-member-side end portions of the respective brake shoes; and a parking-brake operating apparatus configured to predict a torque application direction in which a torque is to be applied to the wheel during stop of the vehicle, and to press the brake shoes against an inner circumferential surface of the rotary drum, by moving a primary one of the brake shoes that serves as a primary shoe upon application of the torque to the wheel, in a direction away from the anchor member, without moving a secondary one of the brake shoes that serves as a secondary shoe upon application of the torque to the wheel.

12 Claims, 27 Drawing Sheets

(51) Int. Cl.
  *F16D 121/24* (2012.01)
  *F16D 125/30* (2012.01)
  *F16D 125/32* (2012.01)
  *F16D 125/34* (2012.01)
  *F16D 125/40* (2012.01)
  *F16D 125/42* (2012.01)
  *F16D 125/52* (2012.01)
  *F16D 127/06* (2012.01)

(52) U.S. Cl.
  CPC ......... *F16D 2125/42* (2013.01); *F16D 2125/52* (2013.01); *F16D 2127/06* (2013.01)

(56) References Cited

U.S. PATENT DOCUMENTS

| | | | | |
|---|---|---|---|---|
| 4,629,043 | A * | 12/1986 | Matsuo et al. | 477/184 |
| 4,792,023 | A * | 12/1988 | Morimoto et al. | 188/353 |
| 5,979,613 | A * | 11/1999 | Towers et al. | 188/181 T |
| 6,497,310 | B2 * | 12/2002 | Murayama et al. | 188/325 |
| 2002/0014378 | A1 * | 2/2002 | Ikeda | 188/79.51 |

FOREIGN PATENT DOCUMENTS

| | | | |
|---|---|---|---|
| JP | 10 110758 | | 4/1998 |
| JP | 2001 82517 | | 3/2001 |
| JP | 2001 165207 | | 6/2001 |
| JP | 2002-21890 | | 1/2002 |
| JP | 2003184916 A | * | 7/2003 |
| JP | 2006 336868 | | 12/2006 |
| WO | 99 37935 | | 7/1999 |

OTHER PUBLICATIONS

Unofficial machine translation of JP 2006-336868.*
Japanese Office Action issued Nov. 15, 2011, in Patent Application No. 2007-260734 (with English-language translation).

* cited by examiner

FORWARD ROTATION
DIRECTION P

REVERSE ROTATION
DIRECTION Q

FORWARD ROTATION
DIRECTION P

REVERSE ROTATION
DIRECTION Q

FORWARD ROTATION
DIRECTION P

REVERSE ROTATION
DIRECTION Q

PARKING BRAKE SYSTEM

TECHNICAL FIELD

The present invention relates in general to a parking brake system including a drum brake.

BACKGROUND ART

JP-H10-110758A, JP-2001-165207A and JP-H10-103391A disclose duo-servo parking brakes in each of which, when a cable is pulled, a pair of brake shoes are moved through a brake lever and a strut so as to be pressed against a rotary drum whereby the parking brake is brought into effect. JP-2001-82517A discloses an electrically-operated parking brake system having a duo-servo drum brake. This parking brake system includes a pressing device having (a) an electric motor, (b) a pair of sliding members, (c) a motion converting mechanism disposed between the electric motor and the sliding members, and configured to convert a rotary motion which is to be given from the electric motor, into linear motions which are directed in respective opposite directions and which are to be given to the respective sliding members, and (d) a motor controlling portion configured to activate the electric motor in response to a command requesting operation of the brake, so as to move the sliding members in respective opposite directions and accordingly apply pressing forces to respective brake shoes, for thereby causing the brake to come into effect. JP-2006-336868A also discloses an electrically-operated parking brake system having a duo-servo drum brake. This parking brake system includes a pressing device having (a) an electric motor, (b) an eccentric cam, (c) a pair of sliding members engaged with an outer circumferential surface of the eccentric cam, and (d) a motor controlling portion configured to activate the electric motor in response to a command requesting operation of the brake, so as to rotate the eccentric cam, move the sliding members in respective opposite directions and accordingly apply pressing forces to respective brake shoes, for thereby causing the brake to come into effect.

JP-H10-110758A discloses a parking drum brake including (a) a non-rotary body, (b) a rotary drum rotatable together with a vehicle wheel, and having an inner circumferential surface that serves as a friction surface, (c) a pair of brake shoes disposed on an inner peripheral side of said rotary drum, and having respective outer circumferential surfaces on each of which a friction material member is disposed, (d) an anchor fixed to the non-rotary body and disposed between anchor-side end portions of the respective brake shoes, (e) a brake lever pivotably connected at its anchor-side end portion to one of the brake shoes through a pin, (f) a cable configured to pull another end portion of the brake lever (which portion is remote from the anchor), (g) an intermediate lever pivotably connected at its intermediate portion to the other of the brake shoes, (h) a strut disposed between the anchor-side end portions of the brake lever and the intermediate lever, and (i) an adjuster disposed between another end portion of the above-described one of the brake shoes (which portion is remote from the anchor) and end portions of the above-described other of the brake shoes and the intermediate lever (which portions are remote from the anchor), wherein a distance between a pivot center of the intermediate lever and the strut is larger than a distance between the pivot center of the intermediate lever and the adjuster.

In this parking drum brake disclosed in JP-H10-110758A, when the cable is pulled, the brake lever is pivoted about the pin whereby the intermediate lever is pivoted through the strut. The pivot motion of the intermediate lever is transmitted to the above-described one of the brake shoes via the adjuster, whereby the one of the brake shoes is pressed against the rotary drum. Meanwhile, the above-described other of the brake shoes is pressed against the rotary drum by a force applied to the intermediate lever via the strut. In this instance, as a result of the pivot motion of the intermediate lever, a gap is formed between the adjuster and the other of the brake shoes. In this state in which the parking brake is being in effect, upon application of a torque causing the one of the brake shoes to be separated from the anchor, the one of the brake shoes and the brake lever are moved in a circumferential direction that reduces the above-described gap, whereby the intermediate lever is pivoted through the adjuster in an opposite direction (that is opposite to a direction in which the intermediate lever is pivoted when the cable is pulled). As a result of the pivot motion of the intermediate lever in the opposite direction, the brake lever is returned through the strut. Since the distance between the pivot center of the intermediate lever and the strut is larger than the distance between the pivot center of the intermediate lever and the adjuster, the strut causes the brake lever to be moved in an opposite direction opposite to a direction in which the brake lever is forced due to the applied torque. Consequently, a path of the cable engaged with the brake lever is increased whereby the cable is restrained from being slackened. Upon application of a torque causing the other of the brake shoes to be separated from the anchor, the other of the brake shoes is moved in a circumferential direction and the intermediate lever is pivoted, whereby the one of the brake shoes and the brake lever are moved through the adjuster in a direction toward the anchor. Consequently, the cable is avoided from being slackened.

JP-H10-103391A discloses a parking drum brake including (a) a non-rotary body, (b) a rotary drum rotatable together with a vehicle wheel, and having an inner circumferential surface that serves as a friction surface, (c) a pair of brake shoes disposed on an inner peripheral side of said rotary drum, and having respective outer circumferential surfaces on each of which a friction material member is disposed, (d) an anchor fixed to the non-rotary body and disposed between anchor-side end portions of the respective brake shoes, (e) a brake lever pivotably connected at its anchor-side end portion to one of the brake shoes through a pin, (f) a cable configured to pull another end portion of the brake lever (which portion is remote from the anchor), and (j) a strut disposed between the anchor-side end portion of the brake lever and an anchor-side end portion of the other of the brake shoes, wherein a first connection point P1 at which the strut and the brake lever are connected to each other lies on a line connecting a center O of the drum brake and a second connection point P2 at which the brake lever and the above-described one of the brake shoes are connected to each other, or lies on an anchor-side one of opposite sides of the above-described line, which one is close to the above-described other of the brake shoes.

In this parking drum brake disclosed in JP-H10-103391A, when the cable is pulled, the connection point P2 is moved along an arc about the center O, whereby the connection point P1 is moved in a radially outward direction, and the above-described other of the brake shoes is forced toward the anchor. Thus, when the pair of brake shoes are pressed against the drum, the above-described one of the brake shoes is separated from the anchor while the other of the brake shoes is not separated from the anchor. In this state in which the parking brake is being in effect, even upon application of a torque causing the one of the brake shoes to be separated from the anchor, it is possible to avoid reduction of a braking force, since the other of the brake shoes is held in contact with the anchor. Upon application of a torque causing the other of the brake shoes to be separated from the anchor, the one of the brake shoes is moved in a circumferential direction so as to be brought into contact with the anchor. In this instance, a path of the cable is increased whereby the cable is avoided from being slackened.

Further, in this parking drum brake disclosed in JP-H10-103391A, a return spring disposed between the anchor and the above-described other of the brake shoes is arranged to generate an elastic force larger than an elastic force generated by a return spring disposed between the anchor and the above-described one of the brake shoes. Owing to this arrangement, the other of the brake shoes can be made difficult to be separated from the anchor when the brake shoes are pressed against the drum.

JP-2001-165207A discloses a parking drum brake including (a) a non-rotary body, (b) a rotary drum rotatable together with a vehicle wheel, and having an inner circumferential surface that serves as a friction surface, (c) a pair of brake shoes disposed on an inner peripheral side of said rotary drum, and having respective outer circumferential surfaces on each of which a friction material member is disposed, (d) an anchor fixed to the non-rotary body and disposed between anchor-side end portions of the respective brake shoes, (m) a pair of intermediate levers each of which is pivotably connected at its intermediate portion to a corresponding one of the brake shoes, (n) a brake lever pivotably connected to an anchor-side end portion of one of the intermediate levers so as to be pivotable about a pin, (o) a cable for applying a tensile force to an end portion of the brake lever (which portion is remote from the anchor), (p) an adjuster disposed between end portions of the respective brake shoes (which portions are remote from the anchor) and between end portions of the respective intermediate levers (which portions are remote from the anchor), (q) a strut disposed between the other of the intermediate levers and each of the one of the intermediate levers and the brake lever, (r) a first return spring disposed between anchor-side end portions of the respective brake shoes, and (s) a second return spring disposed between adjuster-side end portions of the respective brake shoes, wherein a moment ($F_1 \times L_1$) dependent on an elastic force $F_1$ of the first return spring and a distance $L_1$ between a pivot center of each intermediate lever and the first return spring is larger than a moment ($F_2 \times L_2$) dependent on an elastic force $F_2$ of the second return spring and a distance $L_2$ between the pivot center of each intermediate lever and the second return spring.

In this parking drum brake disclosed in JP-2001-165207A, when the tensile force is applied to the cable, the pair of intermediate levers are pivoted about the adjuster so as to be spread or moved away from each other, whereby the pair of brake shoes are pressed against the drum. In this instance, since the moment dependent on the elastic force of the first return spring is larger than the moment dependent on the elastic force of the second return spring, the brake shoes are brought into contact at their anchor-side end portions with the anchor, while being separated at their adjuster-side end portions from the adjuster. In this state in which the parking drum brake is being in effect, upon application of a torque causing one of the brake shoes (to which the above-described other of the intermediate levers is connected) to be separated from the anchor, this one of the brake shoes is moved in a circumferential direction so as to be brought into contact with the adjuster, whereby the above-described one of the intermediate levers is pivoted, and the brake lever is pivoted about the strut serving as a fulcrum so as to be moved in a radially outward direction. Further, the brake lever is moved in the radially outward direction also when the one of the intermediate lever is forced in a circumferential direction by the adjuster. The movement of the brake lever in the radially outward direction leads to increase of a path of the cable, thereby preventing the cable from being slackened. Upon application of a torque causing the other of the brake shoes (to which the above-described one of the intermediate levers is connected) to be separated from the anchor, the other of the brake shoes is moved in a circumferential direction so as to be brought into contact with the adjuster, whereby the other of the intermediate levers is pivoted, and the one of the intermediate levers and the brake lever are pivoted via the strut so as to be moved in a radially outward direction. Further, the brake lever is moved in the radially outward direction by movement of the other of the brakes shoes in a circumferential direction which leads to pivot motion of the one of the intermediate lever. The movement of the brake lever in the radially outward direction leads to increase of a path of the cable, thereby preventing the cable from being slackened.

DISCLOSURE OF INVENTION

Object to be Solved by the Invention

The present invention was made in the light of the background art discussed above. It is therefore an object of the invention to provide a parking brake system that is capable of restraining reduction of a braking force upon application of a torque to a wheel of a vehicle while the vehicle is being stopped. This object may be achieved by a parking brake system according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A parking brake system for a vehicle, including:

a non-rotary body;

a rotary drum rotatable together with a wheel of the vehicle, and having an inner circumferential surface that serves as a friction surface;

a pair of brake shoes disposed on an inner peripheral side of the rotary drum, and having respective outer circumferential surfaces on each of which a friction material member is disposed;

an anchor member fixed to the non-rotary body, and disposed between anchor-member-side end portions of the respective brake shoes, each of the anchor-member-side end portions being provided by one of opposite end portions of a corresponding one of the brake shoes;

a transmitting member interconnecting transmitting-member-side end portions of the respective brake shoes, each of the transmitting-member-side end portions being provided by the other of the opposite end portions of a corresponding one of the brake shoes, the transmitting member being configured, in presence of a force applied to one of the brake shoes and acting in a direction of circumference of the non-rotary body, to transmit the force from the one of the brake shoes to the other of the brake shoes; and a parking-brake operating apparatus configured to predict a torque application direction in which a torque is to be applied to the wheel during stop of the vehicle, and to press the friction material of each of the brake shoes against the inner circumferential surface of the rotary drum, by moving a primary one of the brake shoes that serves as a primary shoe upon application of the torque to the wheel, in a direction away from the anchor member, without moving a secondary one of the brake shoes that serves as a secondary shoe upon application of the torque to the wheel.

In the parking brake system according to this mode (1), the parking-brake operating apparatus is configured to predict the torque application direction in which the torque is to be applied to the wheel after activation of an actuator (e.g., a pressing device) of the parking brake, namely, during a brake effect state in which the brake is being in effect, and to press the friction material of each of the brake shoes against the inner circumferential surface of the rotary drum, by moving the primary one of the brake shoes that serves as the primary shoe upon application of the torque to the wheel, in the direction away from the anchor member, without moving the secondary one of the brake shoes that serves as the secondary shoe upon application of the torque to the wheel, irrespective of whether the applied torque acts in a forward rotation direction or a reverse rotation direction. When the torque (whose application direction has been predicted) is actually applied to the wheel, the brake shoes are both restrained from being moved in a circumferential direction, because the secondary one of the brake shoes is already in contact with the anchor member. It is therefore possible to restrain reduction of the braking force. It is noted that the term "without moving a secondary one of the brake shoes" may be interpreted to not only encompass an arrangement in which movement of the secondary one of the brake shoes is positively restrained, but also encompass an arrangement in which movement of the secondary one of the brake shoes is neither caused nor restrained.

(2) The parking brake system according to mode (1), wherein the parking-brake operating apparatus is configured to press the friction material of the brake shoes against the inner circumferential surface of the rotary drum, by moving the primary one of the brake shoes in the direction away from the anchor member, without moving the secondary one of the brake shoes, irrespective of whether the torque application direction corresponds to a forward rotation direction or a reverse rotation direction, so that the non-rotary body, the rotary drum, the brake shoes, the anchor member, the transmitting member and the parking-brake operating apparatus cooperate with each other to constitute a duo-servo drum brake, wherein the parking-brake operating apparatus has a pressing device disposed between the anchor-member-side end portions of the respective brake shoes, and wherein the pressing device includes (a) an electric drive source, (b) a pressing mechanism having at least one acting member which is capable of acting directly on the brake shoes such that a pressing force can be applied to a selected one of the brake shoes through a corresponding one of the at least one acting member that is to be driven by the electric drive source, and (c) a pressing-force controller which is configured to make prediction of the torque application direction and to control the electric drive source based on the prediction of the torque application direction such that the pressing force is applied through the one of the at least one acting member to the primary one of the brake shoes as the selected one of the brake shoes.

In the parking brake system according to this mode (2), the above-described torque application direction is predicted, and the pressing force is applied to the above-described primary one of the brake shoes (hereinafter referred simply to as "primary shoe") as the selected one of the brake shoes. Irrespective of whether the applied torque acts in the forward rotation direction or the reverse rotation direction, one of the at least one acting member is driven by the electric drive source so as to act directly on the primary shoe, for applying the pressing force to the primary shoe. Meanwhile, the at least one acting member does not apply the pressing force to the above-described secondary one of the brake shoes (hereinafter referred simply to as "secondary shoe"). In this brake effect state (in which the pressing force is not being controlled by the electric drive source), when the torque (whose application direction has been predicted) is actually applied to the wheel, the primary and secondary shoes are both restrained from being moved in a circumferential direction, because the secondary shoe is already in contact with the anchor member. Thus, reduction of the braking force can be retrained. The pressing device described in this mode (2) is configured to apply the pressing force to the primary shoe without applying the pressing force to the secondary shoe. Such a pressing device is not disclosed by any one of the above-identified publications of Japanese Patent Applications, and is therefore novel over the prior art.

In each of the parking brake system disclosed by JP-2001-82517A and JP-2006-33686A, there is provided a pressing device in which a pressing force is applied by an electric actuator to both of the pair of brake shoes in each of these parking brake systems, it is not determined which one of the brake shoes is to be moved. Therefore, upon application of a torque to the wheel during a brake effect state, the pair of brake shoes could be rotated in a direction in which the torque acts on the wheel so that the secondary shoe could be brought into contact with one of the sliding members so as to apply a large force to the one of the sliding members. On the other hand, in the parking brake system according to this mode (2), since the secondary shoe is in contact with the anchor member, the force acting in a circumferential direction is received by the anchor member rather than by the at least one acting member. Consequently, the at least one acting member does not have to have a large strength, so that the pressing device as a whole can be made compact in size and the manufacturing cost can be reduced. Further, since it is possible to reduce frequency of application of a large force to the at least one acting member, service life of the at least one acting member can be increased.

The pressing mechanism may have either a single acting member or two acting members as the at least one acting member. Where the pressing mechanism has a single acting member, the single acting member is arranged to act on both of the pair of brake shoes. Where the pressing mechanism has two acting members, one of the two acting members is arranged to act on one of the pair of brake shoes while the other of the two acting members is arranged to act on the other of the pair of brake shoes. Further, the two acting members may be driven by the electric drive source as a drive source common to the two acting members, or may be driven by two electric drive sources, respectively, which can be activated independently of each other.

Each of the at least one acting member may be provided by any one of various members such as a rod (that may be referred to as also a sliding member or a piston), a cam and a pivotable lever. The cam and pivotable lever may be arranged to function as a motion converting mechanism. In such a case, the motion converting mechanism in the form of the cam or pivotable member may be provided together with the at least one acting member (e.g., rod or rods). The at least one acting member and motion converting mechanism may be constituted by rigid members each of which may be considered not to have flexibility unlike a cable.

The electric drive source may have an electric motor or an electrically deformable member that includes a piezoelectric element or the like. Where each of the at least one acting member is a rod or the like which is linearly movable by an electric motor of the electric drive source, it is common that a motion converting mechanism is provided to convert a rotary motion that is to be given from the electric motor, into a linear motion that is to be given to the acting member. The motion converting mechanism may be considered to serve as a drive transmission mechanism. Where the electric drive source has an electrically deformable member, it is preferable that the motion converting mechanism is provided for each one of the at least one acting member.

(3) The parking brake system according to mode (2),
wherein the electric drive source has an electric motor,
wherein the pressing mechanism has (b-1) an acting member as the at least one acting member which is capable of acting directly on the brake shoes such that the pressing force can be applied to the selected one of the brake shoes through the acting member that is to be driven by the electric drive source, and (b-2) a motion converting mechanism configured to convert a rotary motion that is to be given from the electric motor, into a linear motion that is to be given to the acting member,
and wherein the pressing-force controller has a motor controlling portion configured to control a direction of rotation of the electric motor, for thereby controlling a direction of movement of the acting member.

In the parking brake system according to this mode (3), when the electric motor is rotated in one of opposite directions, the acting member as the at least one acting member is moved toward one of the pair of brake shoes, so as to apply the pressing force to the one of the brake shoes. When the electric motor is rotated in the other of the opposite directions, the acting member is moved toward the other of the pair of brakes, so as to apply the pressing force to the other of the brake shoes. Therefore, by controlling a direction of rotation of the electric motor, it is possible to cause the acting member to apply the pressing force to a selected one of the pair of brake shoes.

(4) The parking brake system according to mode (3),
wherein the motion converting mechanism has (b-2-i) a housing, (b-2-ii) a first threaded member held by the housing such that the first threaded member is rotatable relative to the housing and is axially unmovable relative to the housing, and (b-2-iii) a second threaded member held by the housing such that the second threaded member is unrotatable relative to the housing and is axially movable relative to the housing,
wherein the first and second threaded members have respective first and second threaded portions that are held in thread engagement with each other,
and wherein the first threaded member is rotatable by the electric motor while the second threaded member provides the acting member, such that the acting member provided by the second threaded member is linearly moved when the first threaded member is rotated by the electric motor.

In the parking brake system according to this mode (4), when the first threaded member is rotated as a result of rotation of the electric motor, the second threaded member is moved in its axial direction. Then, the acting member is moved as a result of the axial movement of the second threaded member. The first threaded portion may be provided in an inner circumferential surface while the second threaded portion may be provided in an outer circumferential surface of the second threaded member, for example.

(5) The parking brake system according to mode (3),
wherein the motion converting mechanism has (b-2-i) a housing, (b-2-ii) a rack held by the housing such that the rack is linearly movable relative to the housing, and (b-2-iii) a pinion held by the housing such that the pinion is unmovable relative to the housing in a longitudinal direction of the rack,
wherein the pinion has teeth while the rack has teeth that mesh with the teeth of the pinion, and wherein the pinion is rotatable by the electric motor while the rack provides the acting member, such that the acting member provided by the rack is linearly moved when the pinion is rotated by the electric motor.

(6) The parking brake system according to mode (2),
wherein the electric drive source has an electric motor,
wherein the pressing mechanism has (b-1) a pair of acting members as the at least one acting member which are capable of acting directly on the respective brake shoes such that the pressing force can be applied to the selected one of the brake shoes through a corresponding one of the acting members that is to be driven by the electric motor, and (b-2) a motion converting mechanism including one of (b-2-i) a cam that is to be rotated by rotation of the electric motor so as to be capable of acting on the acting member and (b-2-ii) a lever that is to be pivoted by rotation of the electric motor so as to be capable of acting on the acting member,
and wherein the pressing-force controller has a motor controlling portion configured to control a direction of the rotation of the electric motor, for thereby moving a selected one of the acting members.

In the parking brake system according to this mode (6), where the cam is included in the motion converting mechanism, the pressing force is applied to one of the brake shoes that is dependent on which one of opposite directions the cam is rotated in. Specifically described, when the cam is rotated in one of the opposite directions as a result of rotation of the electric motor in one of opposite directions, one of the two acting members is moved toward one of the brake shoes so as to act on the one of the brake shoes such that the pressing force is applied to the one of the brake shoes. When the cam is rotated in the other of the opposite directions as a result of rotation of the electric motor in the other of the opposite directions, the other of the two acting members is moved toward the other of the brake shoes so as to act on the other of the brake shoes such that the pressing force is applied to the other of the brake shoes. There is a case in which the cam could be in contact with one of the two acting members while acing on the other of the two acting members. In such a case, however, the pressing force is not applied to the one of the two acting members.

Where the lever is included in the motion converting mechanism, the pressing force is applied to one of the brake shoes that is dependent on which one of opposite directions the lever is pivoted in. Specifically described, when the lever is pivoted in one of the opposite directions as a result of rotation of the electric motor in one of opposite directions, one of the two acting members is moved toward one of the brake shoes so as to act on the one of the brake shoes such that the pressing force is applied to the one of the brake shoes. When the lever is pivoted in the other of the opposite directions as a result of rotation of the electric motor in the other of the opposite directions, the other of the two acting members is moved toward the other of the brake shoes so as to act on the other of the brake shoes such that the pressing force is applied to the other of the brake shoes.

(7) The parking brake system according to mode (2),
wherein the electric drive source has an electric motor,
wherein the pressing mechanism has an acting member as the at least one acting member which is capable of acting directly on the brake shoes such that the pressing force can be applied to the selected one of the brake shoes through the acting member that is to be driven by the electric motor,
wherein the acting member is provided by one of (b-i) a cam that is to be rotated by rotation of the electric motor so as to be capable of acting on the brake shoes and (b-ii) a lever that is to be pivoted by rotation of the electric motor so as to be capable of acting on the brake shoes,
and wherein the pressing-force controller has a motor controlling portion configured to control a direction of the rotation of the electric motor, such that the pressing force is applied to the selected one of the brake shoes through the one of the cam and the lever.

In the parking brake system according to this mode (7), the acting member is provided by the cam or the lever, so that a cam surface of the cam or an engaging portion of the lever is arranged to act directly on the brake shoe. This arrangement eliminates a member serving exclusively as the acting member, it is possible to reduce the number of pieces as components of the pressing device.

(8) The parking brake system according to any one of modes (2)-(7),
wherein the electric drive source has an electric motor such that the at least one acting member can be driven by the electric motor,
and wherein the pressing device includes a maintaining mechanism that is configured, in absence of an electric current supplied to the electric motor, to maintain the pressing force which is applied to the selected one of the brake shoes and which forces the friction material member against the inner circumferential surface of the rotary drum serving as the friction surface.

(9) The parking brake system according to mode (8),
wherein the pressing mechanism has a motion converting mechanism configured to convert a rotary motion that is to be given from the electric motor, into a linear motion that is to be given to the at least one acting member,
and wherein the maintaining mechanism includes a worm that is to be rotated by the electric motor and a worm wheel which meshes with the worm and which is connected to the at least one acting member via the motion converting mechanism.

As in the parking brake system according to each of the above modes (8) and (9), it is preferable that the pressing device includes the maintaining mechanism, which is configured to maintain the pressing force applied to the brake shoe, even without an electric current supplied to the electric motor. The maintaining mechanism can be established by (i) an arrangement in which the motion converting mechanism is adapted to function also as the maintaining mechanism, (ii) an arrangement in which the electric drive source is adapted to function also as the maintaining mechanism, or (iii) an arrangement in which the maintaining mechanism is provided in addition to the motion converting mechanism and the electric drive source. Where the maintaining mechanism is provided by the electric motor of the electric drive source, the maintaining mechanism may be arranged to be either coaxial or non-coaxial with an output shaft of the electric motor.

Where the motion converting mechanism functions also as the maintaining mechanism, the motion converting mechanism may be provided by a screw mechanism having external and internal threads that are held in thread engagement with each other, such that each of the threads has a small lead angle or such that each of the threads is an acme thread. Where the electric drive source functions also as the maintaining mechanism, the electric drive source may have a speed reducer in addition to the electric motor such that the speed reducer includes a gear mechanism having non-reversible characteristics. The gear mechanism having the non-reversible characteristics may include, for example, a worm gear set, a planetary gear set or a harmonic gear set. The gear mechanism having the non-reversible characteristics may be referred to as a gear mechanism having a negative efficiency (that is defined as a ratio of an amount of force of the electric motor minimally required to inhibit rotation of the electric motor caused by an external force, to an amount of the external force) of substantially zero. It is noted that the electric motor of the electric drive source may be provided by a supersonic motor.

(10) The parking brake system according to any one of modes (2)-(9), wherein the anchor member constitutes a main body of the pressing mechanism.

Since the pressing device including the pressing mechanism is disposed in vicinity of the anchor-member-side end portions of the brake shoes, it is preferable that the main body of the pressing mechanism is fixed to the anchor member or that the main body of the pressing mechanism is constituted by the anchor member as in the parking brake system according to this mode (10). Where the main body of the pressing mechanism is constituted by the anchor member, there is no necessity of provision of a housing for exclusively accommodating the pressing device.

(11) The parking brake system according to any one of modes (2)-(10), wherein the pressing-force controller includes a parking-brake controlling portion configured to activate the electric drive source in response to a command requesting operation of the parking-brake operating apparatus.

The pressing-force controller may be configured to activate the electric drive source in response to the command requesting operation of the parking-brake operating apparatus, as in the as in the parking brake system according to this mode (11). It is common that a duo-servo drum brake is used as a parking brake.

(12) The parking brake system according to mode (1),
wherein the parking-brake operating apparatus has a pressing device which is disposed between the anchor-member-side end portions of the respective brake shoes and which is configured to press the friction material member of the brake shoes against the inner circumferential surface of the rotary drum serving as the friction surface,
and wherein the parking-brake operating apparatus further has a movement restraining device including (a) an electric drive source, (b) at least one movement restraining member which is to be driven by the electric drive source so as to be engaged with the brake shoes, for thereby restraining movement of each of the brake shoes relative to at least one of the non-rotary body and the anchor member, and (c) a movement-restraining controller which is configured to make prediction of the torque application direction and to control, prior to activation of the pressing device, the electric drive source based on the prediction of the torque application direction such that one of the at least one movement restraining member is brought into engagement with the secondary one of the brake shoes, for thereby restraining movement of the secondary one of the brake shoes in a direction away from the anchor member during the activation of the pressing device.

In a drum brake included in a parking brake system, a pressing device is activated to apply a pressing force to both of the pair of brake shoes, for thereby operating the brake.

However, when one of the brake shoes is easier to be moved than the other of the brake shoes due to some factor, only the one of the brake shoes is moved while the other of the brake shoes is not moved. In this state, if a torque is applied to the wheel in a direction that causes the other of the brake shoes to be separated from the anchor member, the other of the brake shoes is separated from the anchor member to be moved in a circumferential direction, and a force of dragging of the other of the brake shoes is transmitted to the one of the brake shoes via the transmitting member whereby the one of the brake shoes is brought into contact with the anchor member. Thus, when the pair of brake shoes are moved in a circumferential direction in the state in which a working state of the pressing device is held, there is a case where the brake force is reduced depending on construction of the pressing device. On the other hand, in the parking brake system according to this mode (12), the torque application direction (in which the torque is to be applied to the wheel during stop of the vehicle) is predicted, and one of the at least one movement restraining member is brought into engagement with the secondary shoe prior to activation of the pressing device, for thereby restraining movement of the secondary shoe in a direction away from the anchor member during the activation of the pressing device. In this arrangement, the secondary shoe is brought into engagement with the secondary shoe, irrespective of whether the applied torque acts in a forward rotation direction or a reverse rotation direction. Therefore, upon application of the pressing force to both of the pair of brake shoes, the primary shoe is necessarily easier to be moved than the secondary shoe. Consequently, the primary shoe is necessarily moved by activation of the pressing device, and the force acting in a circumferential direction is transmitted to the secondary shoe via the transmitting member, whereby the secondary shoe is forced against the anchor member. In this state in which the secondary shoe is already in contact with the anchor member, even when the torque is applied to the wheel in the predicted torque application direction, the pair of brake shoes are restrained from being moved in the circumferential direction so that reduction of the braking force can be retrained.

As is apparent from the above description, in the parking brake system according the invention, the reduction of the braking force is restrained owing to a technique different from that disclosed in the above-identified publications of Japanese Patent Applications. While the movement of the secondary shoe in the direction away from the anchor member is restrained owing to the engagement of the secondary shoe with the movement restraining member, it is preferable to provide an arrangement for allowing movement of the secondary shoe in a direction toward the anchor member by the circumferential force transmitted thereto from the primary shoe via the transmitting member. In this preferable arrangement, while the secondary shoe is engaged with the movement restraining member, the secondary shoe is satisfactorily allowed to be moved toward the anchor member even upon application of the torque to the wheel.

The pressing device may be activated by activation of an electric motor. For example, it is possible to employ an arrangement in which a brake lever is moved when a cable is pulled by activation of the electric motor such that the pair of brake shoes are pressed against the rotary drum by cooperation of the brake lever and a strut. In this arrangement, it is preferable to employ a maintaining mechanism, as described in mode (20), which is configured, even in absence of an electric current supplied to the electric motor, to maintain the pressing force which is applied to the selected one of the brake shoes and which forces the friction material member against the inner circumferential surface of the rotary drum serving as the friction surface.

A command requesting initiation of activation of the pressing device may be issued either before or after issue of a command requesting initiation of activation of the movement restraining device, as long as the movement restraining member is in engagement with the secondary shoe upon actual initiation of the activation of the pressing device. Where the activation of the pressing device is initiated with large delay, namely, where a length of time from the issue of the initiation requesting command to the actual initiation of the activation of the pressing device is large, it is possible that the initiation requesting command is issued before the issue of the command requesting initiation of the activation of the movement restraining device.

The engagement of the movement restraining member and the secondary shoe may be maintained during the brake effect state, or maintained until a predetermined condition or conditions are satisfied after activation of the pressing device of the parking-brake operating apparatus. For example, the engagement of the movement restraining member and the secondary shoe may be released upon termination of the activation of the pressing device, upon application of the torque to the wheel (e.g., when the service brake is released), or upon elapse of a certain length of time after termination of the activation of the pressing device. Where the pressing device is of a float type, namely, where the main body of the pressing device is not fixed to the non-rotary body, it is preferable that the engagement of the movement restraining member and the secondary shoe is maintained until the torque is applied to the wheel, for restraining movement of the pressing device in the forward or reverse rotation direction.

The movement restraining device may have either a single movement restraining member or two movement restraining members as the at least two movement restraining members. Where the movement restraining device has a single movement restraining member, the single movement restraining member is capable of being engaged with both of the pair of brake shoes. Where the movement restraining device has two movement restraining members, one of the two movement restraining members is capable of being engaged with one of the pair of brake shoes while the other of the two movement restraining members is capable of being engaged with the other of the pair of brake shoes. Further, the two movement restraining members may be driven by the electric drive source as a drive source common to the two movement restraining members, or may be driven by two electric drive sources, respectively, which can be activated independently of each other.

Each of the at least one movement restraining member may be provided by any one of various members such as an engaging rod (that may be referred to as also a pin or a sliding member) and an engaging pawl, as long as each of the at least one movement restraining member can be engaged with the brake shoe or shoes so as to restrain the brake shoe or shoes from being moved away from the anchor member.

Each of the brake shoes may be provided with an engaging portion, which is although not essential. The engaging portion may be provided by, for example, a cutout, an engaging hole, an engaging recess or an engaging protrusion.

The movement restraining member may be held by one of the non-rotary body and the anchor member, for example, such that the movement restraining member is linearly movable or pivotably (curvedly) movable. It is noted that, in the present description, the term "movement" may be interpreted to encompass not only a linear movement but also a curved movement such as pivot movement and rotation.

The electric drive source may have an electric motor, a solenoid or an electrically deformable member that includes a piezoelectric element or the like. It is preferable to design the movement restraining device (i.e., determine a size and a shape of the movement restraining member and a position in which a restraining member holder is to be disposed), such that the secondary shoe is restrained from being moved in a direction away from the anchor member while being allowed to be moved in a direction toward the anchor member. Where the secondary shoe is provided with a cutout as the engaging portion, the cutout may have a size and a shape which restrain the secondary shoe from being moved in a direction away from the anchor member and which allow the secondary shoe to be moved in a direction toward the anchor member, during engagement of the movement restraining device with the cutout. Where the secondary shoe is provided with an engaging protrusion as the engaging portion, it is preferable that the shape of the movement restraining member and the position of the restraining member holder are determined such that the movement restraining member is engaged with a portion of the engaging protrusion which is remote from the anchor member. It is noted that the movement restraining device may be designed also such that the secondary shoe is restrained from being moved in the direction toward the anchor member as well as in the direction away from the anchor member. Similarly, the engaging portion provided in each brake shoe may be designed such that the secondary shoe is restrained from being moved in the direction toward the anchor member as well as in the direction away from the anchor member.

(13) The parking brake system according to mode (12), wherein the movement-restraining controller has a drive-source controlling portion configured to control the electric drive source in response to a command requesting operation of the parking-brake operating apparatus, and wherein the parking-brake operating apparatus further has a pressing-device controller configured to activate the pressing device after the electric drive source has been controlled by the drive-source controlling portion.

In the parking brake system according to this mode (13), the control of the electric drive source of the movement restraining device is initiated in response to the command requesting the operation of the parking-brake operating apparatus, and the activation of the pressing device is initiated after the initiation of the control of the electric drive source. The activation of the pressing device may be initiated, for example, after it is confirmed that the movement restraining member has been brought into engagement with the secondary shoe, after it is judged, based on elapsed time, that the restraining member has been brought into engagement with the secondary shoe, or immediately after initiation of activation of the electric drive source. In any one of these cases, it is possible to more reliably restrain the secondary shoe from being separated from the anchor member where the movement restraining member is brought into engagement with the secondary shoe prior to the initiation of the activation of the pressing device. Where the pressing device is a manually operable member, it is preferable to output an indication indicating a vehicle driver that a parking brake operating member should be operated with delay.

(14) The parking brake system according to mode (12) or (13), wherein the movement-restraining controller has a disengagement controlling portion configured, in response to information indicative of release of a service brake of the vehicle, to control the electric drive source so as to disengage the one of the at least one movement restraining member from the secondary one of the brake shoes.

(15) The parking brake system according to any one of modes (12)-(14),
wherein the non-rotary body, the rotary drum, the brake shoes, the anchor member, the transmitting member and the parking-brake operating apparatus cooperate with each other to constitute a drum brake,
wherein the at least one movement restraining member includes two movement retraining members that are provided for the respective brake shoes, such that each of the two movement restraining members is engaged with a corresponding one of the brake shoes when being placed in an engaging position, and is disengaged from the corresponding one of the brake shoes when being placed in a disengaging position,
and wherein the movement restraining device further includes a restraining member holder which is fixed to one of the non-rotary body and the anchor member, and which holds the two movement retraining members such that each of the two movement restraining members is movable between the engaging position and the disengaging position during a non-effect state in which the drum brake is not being in effect.

In the parking brake system according to this mode (15), the restraining member holder is fixed to one of the non-rotary body and the anchor member, and holds the two movement restraining members such that each of the movement restraining members is movable relative to the restraining member holder. The restraining member holder is disposed in a position that enables each of the movement restraining members to be engaged with a predetermined portion (e.g., the engaging portion) of a corresponding one of the brake shoes during a non-effect state in which the drum brake is not being in effect. In other words, in the present parking brake system, the movement restraining members are engaged with the brake shoes during the non-effect state, so that one of the movement restraining members has been already brought into engagement with the secondary shoe upon initiation of activation of the pressing device. It can be considered that one of the non-rotary body and the anchor member is connected to the secondary shoe while the one of the movement restraining members is held in engagement with the secondary shoe.

(16) The parking brake system according to mode (15), wherein each of the two movement restraining members is provided by an engaging rod,
wherein each of the brake shoes has an engaging portion that is to be engaged with the engaging rod as a corresponding one of the two movement restraining members,
wherein the restraining member holder has two holder portions which are disposed in respective portions of the non-rotary body each positionally corresponding to the engaging portion of a corresponding one of the brake shoes during the non-effect state, each of the two holder portions holding the engaging rod as a corresponding one of the two movement restraining members such that the engaging rod is linearly movable between the engaging position and the disengaging position,
wherein the movement restraining device further includes two forcing members each of which is disposed between the non-rotary body and the engaging rod as a corresponding one of the two movement restraining members and is configured to force the engaging rod toward the disengaging position,
and wherein the electric drive source has two solenoids each of which is provided for the engaging rod as a corresponding one of the two movement restraining members and is configured to generate an electromagnetic drive force forcing the engaging rod, against a force generated by a corresponding one of the forcing members, in a direction away from the disengaging position toward the engaging position.

In the parking brake system according to this mode (16), the engaging rods as the movement restraining members are provided for the respective brake shoes, and each of the engaging rods is linearly movable between the engaging position and the disengaging position. When each of the engaging rods is being positioned in the engaging position, a corresponding one of the brake shoes is restrained from being moved in a direction away from the anchor member. When each engaging rod is being positioned in the disengaging position, the corresponding brake shoe is allowed to be moved in the direction away from the anchor member. Further, each of the engaging rods is forced by a corresponding one of the forcing members toward the disengaging position, so as to be positioned in the disengaging position when an electric current is not being supplied to a corresponding one of the solenoids. The restraining member holder may be arranged to hold the two engaging rods, either such that each of the engaging rods has a posture parallel to a backing plate as the non-rotary body and is movable in a direction parallel to the backing plate, or such that each engaging rod has a posture perpendicular to the backing plate and is movable in a direction perpendicular to the backing plate. Where the engaging portion of each of the brake shoes is provided by an engaging protrusion, the engaging protrusion may be provided either on one of opposite surfaces of a web of each brake shoe, which is opposed to the backing plate, or on the other of the opposite surfaces of the web of each brake shoe, which is remote from the backing plate.

(17) The parking brake system according to mode (15),
wherein each of the two movement restraining members is provided by an engaging pawl,
wherein each of the brake shoes has an engaging portion that is to be engaged with the engaging pawl as a corresponding one of the two movement restraining members,
wherein the restraining member holder has two holder portions which are disposed in respective portions of the non-rotary body each positionally corresponding to the engaging portion of a corresponding one of the brake shoes during the non-effect state, each of the two holder portions holding the engaging pawl as a corresponding one of the two movement restraining members such that the engaging pawl is pivotable between the engaging position and the disengaging position,
and wherein the electric drive source has two electric motors each of which is provided for the engaging pawl as a corresponding one of the two movement restraining members and is configured to rotate the engaging pawl between the engaging position and the disengaging position.

In the parking brake system according to this mode (17), the engaging pawl as each of the movement restraining members is pivotable between the engaging position and the disengaging position, and each of the brake shoes is restrained from being moved away from the anchor member when the engaging pawl as a corresponding one of the movement restraining members is engaged to the each of the brake shoes. The movement restraining device may be provided with a forcing mechanism that is arranged to force the engaging pawls such that each of the engaging pawls is held in the disengaging position when an electric current is not being supplied to a corresponding one of the electric motors.

(18) The parking brake system according to mode (15),
wherein each of the two movement restraining members is provided by an engaging pawl,
wherein each of the brake shoes has an engaging portion that is to be engaged with the engaging rod as a corresponding one of the two movement restraining members,
wherein the restraining member holder has two holder portions which are disposed in respective portions of the non-rotary body each aligned with the engaging portion of a corresponding one of the brake shoes during the non-effect state, each of the two holder portions holding the engaging pawl as a corresponding one of the two movement restraining members such that the engaging pawl is pivotable between the engaging position and the disengaging position,
wherein the electric drive source has an electric motor which is provided for the engaging pawl as one of the two movement restraining members and is configured to rotate the engaging pawl between the engaging position and the disengaging position,
and wherein the movement restraining device further includes a drive transmission mechanism configured to transmit rotation of the electric motor to the engaging pawl as the other of the two movement restraining members.

In the parking brake system according to this mode (18), the two engaging pawls as the respective movement restraining members are rotated by the single electric motor. The drive transmission mechanism is provided to transmit rotation of the electric motor to the engaging pawl as the other of the movement restraining members, and may include a pair of pulleys (that may be replaced with gears) and a belt (that may be replaced with a wire or a chain). Further, the drive transmission mechanism may be arranged to transmit pivot motion of the engaging pawl as the one of the movement restraining members, directly to the engaging pawl as the other of the movement restraining members. Owing to cooperation of the electric motor and the drive transmission mechanism, it is possible to selectively establish a first state in which the engaging pawl as one of the movement restraining members is positioned in the engaging position while the engaging pawl as the other of the movement restraining members is positioned in the disengaging position and a second state in which the engaging pawl as the one of the movement restraining members is positioned in the disengaging position while the engaging pawl as the other of the movement restraining members is positioned in the engaging position.

(19) The parking brake system according to mode (15),
wherein the two movement restraining members are provided by respective two engaging pawls that are movable together with each other in a direction in which the two engaging pawls are distant from each other,
and wherein the movement-restraining controller includes a selected-state establishing portion configured to establish a selected one of a first state and a second state, such that one of the two engaging pawls is engaged with one of the brake shoes without the other of the two engaging pawls being engaged with the other of the brake shoes in the first state, and such that the other of the two engaging pawls is engaged with the other of the brake shoes without the one of the two engaging pawls being engaged with the one of the brake shoes in the second state.

In the parking brake system according to this mode (19), the two engaging pawls may be held by a member (e.g., a rod-like member) that is held by the restraining member holder such that the member is linearly movable in the direction in which the two engaging pawls are distant from each other. When the engaging pawl as one of the movement restraining members is engaged with a corresponding one of the brake shoes, the engaging pawl as the other of the movement restraining members is disengaged from the other of the brake shoes, so that a selected one of the first and second states is established. Although not being essential, the engaging portion (e.g., cutout, engaging hole, engaging recess, engaging protrusion) may be provided in each of the brake shoes.

The parking brake system according to above mode (12) may be constructed such that the movement restraining device includes a single movement restraining member as the at least one movement restraining member, which is common to the pair of brake shoes having respective engaging portions that are to be engaged with the single movement restraining member, such that the single movement restraining member is pivotably held by the restraining member holder that is fixed to one of the non-rotary body and the anchor member, and such that the movement-restraining controller includes a selectively engaging portion configured to pivot the single movement restraining member for thereby causing the single movement restraining member to be brought into engagement with a selected one of the engaging portions of the respective brake shoes. That is, in this construction, the selected one of the engaging portions of the brake shoes is engaged with the single movement restraining member that is pivotable relative to the brake shoes.

(20) The parking brake system according to any one of modes (12)-(19), wherein the pressing device is activatable by an electric motor and includes a maintaining mechanism that is configured, in absence of an electric current supplied to the electric motor, to maintain the pressing force which is applied to the selected one of the brake shoes and which forces the friction material member against the inner circumferential surface of the rotary drum serving as the friction surface.

(21) The parking brake system according to any one of modes (1)-(20), wherein the parking-brake operating apparatus has a slope detector configured to detect a direction of slope of a road surface on which the vehicle is being stopped, and a torque direction predictor configured to predict the torque application direction based on the direction of the slope of the road surface which is detected by the slope detector.

(22) The parking brake system according to any one of modes (1)-(21), for the vehicle having a drive power source from which a drive power is to be transmitted toward the wheel via a transmission with a plurality of shift positions including a parking position, wherein the parking-brake operating apparatus has a shift-position detector configured to detect a currently selected one of the plurality of shift positions of the transmission during activation of the drive power source, and a torque direction predictor configured, when the currently selected one of the shift positions is other than the parking position, to predict the torque application direction based on the currently selected one of the shift positions which is detected by the shift-position detector.

It is possible to predict the torque application direction (in which a torque is to be applied to the wheel during stop of the vehicle), based on the direction of slope of the road surface on which the vehicle is being stopped and/or on the currently selected one of the shift positions of the transmission. The vehicle is stopped by activation of the service brake, and then the parking brake is activated. It is common that the service brake is released after the parking brake comes into effect. Upon release of the service brake, the wheel receives a torque originating from a gravity or a drive torque applied from a vehicle drive power source. In the parking brake system according to above mode (21), the torque application direction is predicted based on the direction of the slope of the road surface on which the vehicle is being stopped, wherein the direction of the slope of the road surface is detected by the slope detector. When the vehicle is being stopped on an uphill, it is predicted that the torque applied to the wheel will act on the reverse rotation direction. When the vehicle is being stopped on a downhill, it is predicted that the applied torque will act on the forward rotation direction. The slope detector can be considered also as a posture detector configured to detect an inclination of the vehicle in a longitudinal direction of the vehicle. The slope detector may include a longitudinal acceleration sensor and/or a vehicle height sensor. In the parking brake system according to above mode (22), the torque application direction is predicted based on the currently selected one of the shift positions of the transmission during activation of the drive power source. This arrangement is effective for a case in which the parking brake is operated when the currently selected one of the shift positions is other than the parking position during activation of the drive power source. In such a case, the torque application direction can be predicted based on the currently selected one of the shift positions of the transmission as long as the currently selected shift position is other than a neutral position. When the currently selected shift position is a forward drive position (commanding a forward running of the vehicle), it is predicted that the torque applied to the wheel will act on the forward rotation direction. When the currently selected shift position is a reverse drive position (commanding a reverse running of the vehicle), it is predicted that the applied torque will act on the reverse rotation direction.

(23) A parking brake system for a vehicle, including:

a non-rotary body;

a rotary drum rotatable together with a wheel of the vehicle, and having an inner circumferential surface that serves as a friction surface;

a pair of brake shoes disposed on an inner peripheral side of the rotary drum, and having respective outer circumferential surfaces on each of which a friction material member is disposed;

an anchor member fixed to the non-rotary body, and disposed between anchor-member-side end portions of the respective brake shoes, each of the anchor-member-side end portions being provided by one of opposite end portions of a corresponding one of the brake shoes;

a transmitting member interconnecting transmitting-member-side end portions of the respective brake shoes, and configured, in presence of a force applied to one of the brake shoes and acting in a direction of circumference of the non-rotary body, to transmit the force from the one of the brake shoes to the other of the brake shoes; and a pressing device which is disposed in vicinity of the anchor-member-side end portions of the respective brake shoes and which is configured to press the friction material member of the brake shoes against the inner circumferential surface of the rotary drum serving as the friction surface, wherein the pressing device includes (a) an electric drive source and (b) a pressing mechanism having a movable member which is capable of acting on only a predetermined one of the brake shoes such that a pressing force can be applied to the predetermined one of the brake shoes through the movable member that is to be driven by the electric drive source.

In the parking brake system according to mode (23), the movable member of the pressing mechanism is moved to apply a pressing force only to a predetermined one of the pair of brake shoes, whereby the parking brake is brought into effect. The movable member, which may be a rod-like member, for example, does not have flexibility and is arranged to be linearly movable, unlike a flexible cable and a pivotable lever. Upon application of a torque to the wheel while the parking brake is being in effect during stop of the vehicle, the secondary shoe is brought into contact with the anchor member while the primary shoe is brought into contact with the movable member. Therefore, a reduction of the braking force is satisfactorily restrained, irrespective of whether the pressing force is applied to the primary or secondary shoe as the predetermined one of the brake shoes. In an arrangement in which the predetermined one of the brake shoes is the primary shoe upon application of the torque to the wheel in the forward rotation direction, there is an advantage that a large braking force can be obtained when the brake is activated during a forward running of the vehicle. In this arrangement, since a large force is not applied to the movable member, the movable member does not have to have a large strength and a large braking force can be obtained.

The pressing device described in this mode (23) is configured to apply the pressing force on only a predetermined one of the pair of brake shoes by moving the movable member toward the predetermined one of the brake shoes. Such a pressing device is not disclosed by any one of the above-identified publications of Japanese Patent Applications, and is therefore novel over the prior art. It is noted that the parking brake system according to this mode (23) may incorporate therein any one or ones of features described in the above modes (1)-(22).

BRIEF DESCRIPTION OF DRAWINGS

The above and other objects, features, advantages and technical and industrial significance of the present invention will be better understood by reading the following detailed description of presently preferred embodiments of the invention, when considered in connection with the accompanying drawings, in which.

BEST MODE FOR CARRYING OUT THE INVENTION

There will be described embodiments of the present invention, by reference to the accompanying drawings. It is to be understood that the present invention is not limited to the following embodiments, and may be otherwise embodied with various changes and modifications, such as those described in the foregoing "MODES OF THE INVENTION", which may occur to those skilled in the art.

Figure 1:
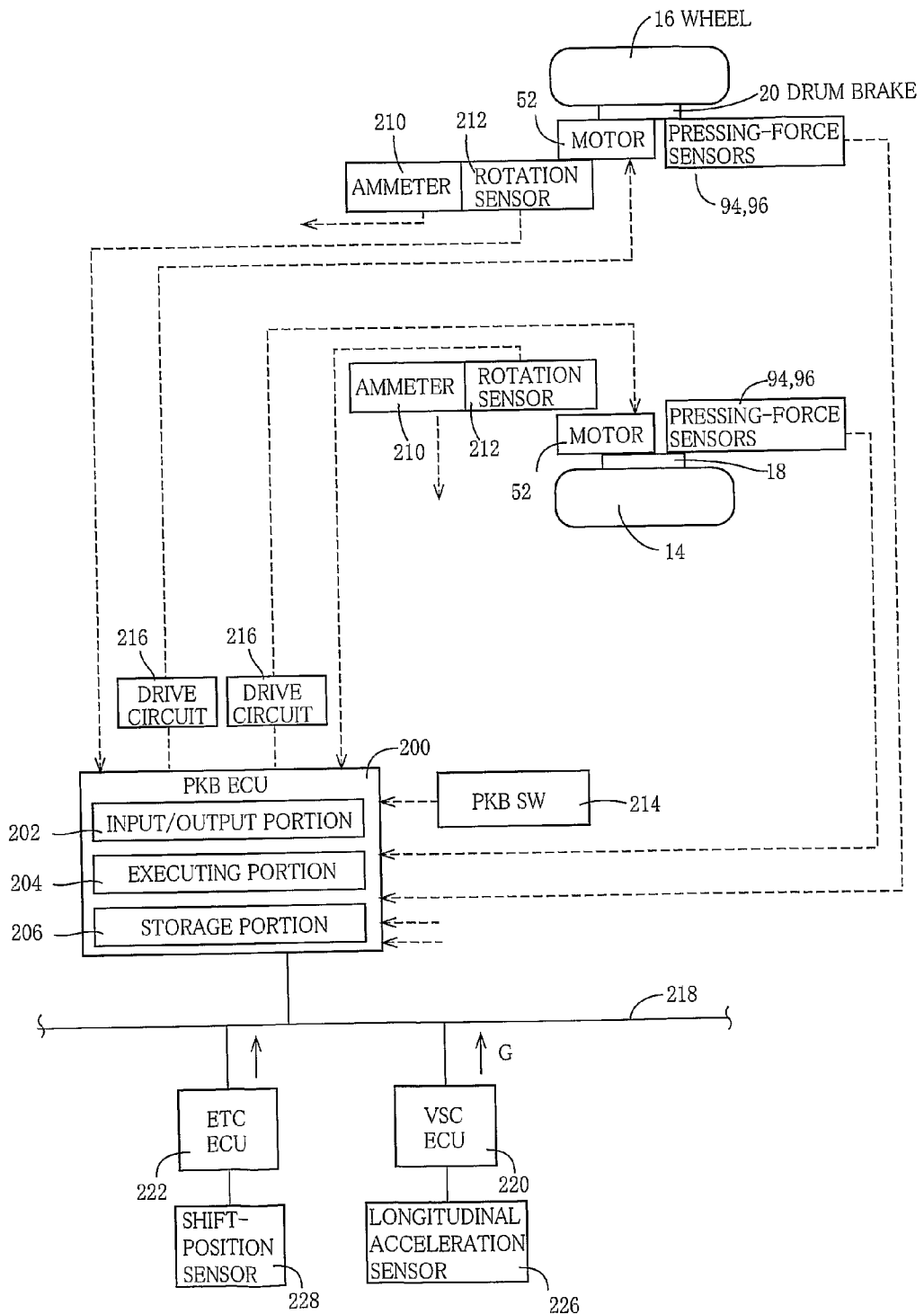
FIG. 1 is a view showing an overall construction of a parking brake system according to an embodiment of the present invention.
Figure 2:
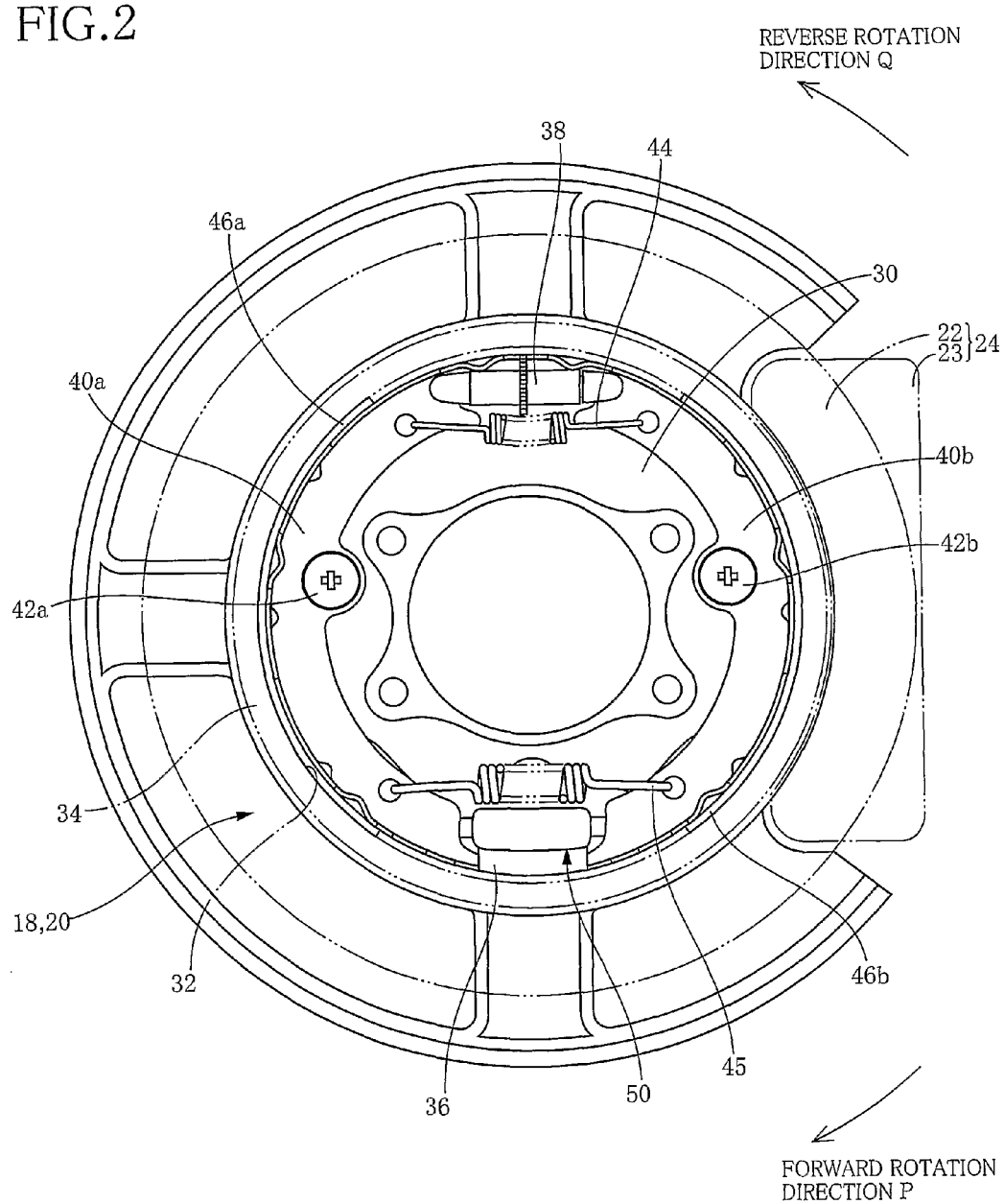
FIG. 2 is a plan view showing a drum brake that is incorporated in the parking brake system of FIG. 1.

Referring first to FIGS. 1-18, there will be described a parking brake system constructed according an embodiment of the invention. In FIG. 1, reference signs 16, 14 denote rear right and rear left wheels of a vehicle, respectively, and reference signs 18, 20 denote drum brakes that are provided for the respective wheels 14, 16. As shown in FIG. 2, each of the drum brakes 18, 20 is a duo-servo drum brake that is incorporated in the parking brake system. Since each of the drum brakes 18, 20 functions as a parking brake, it will be hereinafter referred to as a parking brake where appropriate. In FIG. 2, reference signs 22, 23 denote a brake disk and a caliper, respectively, which cooperate with each other to constitute a disk brake 24 serving as a service brake. Each of the drum brakes 18, 20 serving as the parking brake is disposed on an inner peripheral side of the brake disk 22, so as to cooperate with the disk brake 24 to constitute a so-called "drum in disk brake" in the present embodiment. The drum brakes 18, 20 are identical in construction with each other.

Each of the drum brakes 18, 20 has a backing plate 30 and a rotary drum 34. The backing plate 30 as a non-rotary body is attached to a body (not shown) of the vehicle. The drum 34 has an inner circumferential surface that serves as a friction surface 32, and is rotatable together with the wheel. An anchor member 36 and an adjuster 38 (that serves as a transmitting member) are provided in two portions of the backing plate 30 which are spaced apart from each other in a direction of diameter of the backing plate 30. The anchor member 36 is fixed to the backing plate 30 while the adjuster 38 is of a so-called float type. Between the anchor member 36 and the adjuster 38, a pair of arcuate-shaped brake shoes 40a, 40b are disposed to be opposed to the inner circumferential surface of the drum 34. The pair of brake shoes 40a, 40b are attached to the backing plate 30 through respective shoe hold-down devices 42a, 42b such that the brake shoes 40a, 40b are movable along a surface of the backing plate 30. The backing plate 30 has, in its central portion, a through-hole that is provided for allowing an axle shaft (not shown) to pass therethrough.

Each of the brake shoes 40a, 40b has opposite end portions, one of which can be referred to as a transmitting-member-side end portion and the other of which can be referred to as an anchor-member-side end portion. The transmitting-member-side end portions of the respective brake shoes 40a, 40b are operatively connected to each other through the adjuster 38, while the anchor-member-side end portions of the respective brake shoes 40a, 40b are in contact with the anchor member 36, such that the brake shoes 40a, 40b are pivotably held by the adjuster 38 and the anchor member 36. Each of the transmitting-member-side end portions of the respective brake shoes 40a, 40b is biased or forced, by an adjuster spring 44, in a direction toward the adjuster 38. Each of the anchor-member-side end portions of the respective brake shoes 40a, 40b is biased or forced, by a return spring 45, in a direction toward the anchor member 36. The brake shoes 40a, 40b have respective outer circumferential surfaces on which respective brake linings 46a, 46b serving as friction material members are disposed, so that a friction force is generated between the friction surface 32 of the drum 34 and each of the brake linings 46a, 46b upon contact with each of the brake linings 46a, 46b with the friction surface 32 of the drum 34. The adjuster 38 is operated to adjust a clearance between the drum 34 and each of the brake linings 46a, 46b, depending on wear of the brake shoes 40a, 40b. The adjuster 38 functions as a transmitting member configured to transmit a circumferential force applied to one of the brake shoes 40a, 40b, to the other of the brake shoes 40a, 40b.

Figure 3:
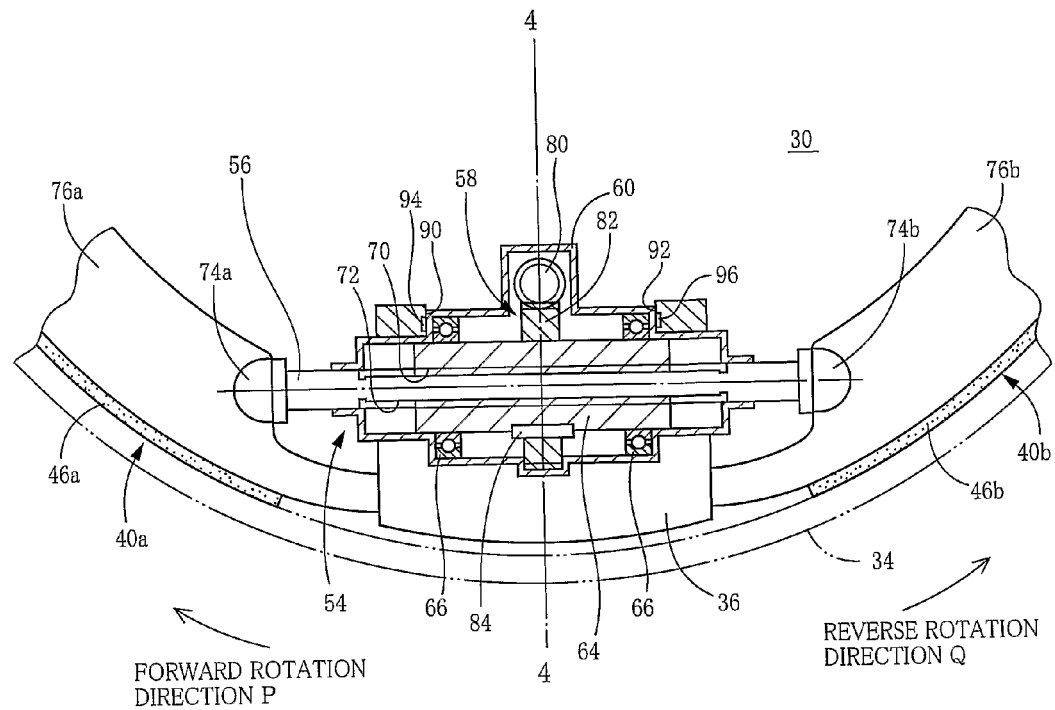
FIG. 3 is a cross sectional view of a pressing device provided in the drum brake of FIG. 2.
Figure 4:
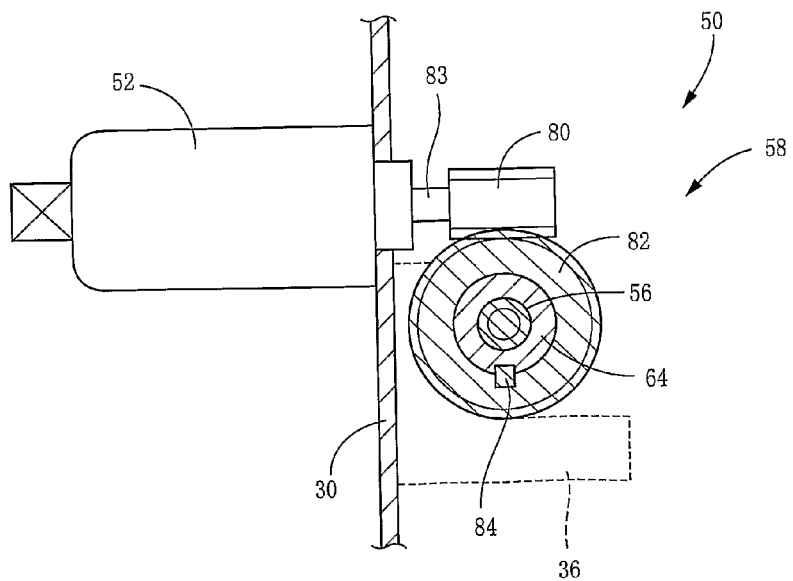
FIG. 4 is a cross sectional view taken along line 4-4 of FIG. 3.

Each of the drum brakes 18, 20 further has a pressing device 50, which includes an electric motor 52 as an electric drive source, a motion converting mechanism 54, a shoe pressing rod 56 as an acting member and a maintaining mechanism 58, as shown in FIGS. 3 and 4. The motion converting mechanism 54 is configured to convert a rotary motion that is to be given from the electric motor 52, into a linear motion that is to be given to the shoe pressing rod 56. The shoe pressing rod 56 is provided by a rigid member, and does not have flexibility unlike a cable. That is, each of the drum brakes 18, 20 does not have a brake lever, and is not operated through a cable. As shown in FIG. 3, the motion converting mechanism 54 includes: a housing 60; a threaded member 64 held by the housing 60 through a pair of bearings 66 so as to be rotatable relative to the housing 60; and the above-described shoe pressing rod 56 held on a radially inner side of the threaded member 64 and axially movable relative to the housing 60. The threaded member 64 has a first threaded portion (internally threaded portion) 70 provided in its inner circumferential surface, while the shoe pressing rod 56 has a second threaded portion (externally threaded portion) 72 provided in an axially intermediate portion of its outer circumferential surface, such that the first and second threaded portions 70, 72 are held in thread engagement with each other. The shoe pressing rod 56 have shoe engaging portions 74a, 74b respectively provided in its axially opposite end portions. The shoe engaging portions 74, 74b have shapes suitable for gripping webs 76a, 76b of the respective brake shoes 40a, 40b, so as to function as a preventer for preventing rotation of the shoe pressing rod 56. Each of the shoe engaging portions 74a, 74b has a size and a shape, which enable each of the shoe engaging portion 74a, 74b to grip a corresponding one of the webs 76a, 76b from its opposite sides even when the shoe pressing rod 56 is moved rightward or leftward as seen in FIG. 3, namely, which avoid each of the shoe engaging portion 74a, 74b from being disengaged from a corresponding one of the webs 76a, 76b even when the rod 56 is moved right or leftward. In the present embodiment, the threaded member 64 serves as a first threaded member while the shoe pressing rod 56 serves as a second threaded member. The shoe pressing rod 56 and the second threaded member are formed integrally with each other in the present embodiment.

Between the electric motor 52 and the motion converting mechanism 54, there is provided a maintaining mechanism in the form of a worm gear set 58 that includes a worm 80 and a worm wheel 82. The worm 80 is formed integrally with an output shaft 83 of the electric motor 52, so as to be rotatable together with the output shaft 83. The threaded member 64 is fitted in the worm wheel 82 so as to be disposed on a radially inner side of the worm wheel 82. A key 84 is provided between the worm wheel 82 and the threaded member 64, so as to assure rotation of the threaded member 64 together with the worm wheel 82. The worm wheel 82 is held by the housing 60 so as to be axially unmovable relative to the housing 60. Thus, in the motion converting mechanism 54, the threaded member 64 is inhibited from being axially moved so that a rotary motion of the threaded member 64 is converted into a linear motion of the shoe pressing rod 56, i.e., a relative movement of the shoe pressing rod 56 in its axial direction. Even when a large force is applied to the shoe pressing rod 56 in absence of an electric current supplied to the electric motor 52, the electric motor 52 is prevented from being rotated by the large force, owing to the worm gear set 58 that serves as the maintaining mechanism as well as a speed reducer. The housing 60 is fixedly held by the anchor member 36 having opposed surfaces 90, 92 opposed to respective surfaces of the housing 60 that are perpendicular to the axial direction. Two pressing-force sensors 94, 96 are attached to the respective opposed surfaces 90, 92 of the anchor member 36. The left-sided pressing-force sensor 94 is of pressure-sensing type, and is configured to detect a pressing force (more precisely, a reaction acting against the pressing force) which is applied from the shoe pressing rod 56 to the right-sided brake shoe 40*b*. The right-side pressing-force sensor 94 is also of pressure-sensing type, and is configured to detect a pressing force (more precisely, a reaction acting against the pressing force) which is applied from the shoe pressing rod 56 to the left-sided brake shoe 40*a*. It is noted that each of the housing 60 and the anchor member 36 may be constituted by a plurality of members.

In the present embodiment, as shown in FIG. 1, the electric motor 52 is controlled in accordance with commands supplied from a parking brake ECU (PKBECU) 200, which is constituted principally by a computer and includes an input/output portion 202, an executing portion 204 and a storage portion 206. To the input/output portion 202, there are connected the above-described pressing-force sensors 94, 96, an ammeter 210 for detecting an electric current flowing through the electric motor 52, a rotation sensor 212 for detecting the number of rotations of the electric motor 52, a parking brake switch 214 operable by the vehicle driver, and the above-described electric motor 52 via a drive circuit 216. The parking brake ECU 200 is connected, via a CAN (Car Area Network) 218, to other computers provided in the vehicle such as a slip control ECU (VSCECU) 220 and an engine transmission ECU (ETCECU) 222. To the slip control ECU 220 and the engine transmission ECU 222, there are connected a longitudinal acceleration sensor 226 as a slop detector and a shift-position sensor 228 as a shift-position detector, respectively, for example. Thus, information such as an actual longitudinal acceleration and a current shift position is supplied to the parking brake ECU 200 via the slip control ECU 220, engine transmission ECU 222 and CAN 218. The longitudinal acceleration sensor 226 includes two detecting portions each arranged to detect an acceleration directed in a direction inclined with respect to a longitudinal direction of the vehicle by an angle of 45°, so that an acceleration of the vehicle in the longitudinal direction is obtained based on values respectively detected by the detecting portions. Even where one of the two detecting portions suffers from a failure, the longitudinal acceleration can be obtained by the other of the two detecting portions.

The above-described pressing-force sensors 94, 96 may be replaced with other pressing-force sensors, which are attached to the respective shoe engaging portions 74*a*, 74*b* of the shoe pressing rod 56 that are to be brought into contact with the respective brake shoes 40*a*, 40*b*. In this arrangement, the pressing force applied to each of the brake shoes 40*a*, 40*b* can be directly detected. This arrangement is preferable, particularly, where the housing 60 is provided integrally with the anchor member 36. Further, the above-described pressing-force sensors 94, 96 may be replaced with still other pressing-force sensors, which are attached to respective portions of the anchor member 36 that are to be brought into contact with the reactive brake shoes 40*a*, 40*b*. In this arrangement, it is possible to detect a pressing force obtained owing to a servo effect.

The parking brake switch 214 is to be operated for commanding activation (hereinafter referred to as "locking" where appropriate) of the parking brakes 18, 20 and for commanding release of the parking brakes 18, 20. For example, the parking brake switch 214 may have a locking operation portion and a releasing operation portion. When the locking operation portion is operated, it is judged that there is issued a command requesting activation or locking of the parking brakes 18, 20. When the releasing operation portion is operated, it is judged that there is issued a command requesting release of the parking brakes 18, 20. The shift-position sensor 228 may be configured to detect either or indirectly a selected shift position of a transmission of the vehicle. For detecting indirectly the selected shift position, the shift-position sensor 228 may be arranged to detect an actual position of a shift operation lever of the vehicle.

There will be described an operation of the parking brake system constructed as described above. In a non-effect state in which each of the parking brakes 18, 20 is not being in effect, the shoe pressing rod 56 is positioned in a neutral position as shown in FIG. 3. While the pressing rod 56 is being positioned in the neutral position, the shoe engaging portions 74*a*, 74*b* of the shoe pressing rod 56 slightly contact with the brake shoes 40*a*, 40*b* or do not contact with the brake shoes 40*a*, 40*b*. When the locking operation portion of the parking brake switch 214 is operated, the electric motor 52 is activated whereby the parking brakes 18, 20 are activated. Prior to the activation of the motor 52, a torque application direction (in which a torque is to be applied to each of the wheels 14, 16 in a brake effect state in which the parking brakes 18, 20 have been brought into effect) is predicted. The shoe pressing rod 56 is moved toward a primary one of the brake shoes 40*a*, 40*b* that serves as a primary shoe upon application of the torque to each of the wheels 14, 16. It is noted that the primary shoe is defined as a shoe opposite to another shoe that is brought into contact with the anchor member 36 when the brake shoes 40*a*, 40*b* are moved, by the applied torque, in a circumferential direction along the inner circumferential surface of the rotary drum 34. The shoe pressing rod 56, which is moved toward the primary shoe, is positioned in an acting position so as to act directly on the primary shoe, namely, is brought into direct contact with the primary shoe so as to apply a pressing force to the primary shoe. Thus, even if the pressing rod 56 is not in contact with the brake shoes 40 when being positioned in the neutral position, the pressing rod 56 can be reliably brought into contact with the primary shoe so as to act directly on the primary shoe when being moved from the neutral position to the primary shoe. For example, when the predicted torque application direction corresponds to a forward rotation direction P, the shoe pressing rod 56 is moved leftward as seen in FIG. 3, so as to apply the pressing force to the brake shoe 40*a* serving as the primary shoe. The pressing force applied to the brake shoe 40*a* is transmitted, via the adjuster 38, to the brake shoe 40*b* serving as the secondary shoe, whereby the brake shoe 40*b* is pressed against the anchor member 36. When the predicted torque application direction corresponds to a reverse rotation direction Q, the shoe pressing rod 56 is moved rightward as seen in FIG. 3, so as to apply the pressing force to the brake shoe 40*b* serving as the primary shoe. The pressing force applied to the brake shoe 40*b* is transmitted, via the adjuster 38, to the brake shoe 40*a* serving as the secondary shoe, whereby the brake shoe 40*a* is pressed against the anchor member 36.

Figure 8:
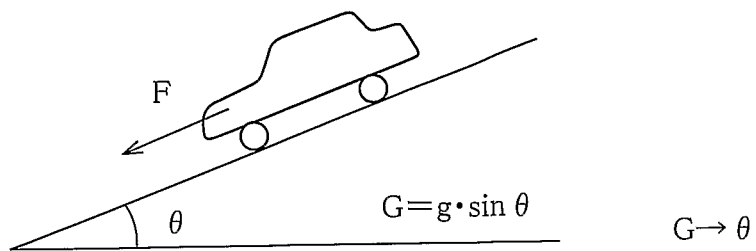
FIG. 8 is a view showing a relationship between a longitudinal acceleration G and an inclination θ of a road surface on which a vehicle is being stopped.

It is possible to predict the torque application direction (in which the applied torque acts on each of the wheels 14, 16 during stop of the vehicle), based on a direction of slope of a road surface on which the vehicle is being stopped and/or on a currently selected shift position of the transmission. The vehicle is stopped by activation of the disk brakes 24 as the service brakes, and then the drum brakes 18, 20 as the parking brakes are activated. It is common that the service brakes 24 are released after the parking brakes 18, 20 become effective. Upon release of the service brakes 24, each of the wheels 14, 16 receives a torque originating from a gravity or a drive torque applied from a vehicle drive power source. When the vehicle is being stopped on a sloped road surface, as shown in FIG. 8, a relationship between a longitudinal acceleration G and a gravitational acceleration g can be expressed by the following expression:

$$G = g \cdot \sin\theta,$$

where "θ" represents an angle of inclination of the sloped road surface.

Thus, the inclination angle θ (i.e., degree and direction of the inclination) can be obtained based on the longitudinal acceleration G. When the longitudinal acceleration is directed in a forward direction (G>0), it can be known that the vehicle is being stopped on a downhill (sin θ>0, θ>0). When the longitudinal acceleration is directed in a reverse direction (G<0), it can be known that the vehicle is being stopped on an uphill (sin θ<0, θ<0). When the vehicle is being stopped on an uphill, it is predicted that a torque acts on each of the wheels 14, 16 in the reverse rotation direction Q upon release of the service brakes 24. When the vehicle is being stopped on a downhill, it is predicted that a torque acts on each of the wheels 14, 16 in the forward rotation direction P upon release of the service brakes 24. Further, it is possible to judge, based on an absolute value of the inclination angle δ, whether the vehicle is being stopped on a sloped road surface or a horizontal road surface. Specifically, when the absolute value is larger than a threshold value, it is judged that the vehicle is being stopped on a sloped road surface. When the absolute value is not larger than the threshold value, it is judged that the vehicle is being stopped on a horizontal road surface. Further, there is a case in which the parking brakes 18, 20 are activated by operating the locking operation portion of the parking brake switch 214 even when the currently selected shift position of the transmission is other than a parking position during activation of the drive power source. In such a case, the torque application direction can be predicted based on the currently selected shift position of the transmission as long as the currently selected shift position is other than a neutral position. When the currently selected shift position is a drive (D) position, a first (1st) gear position or a second (2nd) gear position, it is predicted that the torque applied to each of the wheels 14, 16 will act on the forward rotation direction P upon release of the service brakes 24. When the currently selected shift position is a reverse drive (R) position, it is predicted that the torque applied to each of the wheels 14, 16 will act on the reverse rotation direction Q upon release of the service brakes 24. In the present embodiment, when the vehicle is being stopped on a sloped road surface, the torque application direction is predicted based on a direction of inclination of the sloped road surface. When the vehicle is being stopped on a horizontal road surface, the torque application direction is predicted based on a direction of a drive torque applied from the drive power source. It is noted that the torque application direction may be predicted based on both of the inclination of the road surface and the drive torque, namely, based on the degree and direction of the inclination of the road surface and the amount and direction of the drive torque.

Figure 5:
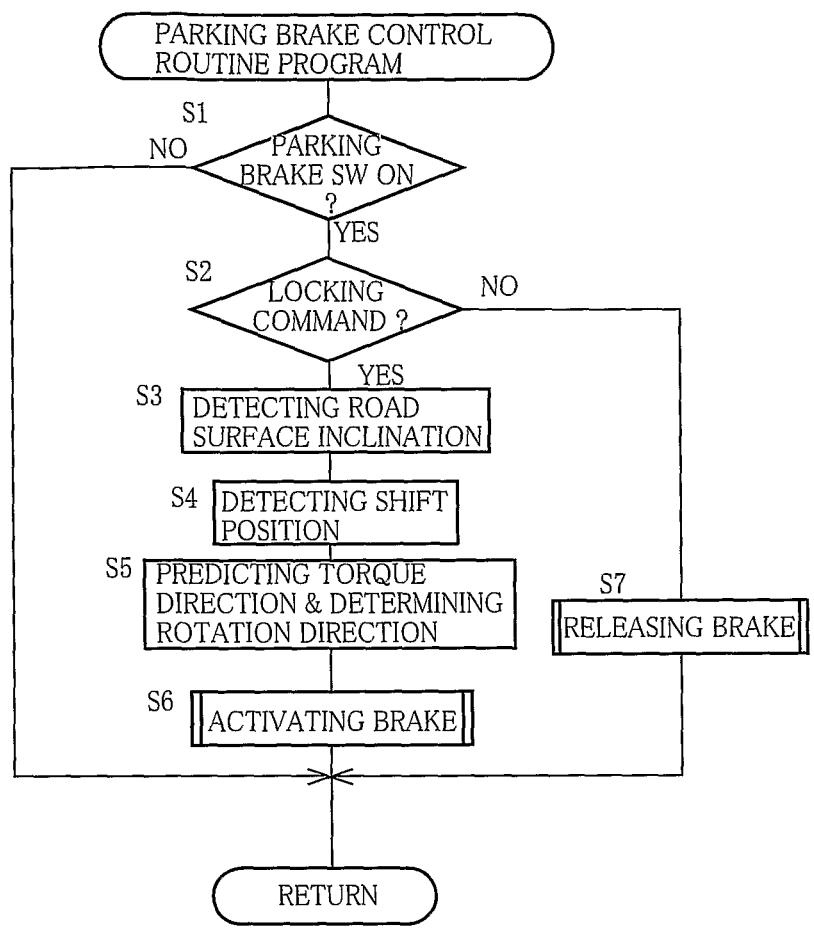
FIG. 5 is a flow chart showing a parking brake control routine program that is stored in a storage portion of a parking brake ECU of the parking brake system.

FIG. 5 is a flow chart showing a parking brake control routine program that is repeatedly executed at a predetermined time interval. This routine program is initiated with step S1 that is implemented to judge whether the parking brake switch 214 has been operated or not. When it has been operated, step S2 is implemented to judge whether the locking operation portion of the parking brake switch 214 has been operated or not, namely, a locking command (requesting activation or locking of the parking brakes 18, 20) has been issued or not. When it has been issued, step S3 is implemented to obtain a direction of the inclination of the road surface, based on a value detected by the longitudinal acceleration sensor 226, and step S4 is implemented to obtain a direction of the drive torque, based on a detection made by the shift-position sensor 228. Step S5 is implemented to predict the torque application direction (i.e., a direction of a torque that is to be applied to each of the wheels 14, 16 upon release of the service brakes 24), and then to determine a direction in which the electric motor 52 is to be rotated, i.e., a direction in which the shoe pressing rod 56 is to be moved. Step S5 is followed by step S6 that is implemented to control an electric current to be supplied to the electric motor 52 so as to activate the parking brakes 18, 20 so that the shoe pressing rod 56 is moved to apply a pressing force to the primary shoe. On the other hand, when the releasing operation portion of the parking brake switch 214 has been operated, namely, when a releasing command (requesting release of the parking brakes 18, 20) has been issued, a negative judgment (NO) is obtained in step S2 whereby the control flow goes to step S7 in which the parking brakes 18, 20 are released by controlling the electric current supplied to the electric motor 52. The shoe pressing rod 56 is returned from the acting position to the neutral position.

Figure 6:
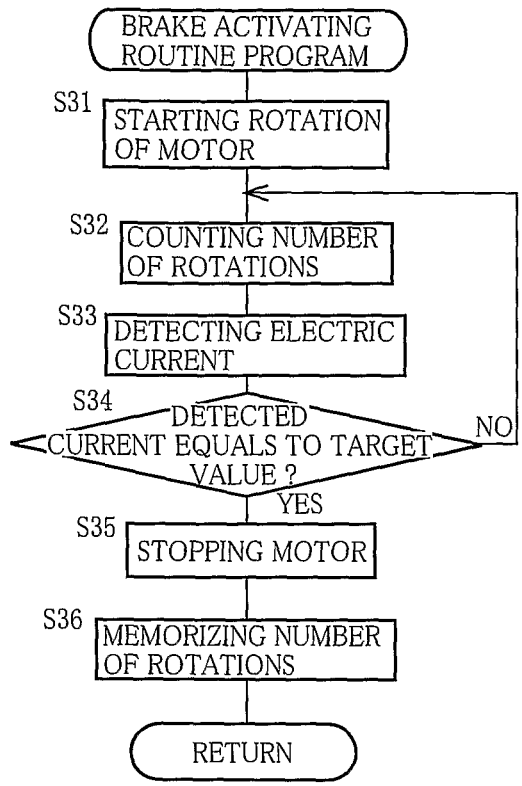
FIG. 6 is a flow chart showing a brake activating routine program as a sub-routine program of the parking brake control routine program of FIG. 5.

In step S6, a brake activating routine program as a sub-routine program of the parking brake control routine program is executed as shown in a flow chart of FIG. 6. In the present embodiment, an amount of pressing force, which is to be generated upon activation of each of the parking brakes 18, 20, is predetermined. The electric motor 52 is activated such that an actual amount of pressing force is equalized to the predetermined amount of pressing force (i.e., target pressing force amount). Since there is a certain relationship between the pressing force amount and a braking force amount that can be generated between a road surface and each tire, a desired braking force amount can be obtained by equalizing the actual pressing force amount to the target pressing force amount. Further, in an arrangement in which the electric motor 52 is a DC motor or the like, a load applied to the electric motor 52 is made larger when the pressing force amount is relatively large than when the pressing force amount is relatively small, so that a value of electric current flowing through the motor 52 is made larger when the pressing force amount is relatively large. Therefore, there is a certain relationship between the electric current value and the pressing force amount, so that the pressing force amount is dependent on the electric current value. In view of these relationships, it can be judged that the pressing force amount reaches the target pressing force amount when the value of electric current flowing through the motor 52 reaches a target electric current value.

The brake activating routine program is initiated with step S31 that is implemented to output a command requesting the electric motor 52 to be rotated in the direction that has been determined in step S5. Step S31 is followed by steps S32 and S33. In step S32, the number of rotations (i.e., angular position) of the motor 52 is detected, namely, a counted value indicated by a rotation number counter is read. In step S33, the electric current value is detected. Then, step S34 is implemented to judge whether the detected electric current value has reached the target electric current value or not. Steps S32 and S33 are repeatedly implemented until the detected electric current value reaches the target electric current value, namely, until a positive judgment (YES) is obtained in step S34. When the detected electric current value has reached the target electric current value, step S35 is implemented to stop the motor 52 with the supplied electric current being zeroed. Then, step S36 is implemented to memorize the number of rotations of the motor 52 that have been required by movement of the shoe pressing rod 56 from the neutral position to the acting position. When being positioned in the acting position, the shoe pressing rod 56 acts on the primary shoe so as to apply the pressing force to the primary shoe. In this state, although the electric current supplied to the motor 52 is zeroed, the maintaining mechanism 58 prevents the motor 52 from being rotated, so as to maintain the pressing force which is applied to the primary shoe and which forces the brake linings 46a, 46b as the friction material members against the friction surface 32 as the inner circumferential surface of the rotary drum 34. Further, in this state in which the pressing force is maintained by the maintaining mechanism 58, even when the torque (whose direction has been predicted) is actually applied to each of the wheels 14, 16, it is possible to restrain movement of the brake shoes 40a, 40b along the inner circumferential surface of the drum 34 and accordingly to restrain reduction of the braking force, since the secondary shoe has been already brought into contact with the anchor member 36. Further, since the secondary shoe is in contact with the anchor member 36, a larger force is not likely to be applied to the shoe pressing rod 56. Therefore, the shoe pressing rod 56 does not have to have a large strength, so that the pressing device 50 as a whole can be made compact in size and the manufacturing cost can be reduced. Even if a large force is applied to the shoe pressing rod 56 via the brake shoes 40, such an application of the large force is caused only at a reduced number of times, thereby leading to increase of service life of the shoe pressing rod 56.

Figure 7:
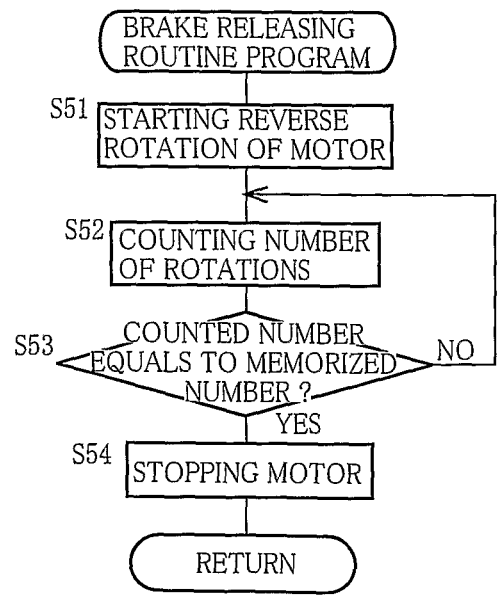
FIG. 7 is a flow chart showing a brake releasing routine program as another sub-routine program of the parking brake control routine program of FIG. 5.

In step S7, a brake releasing routine program as a subroutine program of the parking brake control routine program is executed as shown in a flow chart of FIG. 7. This brake releasing routine program is initiated with step S51 that is implemented to output a command requesting the electric motor 52 to be rotated in a reverse direction that is opposite to the direction of the rotation made in the brake activating routine program of S6. Step S51 is followed by steps S52 and S53. In step S52, the number of rotations of the motor 52 is detected, namely, a counted value of the rotation number counter is read. The number of rotations detected in this step S52 is the number of rotations in the reverse direction that is opposite to the direction of the rotation made in the brake activating routine program of S6. It is judged that the shoe pressing rod 56 has been returned to the neutral position when the number of rotations detected in step S52 becomes equal to the number of rotations detected in step S32 of the brake activating routine program. In step S53, it is judged whether the number of rotations in the reverse direction becomes equal to the number of rotations that has been memorized in step S36. Steps S52 and S53 are repeatedly implemented until the number of rotations counted in step S52 becomes equal to the memorized number, namely, until a positive judgment (YES) is obtained in step S53. When the counted number becomes equal to the memorized number, step S54 is implemented to stop the motor 52 so that the shoe pressing rod 56 is positioned in the neutral position. Thus, a diameter defined by the pair of arcuate-shaped brake shoes 40a, 40b is reduced by the return spring 45 so that each of the parking brakes 18, 20 is released.

When operation of the locking operation portion of the parking brake switch 214 is detected during running of the vehicle, namely, when the locking command is issued during running of the vehicle, a direction of torque actually applied to each of the wheels 14, 16 by activation of the parking brakes 18, 20 is obtained, and a pressing force is applied to a primary one of the brake shoes 40a, 40b.

In the present embodiment, the motion converting mechanism 54 and the shoe pressing rod 56 cooperate with each other to constitute at least a part of a pressing mechanism. The parking brake ECU 200 includes portions which are assigned to store and implement steps S1-S6 of the parking brake control routine program and which constitute at least a part of a pressing-force controller. The above-described portion includes portions which are assigned to store and implement steps S3 and S5 and which constitute a torque direction predictor. The torque direction predictor cooperates with the pressing device 50 to constitute at least a part of a parking-brake operating apparatus. Further, the pressing-force controller serves also as a parking-brake controlling portion and a motor controlling portion.

In the present embodiment, the number of rotations of the electric motor 52 is counted when the shoe pressing rod 56 is moved to the acting position and also when the shoe pressing rod 56 is returned to the neutral position, as described above. However, this arrangement may be modified such that the counted number is increased when the shoe pressing rod 56 is moved to the acting position and such that the counted number is reduced when the shoe pressing rod 56 is returned to the neutral position. In this modified arrangement, step S53 is implemented to judge whether the counted number becomes equal to zero (that is a counted number corresponding to the neutral position). In this modified arrangement, it is unnecessary to memorize the counted number in the brake activating routine program of FIG. 6, thereby making it possible to eliminate step S36.

Figure 9:
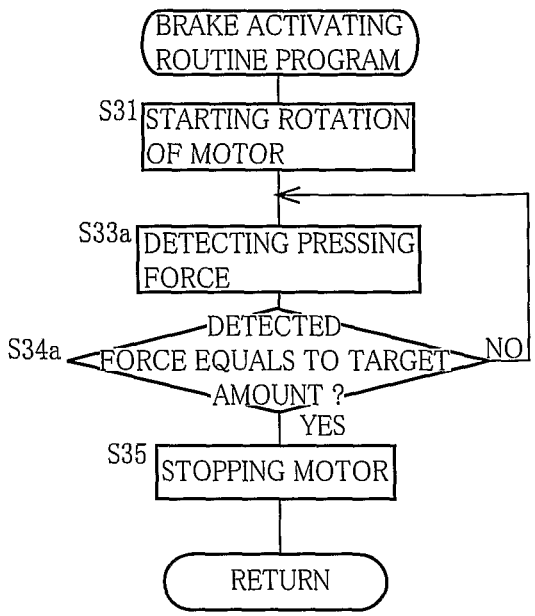
FIG. 9 is a flow chart showing a brake activating routine program as a sub-routine program of another parking brake control routine program that is stored in the above-described storage portion.
Figure 10:
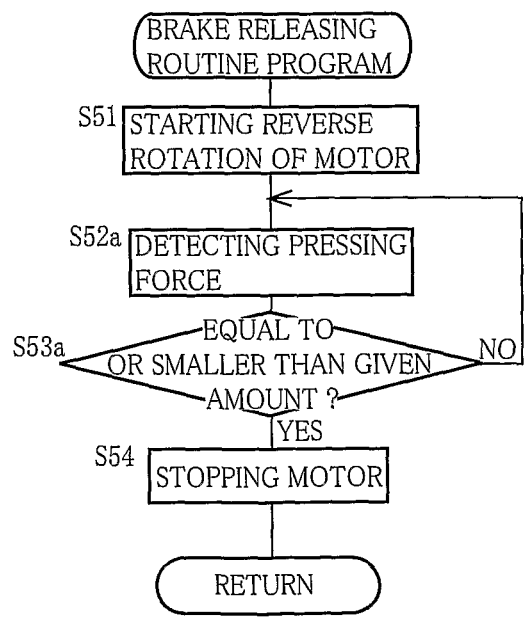
FIG. 10 is a flow chart showing a brake releasing routine program as another sub-routine program of the above-described another parking brake control routine program.

In the present embodiment, the electric current supplied to the electric motor 52 is controlled in execution of the brake activating routine program such that the value of the electric current flowing through the motor 52 reaches the target electric current value. However, the supplied electric current may be controlled in execution of the brake activating routine program such that the amount of pressing force detected by each of the pressing-force sensors 94, 96 reaches a target pressing force amount, and may be controlled in execution of the brake releasing routine program so as to rotate the motor 52 in the reverse direction until the amount of pressing force detected by each of the pressing-force sensors 94, 96 becomes substantially zero (i.e., an amount corresponding to the neutral position). FIGS. 9 and 10 are flow charts showing another parking brake control routine program as an example of this modified arrangement. The same step numerals will be used to represent steps having the same procedures as those in the above-described parking brake control routine program of FIGS. 6 and 7, and description of these steps will be omitted. In execution of the brake activating routine program shown in FIG. 9, after initiation of activation of the electric motor 52, steps S33a is implemented to cause the pressing-force sensor 94 to detect the pressing force (for example, when the shoe pressing rod 56 is moved leftward as seen in FIG. 3), and step S34a is implemented to judge whether the detected pressing force amount has reached the target pressing force amount.

Until the detected amount reaches the target amount, steps S33a and S34a are repeatedly implemented. When the detected amount has reached the target amount, step S35 is implemented to stop the motor 52. In execution of the brake releasing routine program shown in FIG. 10, after initiation of activation of the motor 52 in the reverse direction, step S52a is implemented to cause both of the pressing-force sensors 94, 96 to detect the pressing force, and step S54a is implemented to judge whether both of the detected pressing force amounts have reached substantially zero, namely, whether both of the detected pressing force amounts become not larger than a predetermined threshold amount that can be regarded as substantially zero. It is judged that the shoe pressing rod 56 has been returned when both of the detected pressing force amounts become not larger than the predetermined threshold amount, and step S54 is implemented to stop the motor 52. If the judgment as to whether the shoe pressing rod 56 has been returned to the neutral position is made based on only the amount detected by the pressing-force sensor 96, the shoe pressing rod 56 could be returned too much (could be erroneously moved to a right side of the neutral position). In this example of the modified arrangement in which the judgment is made based on both of the amounts detected by the pressing-force sensors 94, 96, the shoe pressing rod 56 can be returned reliably to the neutral position, because the motor 52 is controlled such that not only the amount detected by the pressing-force sensor 96 but also the amount detected by the pressing-force sensor 94 is not larger than the predetermined threshold amount.

In the above example of the modified arrangement, the judgment as to whether the shoe pressing rod 56 has been returned to the neutral position is made based on both of the amounts detected by the pressing-force sensors 94, 96. However, the judgment may be made by seeing if the amount detected by the pressing-force detector 96 is held not larger than the predetermined threshold amount for a predetermined length of time. That is, in this modified example, it is judged that the shoe pressing rod 56 has been returned to the neutral position when the amount detected by the pressing-force detector 96 had become not larger than the predetermined threshold amount and such a state of being not larger than the predetermined threshold amount has been maintained for at least the predetermined length of time.

Further, a stroke sensor may be provided for detecting a stroke movement of the shoe pressing rod 56, so that the activation of the electric motor 52 can be controlled based on the detected stroke movement such that an amount of the detected stroke amount reaches a target amount.

Further, the pressing device 50 may be otherwise modified. For example, while the electric motor 52 and the pressing mechanism are provided on one and the other of opposite sides of the backing plate 30, respectively, the motor 52 and the pressing mechanism may be provided on the same one of the opposite sides of the backing plate 30, if there is a space available for their provision. Further, a thread formed in each of the threaded portions 70, 72 may have a shape that is not particularly limited. For example, the thread may have a small lead angle or may be of an acme thread, so that the motion converting mechanism serves also as the above-described maintaining mechanism.

Figure 11:
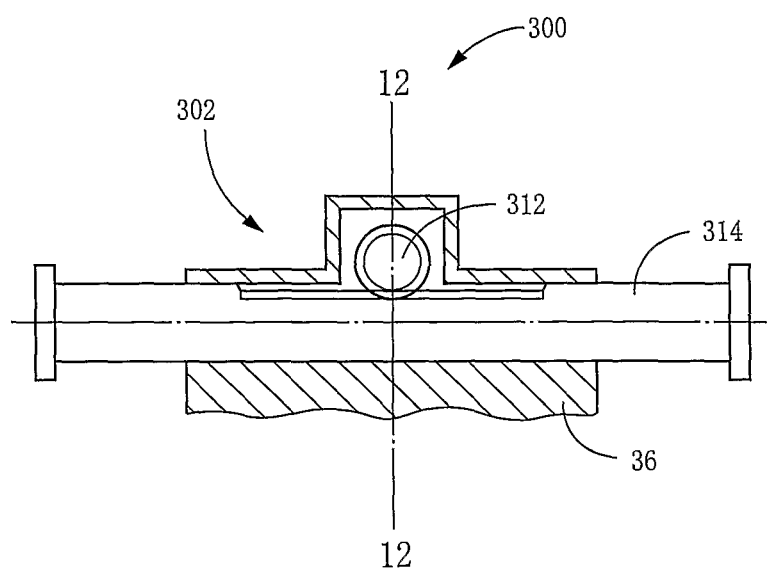
FIG. 11 is a cross sectional view showing another pressing device which can be provided, in place of the pressing device of FIG. 3, in the drum brake of FIG. 2.
Figure 12:
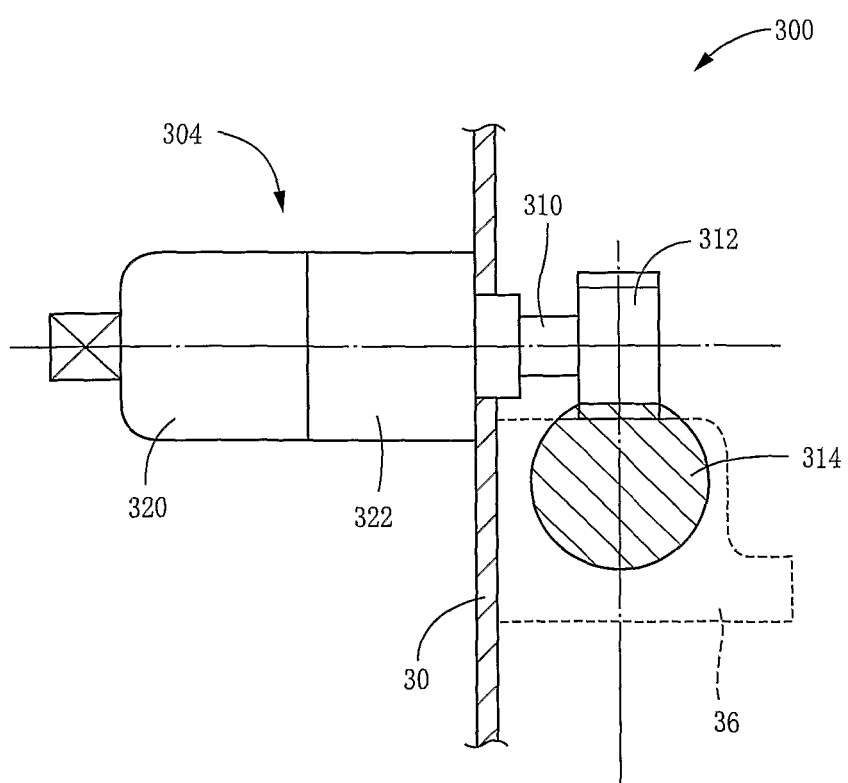
FIG. 12 is a cross sectional view taken along line 12-12 of FIG. 11.

FIGS. 11 and 12 show a pressing device 300 which can be provided, in place of the above-described pressing device 50, in each of the drum brakes 18, 20. The pressing device 300 includes: a motion converting mechanism 302 having a rack-pinion mechanism; a speed-reducer built-in motor 304 as the electric drive source; and a housing that is provided by the anchor member 36. The motion converting mechanism 302 includes: a pinion 312 which is provided by a spur gear and which is rotatable integrally with an output shaft 310 of the motor 304; and a rack 314 which is engaged with the pinion 312 and which is held by the anchor member 36 (that functions as the housing). The rack 314 is movable in its longitudinal direction relative to the anchor member 36, and is provided integrally with the shoe pressing rod. The motor 304 includes an electric motor 320 and a speed reducer 322 which may include a harmonic gear set or a planetary gear set and which functions also as the maintaining mechanism. Where the speed reducer 322 includes the planetary gear set having a sun gear and a carrier (carrying planetary gears), it is common that the sun gear is connected to the output shaft of the electric motor 320 while the carrier is connected to the output shaft 310 of the speed-reducer built-in motor 304. It is noted that the planetary gear set may be replaced with a planetary gear mechanism including a plurality of planetary gear sets.

Where the speed reducer 322 includes the harmonic drive set or the planetary gear set, it is possible to prevent the electric motor 320 from being rotated, even when a large force is applied to the motor 320 via the brake shoes 40a, 40b and the shoe pressing rod (rack) 314 in absence of an electric current supplied to the motor 320.

In this arrangement shown in FIGS. 11 and 12, it is not necessary that the shoe pressing rod (rack) 314 is provided with the above-described shoe engaging portions 74a, 74b since a preventer for preventing rotation of the shoe pressing rod 314 is not essential. In this arrangement, the motion converting mechanism 302 and the shoe pressing rod 314 cooperate with each other to constitute at least a part of the pressing mechanism. The shoe pressing rod 314 constitutes also a part of the motion converting mechanism 302. It is noted that the electric motor 320 may be provided by an ultrasonic motor. In such a case, the electric motor 320 serves also as the maintaining mechanism.

Figure 13:
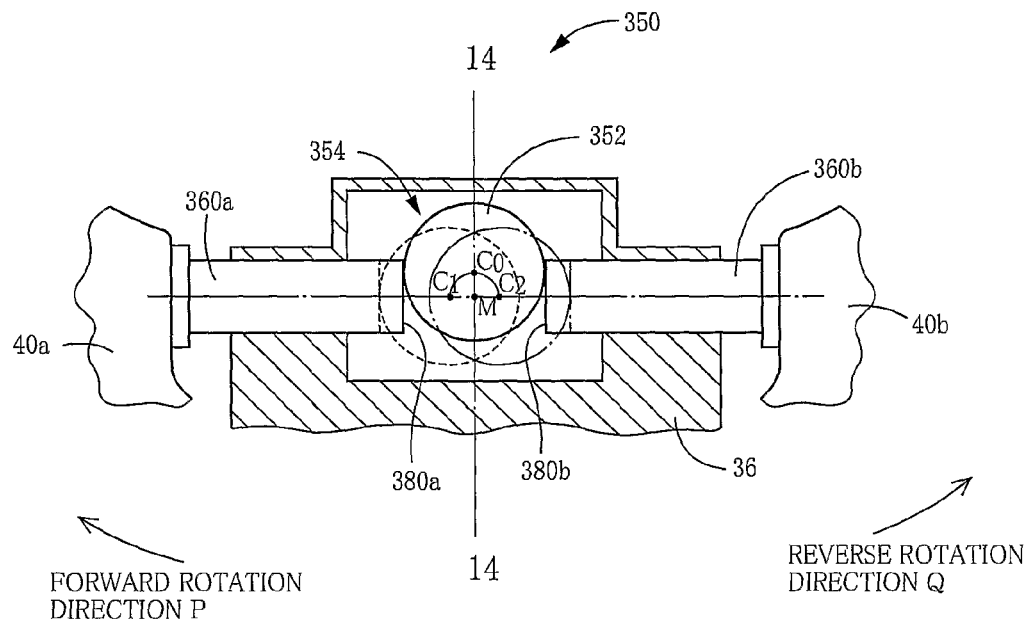
FIG. 13 is a cross sectional view showing still another pressing device which can be provided, in place of the pressing device of FIG. 3, in the drum brake of FIG. 2.
Figure 14:
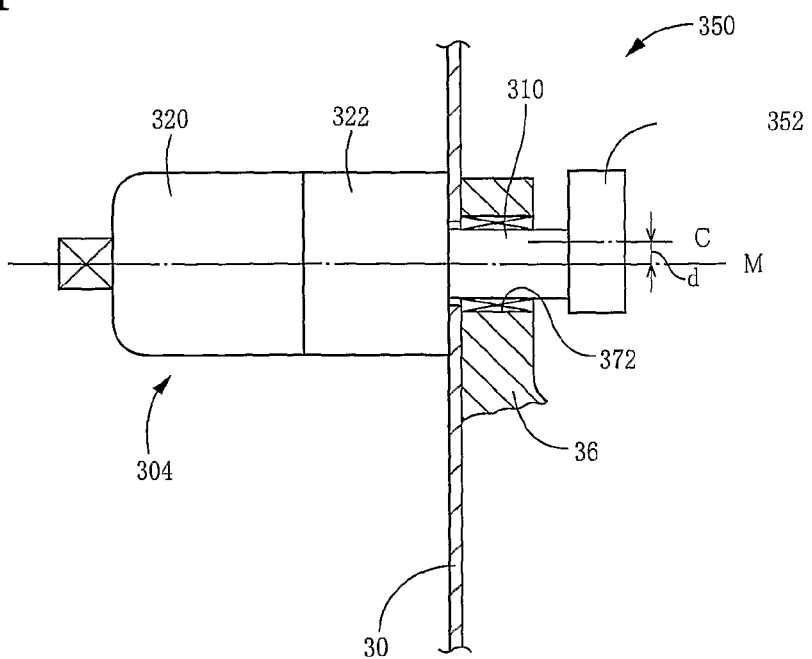
FIG. 14 is a cross sectional view taken along line 14-14 of FIG. 13.

FIGS. 13 and 14 show a pressing device 350 which can be provided, in place of the above-described pressing device 50, in each of the drum brakes 18, 20. The pressing device 350 includes: a motion converting mechanism 354 having an eccentric cam 352; and a pair of shoe pressing rods 360a, 360b. The anchor member 36 has a through-hole 372 extending therethrough in its thickness direction (i.e., a direction perpendicular to the backing plate 30 and parallel to an axle shaft of the vehicle), such that the output shaft 310 of the speed-reducer built-in motor 304 is relatively rotatably held in the through-hole 372 via a bearing. The eccentric cam 352 is provided integrally with the output shaft 310 so as to be rotatable together with the output shaft 310, such that a center C of the eccentric cam 352 is distant from an axis M of the output shaft 310 by a radial distance d as shown in FIG. 14. The pair of shoe pressing rods 360a, 360b are disposed to be opposed to an outer circumferential surface of the eccentric cam 352 as a cam surface of the cam 352, and are held by the anchor member 36, such that the shoe pressing rods 360a, 360b are movable in its axial direction relative to the anchor member 36.

As shown in FIG. 13, the eccentric cam 356 is positioned in a neutral position indicated by solid line in the non-effect state in which each of the parking brakes 18, 20 is not being in effect. While the eccentric cam 356 is positioned in the neutral position, the center C is positioned in a position $C_0$ lying on a center line of the motion converting mechanism 354, which line is located in a center of the mechanism 354 in the axial direction of the shoe pressing rods 360a, 360b, so that the center M of the output shaft 310 is distant from rear end surfaces 380a, 380b of the respective shoe pressing rods 360a, 360b by substantially the same distance. When the predicted torque application direction corresponds to the forward rotation direction P, the eccentric cam 352 is rotated to an angular position indicated by broke line as a result of rotation of the motor 304 upon activation of each of the parking brakes 18, 20, so that the center C is positioned in a position $C_1$ whereby the shoe pressing rod 360 is moved leftward so as to act directly on the left-sided brake shoe 40a and to apply a pressing force to the brake shoe 40a. In this instance, the eccentric cam 352 could be in contact at its outer circumferential surface with not only the rear end surface 380a of the shoe pressing rod 360a but also the rear end surface 380b of the shoe pressing rod 380b. However, the shoe pressing rod 360b is not moved rightward, and accordingly the shoe pressing rod 360b does not apply a pressing force to the right-sided brake shoe 40b. When the predicted torque application direction corresponds to the reverse rotation direction Q, the eccentric cam 352 is rotated to an angular position indicated by one-dot chain line as a result of reverse rotation of the motor 304 upon activation of each of the parking brakes 18, 20, so that the center C is positioned in a position $C_2$ whereby the shoe pressing rod 360 is moved rightward so as to act directly on the right-sided brake shoe 40b and to apply a pressing force to the brake shoe 40b. Upon release of each of the parking brakes 18, 20, the eccentric cam 352 is returned to the neutral position indicated by the solid line, whereby the brake shoes 40a, 40b and the shoe pressing rods 360a, 360b are returned to their neutral positions (non-acting positions) by the return spring 45.

Figure 18:
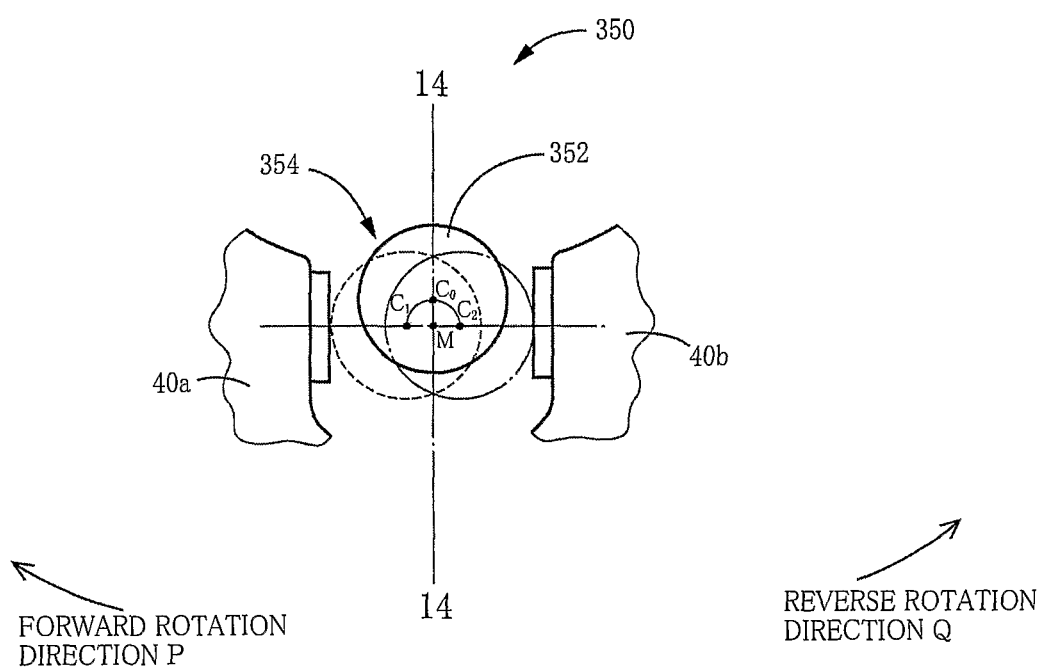
FIG. 18 is a cross sectional view showing a modification of the pressing device of FIG. 13.

In this arrangement shown in FIGS. 13 and 14, since the output shaft 310 of the speed-reducer built-in motor 304 is provided to extend throughout the through-hole 372 of the anchor member 36, the motion converting mechanism 354 can be disposed on one of opposite sides of the backing plate 30 in which the brake shoes 40a, 40b are disposed, even if a space defined on the same side is small. In this arrangement, the motion converting mechanism 354, shoe pressing rods 360a, 360b and anchor member 36 cooperate to constitute as least a part of the pressing mechanism. The eccentric cam 352 cooperates with a construction for axially movably holding the shoe pressing rods 360a, 360b, to constitute at least a part of the motion converting mechanism 354. It is noted that the eccentric cam 352 may be modified, as shown in FIG. 18, such that the cam 352 can be brought into contact at its outer circumferential surface with the brake shoes 40a, 40b so as to act directly on the brake shoes 40a, 40b and to apply a pressing force to each of the brake shoes 40a, 40b. In such a modification, the shoe pressing rods 360a, 360b can be eliminated. Further, the cam surface does not necessarily have to be provided by the outer circumferential surface, but may be provided by any other surface of the cam 352.

Figure 15:
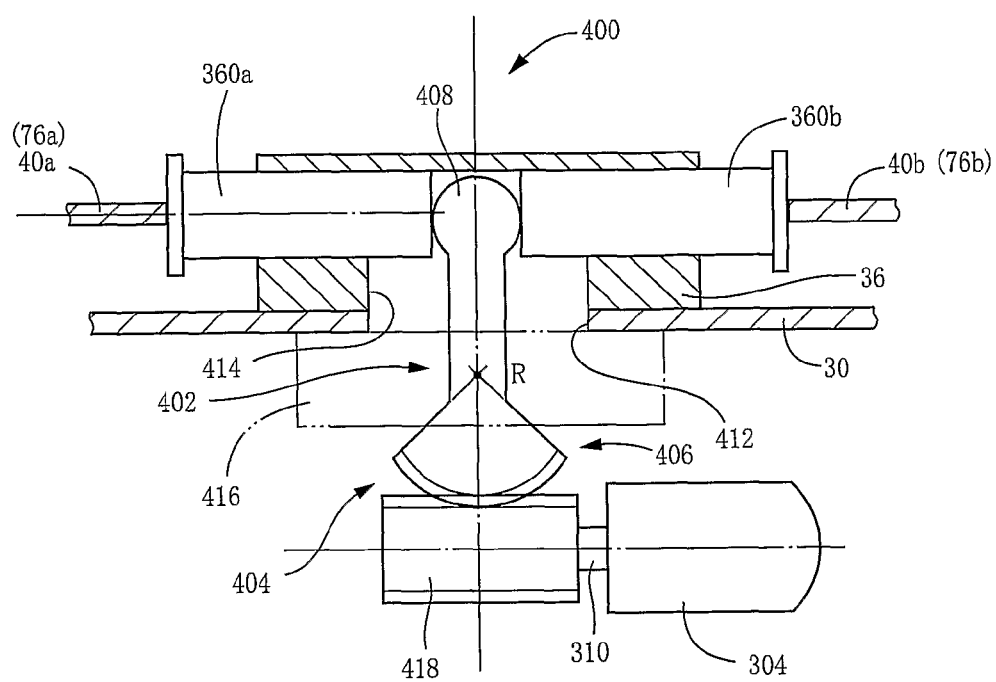
FIG. 15 is a cross sectional view showing still another pressing device which can be provided, in place of the pressing device of FIG. 3, in the drum brake of FIG. 2.

FIG. 15 shows a pressing device 400 which can be provided, in place of the above-described pressing device 50, in each of the drum brakes 18, 20. The pressing device 400 includes a motion converting mechanism 404 in addition to the pair of shoe pressing rods 360a, 360b. The motion converting mechanism 404 has a lever member 402 that is formed integrally with a sector gear (worm wheel) 406. The lever member 402 has a distal end portion 408 that is interposed between the shoe pressing rods 360a, 360b. The lever member 402 includes an intermediate portion extending to pass through elongated holes 412, 414 that are provided in the backing plate 30 and the anchor member 36, respectively. The lever member 402 is held by a lever-member holder 416 disposed on one of opposite sides of the backing plate 30 that is remote from the brake shoes 40a, 40b, and is pivotable about a pivot center R. The elongated holes 412, 414 cooperate with each other to constitute a guide portion for guiding the lever member 402. The sector gear 406 of the lever member 402 is engaged with a worm 418 that is rotatable integrally with the output shaft 310 of the speed-reducer built-in motor 304. Upon activation of each of the parking brakes 18, 20, the lever member 402 is pivoted by rotation of the speed-reducer built-in motor 304 whereby a selected one of the shoe pressing rods 360a, 360b is moved. When the lever member 402 is pivoted counterclockwise as seen in FIG. 15, the shoe pressing rod 360a is moved to apply a pressing force to the left-sided brake shoe 40a. When the lever member 402 is pivoted clockwise as seen in FIG. 15, the shoe pressing rod 360b is moved to apply a pressing force to the right-sided brake shoe 40b. Upon release of each of the parking brakes 18, 20, the lever member 402 is returned to a neutral position (neutral posture) by reverse rotation of the speed-reducer built-in motor 304, whereby the brake shoes 40a, 40b and the shoe pressing rods 360a, 360b are returned to their neutral positions (non-acting positions) by the return spring 45. In this arrangement shown in FIG. 15, the motion converting mechanism 404, shoe pressing rods 360a, 360b and anchor member 36 cooperate to constitute as least a part of the pressing mechanism The shoe pressing rods 360a, 360b may be provided by a single rod, so as to be movable integrally with each other. It is noted that the lever member 402 may be modified such that the lever member 402 can be brought into contact at its distal end portion 408 with the brake shoes 40a, 40b so as to act directly on the brake shoes 40a, 40b and to apply a pressing force to each of the brake shoes 40a, 40b. In such a modification, the shoe pressing rods 360a, 360b can be eliminated. Further, where the worm 418 and the sector gear 406 cooperate with each other to have a non-reversible characteristic, the worm 418 and the sector gear 406 cooperate with each other to function also as the maintaining mechanism. In such a case, the speed reducer 322 does not necessarily have to include a gear set having a non-reversible characteristic. Further, the speed reducer as such is not essential.

The brake system incorporating the duo-servo drum brakes, which is constructed according to the above-described embodiment, may be adapted to serve as a service brake system. For example, a pressing force can be applied to the primary shoe by activating the electric motor in response to a command requesting activation of service brakes.

Figure 16:
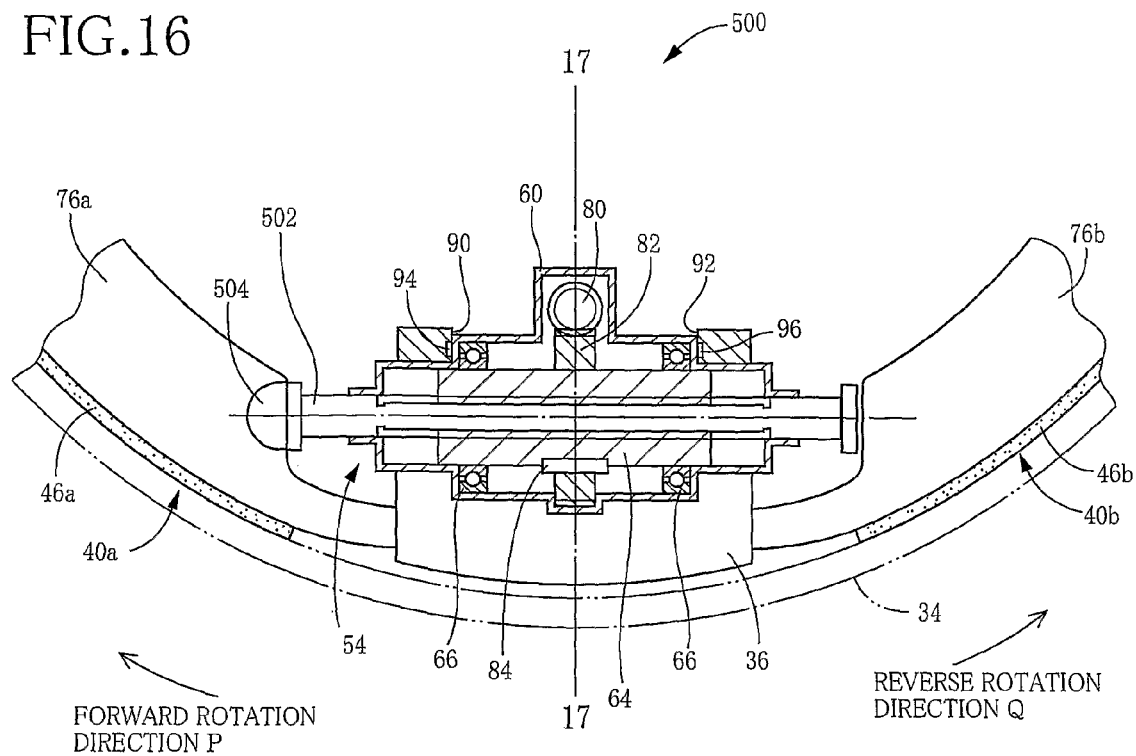
FIG. 16 is a cross sectional view showing still another pressing device which can be provided, in place of the pressing device of FIG. 3, in the drum brake of FIG. 2.
Figure 17:
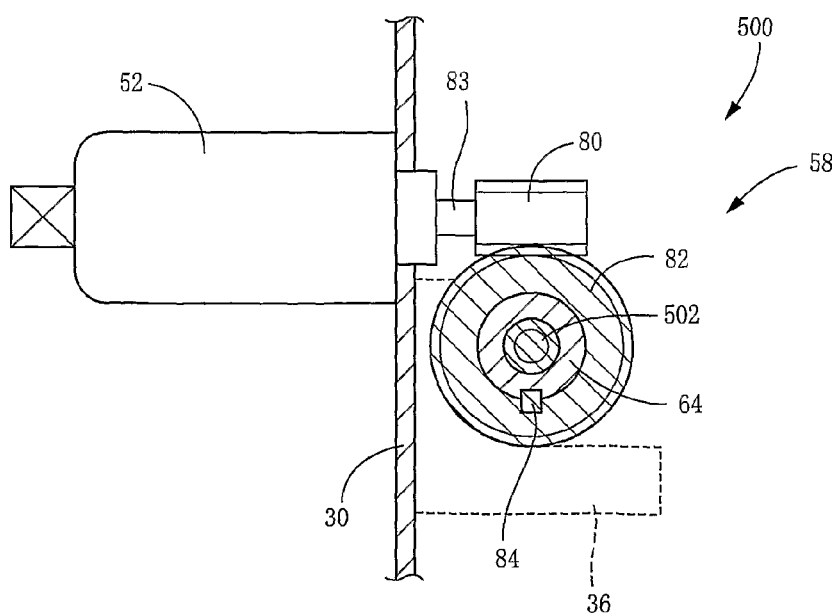
FIG. 17 is a cross sectional view taken along line 17-17 of FIG. 16.

FIGS. 16 and 17 show a pressing device 500 which can be provided, in place of the above-described pressing device 50, in each of the drum brakes 18, 20, so that each of the drum brakes 18, 20 works as an uni-servo drum brake rather than as a duo-servo drum brake. The pressing device 500 is substantially identical in construction with the pressing device 50, except for a shoe pressing rod 502 serving as a movable member. A shoe engaging portion 504 is provided in one of opposite end portions of the shoe pressing rod 502 that is close to the right-sided brake shoe 40a, while no engaging portion is provided in the other of the opposite end portions of the shoe pressing rod 502. In this arrangement shown in FIGS. 16 and 17, the shoe pressing rod 502 does not act directly on the right-sided brake shoe 40b and accordingly does not apply a pressing force to the brake shoe 40b. When operation of the locking operation portion of the parking brake switch 214 is detected, the electric motor 52 is activated without predicting the torque application direction, such that the shoe pressing rod 502 is moved leftward so as to be brought into contact with the brake shoe 40a and to act directly on the brake shoe 40a, whereby a pressing force is applied to the left-sided brake shoe 40a. The pressing force thus applied to the left-sided brake shoe 40a constitutes a circumferential force, and is transmitted to the right-sided brake shoe 40b via the adjuster 38, so that the right-sided brake shoe 40b is pressed against the anchor member 36. When a torque is applied to each of the wheels 14, 16 in the forward rotation direction P during this brake-effect state, since the right-sided brake shoe 40b serving as the secondary shoe is held in contact with the anchor member 36, the brake shoes 40a, 40b are restrained from being moved in the circumferential direction, thereby making it possible to satisfactorily restrain reduction of the braking force. When a torque is applied to each of the wheels 14, 16 in the reverse rotation direction Q during this brake-effect state, since the left-sided brake shoe 40a serving as the secondary shoe is held in contact with the shoe pressing rod 502, the brake shoes 40a, 40b are restrained from being moved in the circumferential direction, thereby making it possible to restrain reduction of the braking force. Further, in this arrangement shown in FIGS. 16 and 17, the left-sided brake shoe 40a, to which the pressing force is applied, serves as the primary shoe when the torque is applied to each of the wheels 14, 16 in the forward rotation direction P. Therefore, there is an advantage that a large braking force can be obtained when each of the parking brakes 18, 20 is activated during a forward running of the vehicle. It is noted that the pressing device 500 may be replaced with any one of the above-described pressing devices 50, 300, 350, 400.

Figure 19:
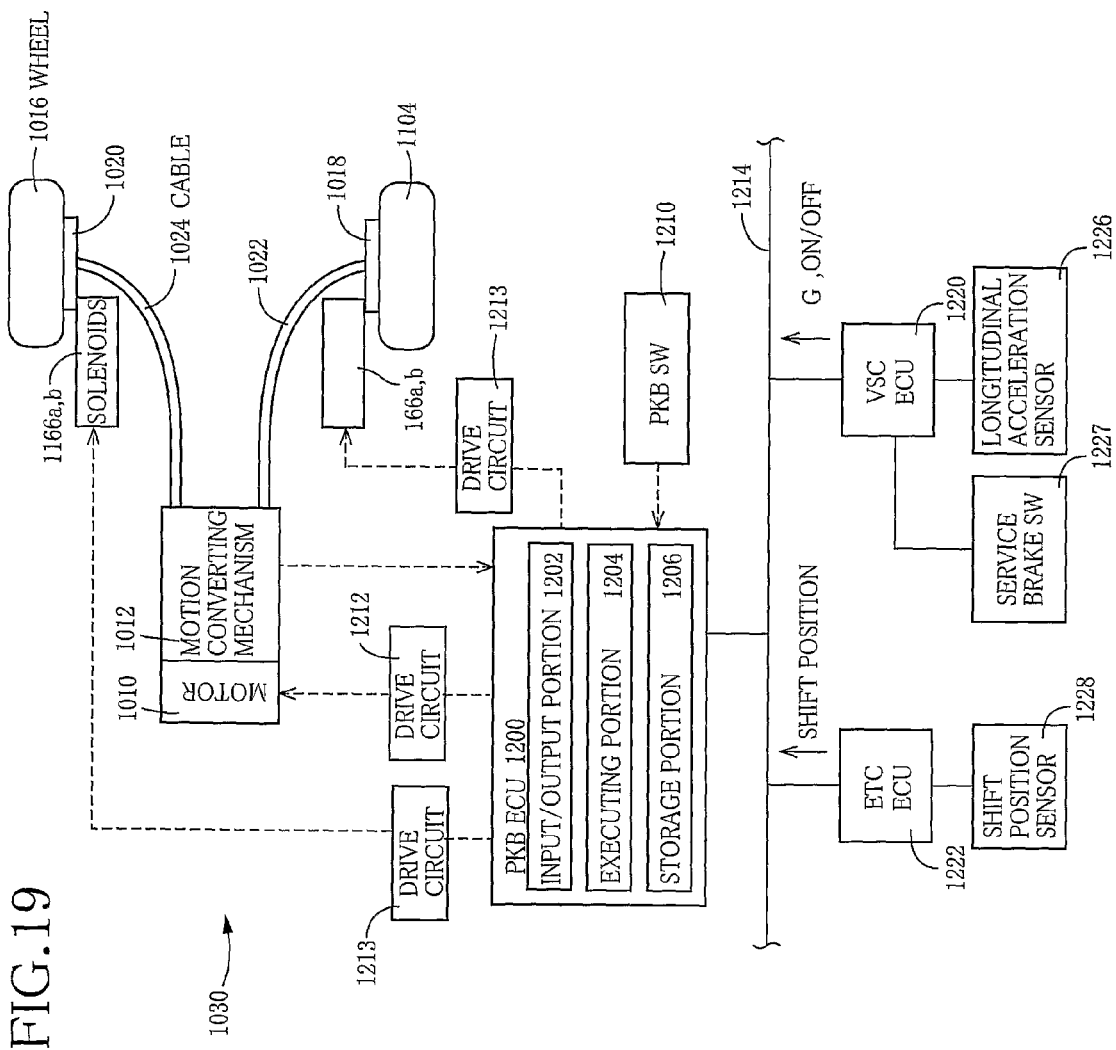
FIG. 19 is a view showing an overall construction of a parking brake system according to another embodiment of the present invention.

Referring next to FIGS. 19-34, there will be described a parking brake system constructed according to another embodiment of the invention. In FIG. 19, reference signs 1010, 1012 denote an electric motor and a clutch built-in type motion converting mechanism, respectively. The clutch built-in type motion converting mechanism 1012 is configured to convert a rotary motion that is to be given from an output shaft 1052 of the electric motor 1010, into a linear motion that is to be given to an output member, and to prevent the electric motor 1010 from being rotated by a force applied to the output member. Further, reference signs 1016, 1014 denote rear right and rear left wheels of a vehicle, respectively, and reference signs 1018, 1020 denote drum brakes that are provided for the respective wheels 1014, 1016. The parking brakes 1018, 1020 are connected to the motion converting mechanism 1012 via respective cables 1022, 1024, respectively. When the cables 1022, 1024 are pulled by activation of the electric motor 1010, each of the parking brakes 1018, 1020 comes into effect. In the present embodiment, the electric motor 1010, motion converting mechanism 1012, cables 1022, 1024 and drum brakes 1018, 1020 cooperate to constitute at least a part of an electrically-operated parking brake mechanism 1030.

Figure 20:
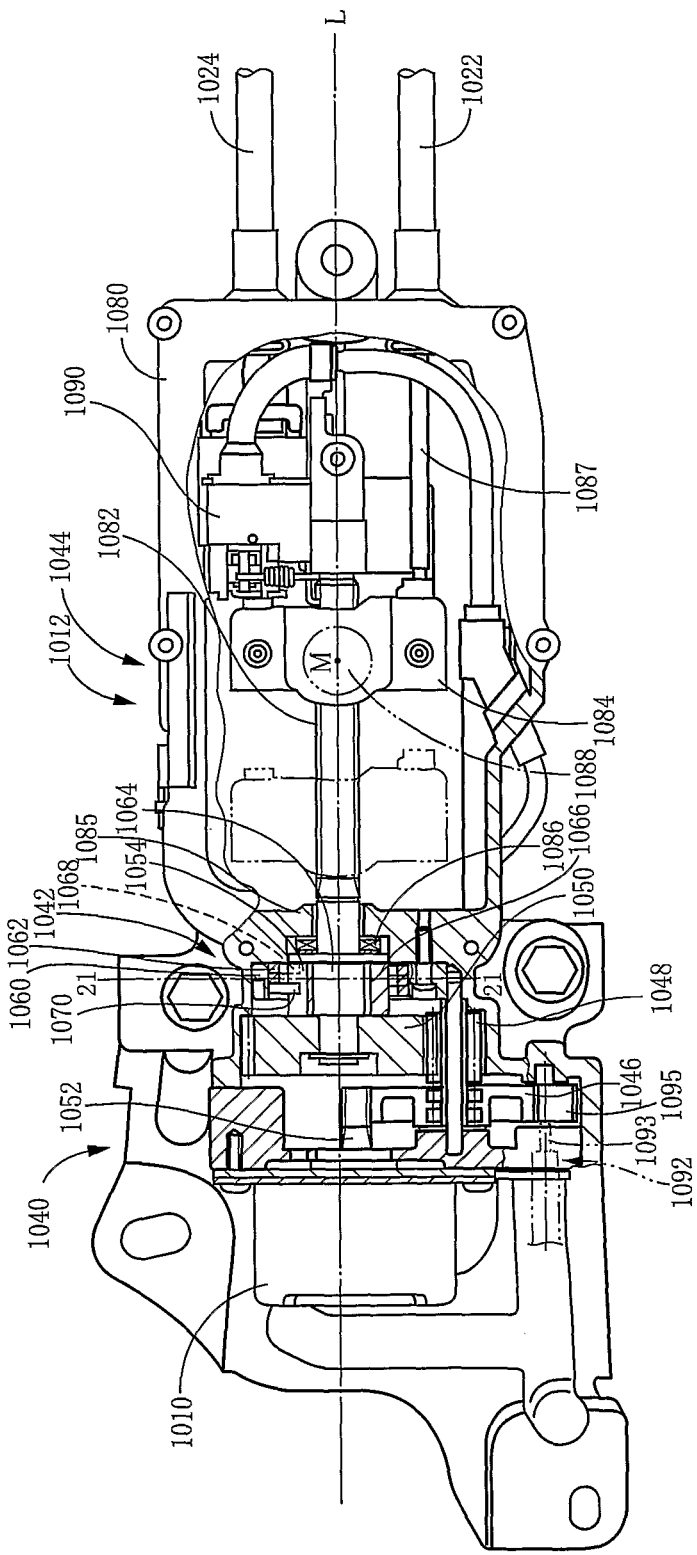
FIG. 20 is a view showing, partially in cross section, an electric motor and a motion converting mechanism that are incorporated in the parking brake system of FIG. 19.
Figure 21:
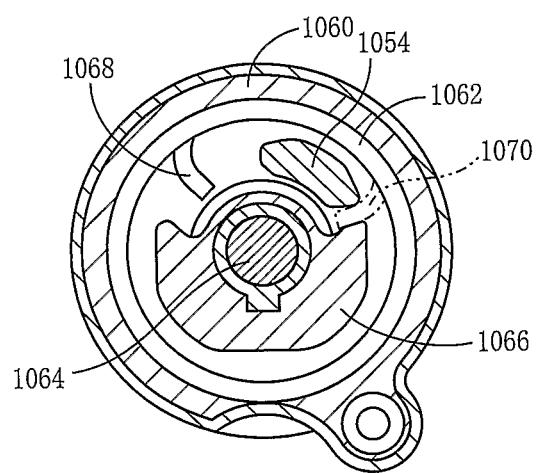
FIG. 21 is a cross sectional view taken along line 21-21 of FIG. 20 and showing a cross section of a clutch that is included in the motion converting mechanism.

As shown in FIG. 20, the clutch built-in type motion converting mechanism 1012 includes a gear train 1040, a clutch 1042 and a screw mechanism 1044. The gear train 1040 consists of a plurality of gears 1046, 1048, 1050. The output shaft 1052 of the electric motor 1010 includes a toothed portion that meshes with the gear 1046, so that rotation of the output shaft 1052 is transmitted to the gear 1050 via the gears 1046, 1048. A drive transmission portion 1054 is provided to axially protrude from one of opposite end surfaces of the gear 1050 that is remote from the electric motor 1010. The clutch 1042 is provided by a one-way clutch, and includes: a housing 1060; a coil spring 1062 disposed on an inner peripheral side of the housing 1060; and a rotor 1066 rotatable integrally with an output shaft 1064 of the clutch 1042. The coil spring 1062 is fitted in the housing 1060 while being slightly compressed in its radial direction in an elastic manner, so that an outer circumferential surface of the coil spring 1062 is held in close contact with an inner circumferential surface of the housing 1060. A wire of the coil spring 1062 has opposite end portions 1068, 1070 which protrude inwardly in the radial direction.

The drive transmission portion 1054 is located in one of two spaces which are circumferentially defined between the two end portions 1068, 1070, while the rotor 1066 is located in the other of the two spaces.

When the gear 1050 is rotated by rotation of the electric motor 1010, the drive transmission portion 1054 is brought into contact with one of the opposite end portions 1068, 1070 of the wire, so as to rotate the one of the opposite end portions 1068, 1070 in a direction that increases the number of turns of the wire (i.e., in a direction that reduces a diameter of the coil spring 1062), whereby a friction between the outer circumferential surface of the coil spring 1062 and the inner circumferential surface of the housing 1060 is reduced. As a result of the reduction of the friction, the coil spring 1062 and the rotor 1066 are made rotatable, whereby the output shaft 1064 is rotated together with the gear 1050. Thus, the rotation of the motor 1010 is transmitted to the output shaft 1064 through the clutch 1042. When a torque is applied to the output shaft 1064 without an electric current being supplied to the motor 1010, the rotor 1066 is brought into contact with one of the opposite end portions 1068, 1070 of the wire, so as to rotate the one of the opposite end portions 1068, 1070 in a direction that reduces the number of turns of the wire (i.e., in a direction that increases the diameter of the coil spring 1062), whereby the friction between the outer circumferential surface of the coil spring 1062 and the inner circumferential surface of the housing 1060 is increased. Thus, the torque applied to the output shaft 1064 is inhibited, by the clutch 1042, from being transmitted to the gear 1050, so that the electric motor 1010 is not rotated by the torque applied to the output shaft 1064 in absence of the electric current supplied to the motor 1010.

The screw mechanism 1044 includes: a housing 1080; an externally threaded member 1082 extending in a direction parallel to an axis L of the output shaft 64; an internally threaded member or nut (not shown) held in thread engagement with the externally threaded member 1082; and an equalizer 1084 attached to the nut and pivotable about a pivot axis M relative to the nut. The externally threaded member 1082 is rotatably supported by the housing 1080 via a pair of radial bearings 1085 (one of the radial bearings 1085 is not shown) and a needle thrust bearing 1086. The equalizer 1084 has arms to which inner cables 1087 of the respective cables 1022, 1024 are connected. An engaging protrusion 1088 is provided in a main body of the equalizer 1084, so as to be engaged with a guide (not shown) which is provided in the housing 1080 and which extends in parallel to the axis L. Owing to the engagement of the engaging protrusion 1088 with the guide, the equalizer 1084 is, relative to the housing 1080, unrotatable about the axis L, movable in a direction parallel to the axis L and pivotable about the axis M (i.e., about the engaging protrusion 1088).

The equalizer 1084 is movable relative to the housing 1080 between two positions, which are indicated by solid line and two-dot chain line, respectively, in FIG. 20. By the relative movement of the equalizer 1084 relative to the housing 1080, the inner cables 1087 of the respective cables 1022, 1024 are pulled and slackened. Further, the equalizer 1084 is pivoted about the axis M (i.e., about the engaging protrusion 1088) such that a tension applied to the inner cable 1087 of the cable 1022 (hereinafter simply referred to as "tension applied to the cable 1022) and a tension applied to the inner cable 1087 of the cable 1024 (hereinafter simply referred to as "tension applied to the cable 1024) are equalized to each other. A tension sensor 1090 is provided inside the housing 1080 so as to detect the tension applied to the cable 1024. Since the tensions respectively applied to the cables 1022, 1024 are equalized to each other by the equalizer 1084, the tension sensor 1090 practically detects the tension applied to the cable 1022 as well as the tension applied to the cable 1024. An emergency releasing device 1092 is provided to release the parking brakes 1018, 1020, for example, in the event of abnormality occurring in the motor 1010. The emergency releasing device 1092 includes a cable 1093 and a gear 1095. In operation of the emergency releasing device 1092, the cable 1093 is pushed into an inner portion of the gear 1095, and the gear 1095 is rotated by manually rotating a grip (not shown). The rotation of the gear 1095 is transmitted to the gear 1050 via the gears 1046, 1048, and then the rotation of the gear 1050 causes the equalizer 1084 to be moved in a direction that causes the cables 1022, 1024 to be slackened, for thereby releasing the parking brakes 1018, 1020.

Figure 22:
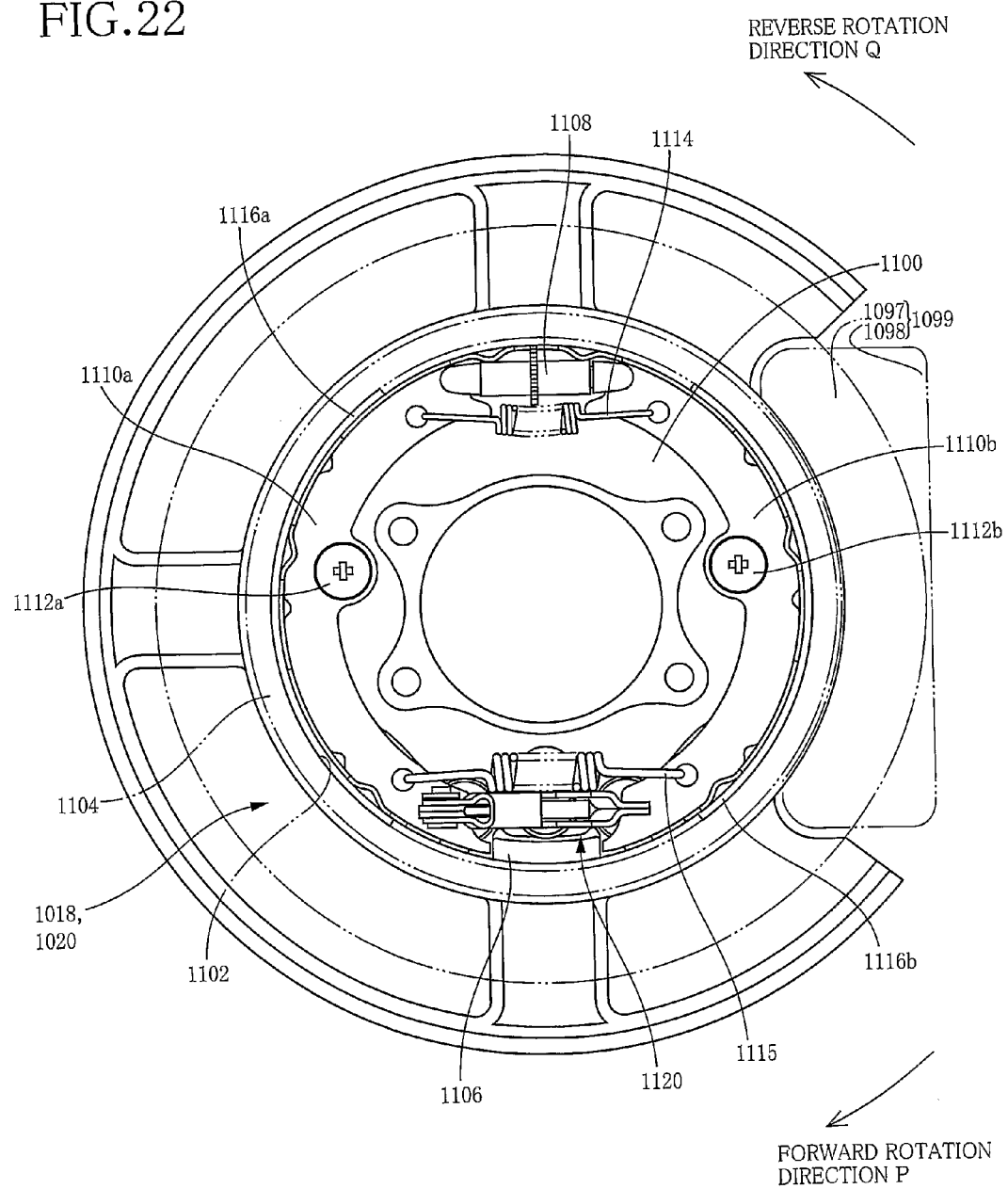
FIG. 22 is a plan view showing a drum brake that is incorporated in the parking brake system of FIG. 19.
Figure 23:
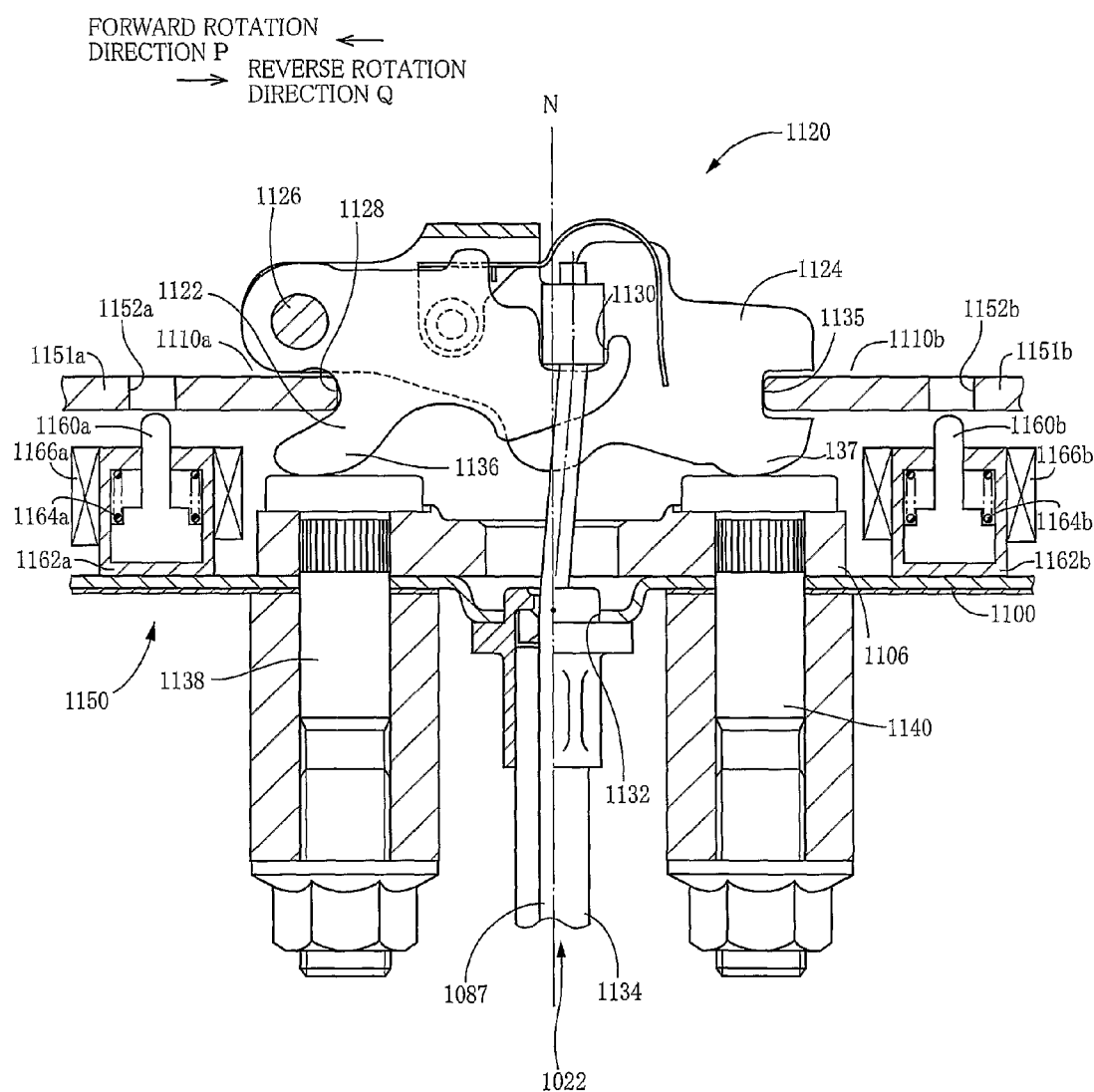
FIG. 23 is a front view showing, partially in cross section, a pressing device and a movement restraining mechanism that are provided in the drum brake.

As shown in FIGS. 22 and 23, in the present embodiment, each of the parking brakes 1018, 1020 is a duo-servo drum brake. Therefore, each of the parking brakes 1018, 1020 will be hereinafter referred to as a drum brake where appropriate. In FIG. 22, reference signs 1097, 1098 denote a brake disk and a caliper, respectively, which cooperate with each other to constitute a disk brake 1099 serving as a service brake. Each of the drum brakes 1018, 1020 serving as the parking brake is disposed on an inner peripheral side of the brake disk 1097, so as to cooperate with the disk brake 1099 to constitute a so-called "drum in disk brake" in the present embodiment. Since the drum brakes 1018, 1020 are identical in construction with each other, the drum brake 1018 will be described while the drum brake 1020 will not be described.

The drum brake 1018 has a backing plate 1100 and a rotary drum 1104. The backing plate 1100 as a non-rotary body is attached to a body (not shown) of the vehicle. The drum 1104 has an inner circumferential surface that serves as a friction surface 1102, and is rotatable together with the wheel. An anchor member 1106 and an adjuster 1108 (that serves as a transmitting member) are provided in two portions of the backing plate 1100 which are spaced apart from each other in a direction of diameter of the backing plate 1100. The anchor member 1106 is fixed to the backing plate 1100 while the adjuster 1108 is of a so-called float type. Between the anchor member 1106 and the adjuster 1108, a pair of arcuate-shaped brake shoes 1110a, 1110b are disposed to be opposed to the inner circumferential surface of the drum 1104. The pair of brake shoes 1110a, 1110b are attached to the backing plate 1100 through respective shoe hold-down devices 1112a, 1112b such that the brake shoes 1110a, 1110b are movable along a surface of the backing plate 1100. The backing plate 1100 has, in its central portion, a through-hole that is provided for allowing an axle shaft (not shown) to pass therethrough.

Each of the brake shoes 1110a, 1110b has opposite end portions, one of which can be referred to as a transmitting-member-side end portion and the other of which can be referred to as an anchor-member-side end portion. The transmitting-member-side end portions of the respective brake shoes 1110a, 1110b are operatively connected to each other through the adjuster 1108, while the anchor-member-side end portions of the respective brake shoes 1110a, 1110b are in contact with the anchor member 1106, such that the brake shoes 1110a, 1110b are pivotably held by the adjuster 1108 and the anchor member 1106. Each of the transmitting-member-side end portions of the respective brake shoes 1110a, 1110b is biased or forced, by an adjuster spring 1114, in a direction toward the adjuster 1108. Each of the anchor-member-side end portions of the respective brake shoes 1110a, 1110b is biased or forced, by a return spring 1115, in a direction toward the anchor member 1106. The brake shoes 1110a, 1110b have respective outer circumferential surfaces on which respective brake linings 1116a, 1116b serving as friction material members are disposed, so that a friction force is generated between the friction surface 1102 of the drum 1104 and each of the brake linings 1116a, 1116b upon contact with each of the brake linings 1116a, 1116b with the friction surface 1102 of the drum 1104. The adjuster 1108 is operated to adjust a clearance between the drum 1104 and each of the brake linings 1116a, 1116b, as needed, depending on degree of wear of the brake shoes 1110a, 1110b. The adjuster 1108 functions as a transmitting member configured to transmit a circumferential force applied to one of the brake shoes 1110a, 1110b, to the other of the brake shoes 1110a, 1110b.

FIG. 23 shows a pressing device 1120 including a brake lever 1122 and a strut 1124. The brake lever 1122 and the strut 1124 are supported by head portions of respective bolts 1138, 1140 that are provided to fix the anchor member 1106 to the backing plate 1100, such that the brake lever 1122 and the strut 1124 are movable relative to the bolts 1138, 1140. The brake lever 1122 is provided by a plate-like member interposed between two plate-like members that cooperate with each other to constitute the strut 1124. The brake lever 1122 and the strut 1124 are connected at their respective end portions through a connecting shaft 1126, and are pivotable about the connecting shaft 1126 relative to each other. The brake lever 1122 has an engaging portion 1128 which is distant from the connecting shaft 1126 and located between the connecting shaft 1126 and the backing plate 1100. The brake lever 1122 has another engaging portion 1130 which is distant from the connecting shaft 1126 in a direction parallel to the backing plate 1100. The brake lever 1122 is engaged at the engaging portion 1128 with the left-sided brake shoe 1110a, and is connected at the engaging portion 1130 to the inner cable 1087 of the cable 1022. The inner cable 1087 is guided by an outer tube 1134 fixed at its end portion to a through-hole 1132 that is provided in the backing plate 1100, and extends toward one of opposite sides of the backing plate 1100 that is remote from the brake shoes 1110a, 1110b. The strut 1124 has an engaging portion 1135 provided by one of its opposite end portions that is remote from the connecting shaft 1126. The strut 1124 is engaged at the engaging portion 1135 with the right-sided brake shoe 1110b. The engaging portion 1130 of the brake lever 1122 is positioned on a front side of a center line N of the through-hole 1132 as seen in the reverse rotation direction Q, in a state shown in FIG. 23. Although the engaging portion 1130 is relatively moved upon relative movement of the pressing device 1120 in a circumferential direction, it is designed that the engaging portion 1130 of the brake lever 1122 is not relatively moved to on a rear side of the center line N as seen in the reverse rotation direction Q. It is noted that the center line N may be considered also as a center line of a fixed end of the cable 1022 at which the cable 1022 is connected to the backing plate 1100.

Figure 24:
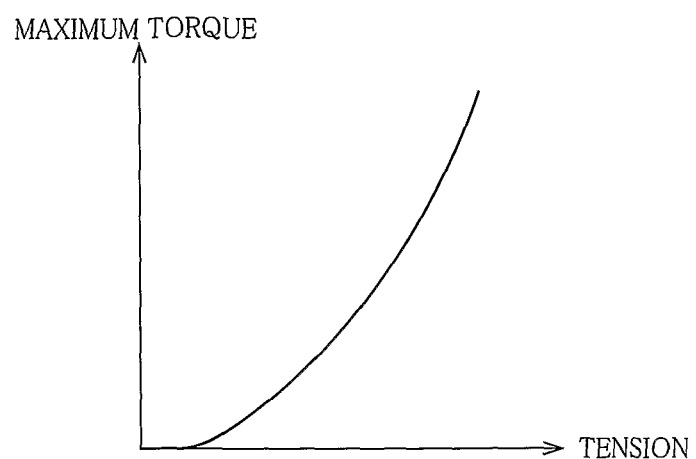
FIG. 24 is a view showing a relationship between a cable tension and a maximum torque against which a wheel can be braked.

The pressing device 1120 are supported at its supported portions 1136, 1137 by the head portions of the respective bolts 1138, 1140. When the inner cable 1087 is pulled, the brake lever 1122 is pivoted about a contact point at which the supported portion 1136 and the head portion of the bolt 1138 are held in contact with each other. As a result of the pivot motion of the brake lever 1122, the connecting shaft 1126 and the strut 1124 are moved rightward as seen in FIG. 23, whereby the right-sided brake shoe 1110b is pressed rightward by the strut 1124. In this instance, a reaction is applied from the brake shoe 1110b to the strut 1124 and is transmitted to the left-sided brake shoe 1110a via the strut 1124, connecting shaft 1126 and brake lever 1122, whereby the left-sided brake shoe 1110a is pressed leftward as seen in FIG. 23. The brake shoes 1110a, 1110b receives respective spreading forces that are the same in amount, so that the brake linings 1116a, 1116b are pressed against the inner circumferential surface 1102 of the drum 1104 by respective forces that are the same in amount. A tension applied to the cable 1022 is boosted according to a lever ratio of the brake lever 1122, so that the amount of each of the spreading forces applied to the respective brake shoes 1110a, 1110b is dependent on an amount of the boosted force. Specifically described, the amount of each of the spreading forces corresponds to an amount obtained by subtracting amounts of frictions generated between the supported portions 1136, 1137 and the bolts 1138, 1140 from the amount of the boosted force. In this instance, there is a certain relationship between the pressing force and a maximum torque against which the wheel can be braked. Based on this relationship, it is possible to obtain a relationship, as shown in FIG. 24, between the tension applied to each of the cables 1022, 1024 and the maximum torque against which the wheel can be braked. A target amount of the tension is determined based on the relationship of FIG. 24, and the electric current supplied to the motor 1010 is controlled such that an actual amount of the tension becomes equal to the target amount of the tension.

A movement restraining mechanism 1150 is provided in vicinity of the anchor member 1106. This movement restraining mechanism 1150 is configured to restrain a selected one of the brake shoes 1110a, 1110b from being moved in a direction away from the anchor member 1106. The webs 1151a, 1151b of the respective brake shoes 1110a, 1110b have respective engaging holes 1152a, 1152b as engaging portions. The movement restraining mechanism 1150 includes: a pair of movement restraining members in the form of pins (engaging rods) 1160a, 1160b that are provided for the respective engaging holes 1152a, 1152b; a restraining member holder including a pair of holder portions in the form of housings 1162a, 1162b accommodating the respective pins 1160a, 1160b such that each of the pins 1160a, 1160b accommodated in a corresponding one of the housings 1162a, 1162b is linearly movable between its engaging and disengaging positions relative to the corresponding one of the housings 1162a, 1162b in a direction perpendicular to the backing plate 1100; a pair of forcing members in the form of springs 1164a, 1164b biasing or forcing the respective pins 1160a, 1160b toward their respective disengaging positions (reverse ends); and a pair of electric drive sources including solenoids 1166a, 1166b. The housings 1162a, 1162b are fixedly disposed in respective portions of the backing plate 1100, which positionally correspond to the engaging holes 1152a, 1152b of the respective brake shoes 1110a, 1110b during the non-effect state. Each of the solenoids 1166a, 1166b is configured to generate an electromagnetic drive force forcing a corresponding one of the pins 1160a, 1160b, against a biasing force generated by a corresponding one of the springs 1164a, 1164b, in a direction away from the disengaging position toward the engaging position. Thus, each of the pins 1160a, 1160b is positioned in the disengaging position by the biasing force of a corresponding one of the springs 1164a, 1164b when the electric current is not supplied to a corresponding one of the solenoids 1166a, 1166b, and is moved to the engaging position by the electromagnetic drive force of a corresponding one of the solenoids 1166a, 1166b when the electric current is supplied to the corresponding one of the solenoids 1166a, 1166b. Each of the engaging holes 1152a, 1152b has a shape and a size, which restrain a corresponding one of the brake shoes 1110a, 1110b from being moved in a direction away from the anchor member 1106 and which allow the corresponding one of the brake shoes 1110a, 1110b from being moved in a direction toward the anchor member 1106, when a corresponding one of the pins 1160a, 1160b is being engaged with the each of the engaging holes 1152a, 1152b. Consequently, even when each of the pins 1160a, 1160b is being engaged with a corresponding one of the engaging holes 1152a, 1152b, a corresponding one of the brake shoes 1110a, 1110b is allowed to be satisfactorily moved in a direction toward the anchor member 1106 upon application of a torque thereto.

Each of the above-described engaging holes 1152a, 1152b and pins 1160a, 1160b may be modified to have an anchor-side portion that is defined by an inclined surface. In this modified arrangement, the brake shoes 1110a, 1110b are further satisfactorily restrained from being moved away from the anchor member 1106, with engagement of the pins 1160a, 1160b with the engaging holes 1152a, 1152b.

As shown in FIG. 19, the electric motor 1010 and the solenoids 1166a, 1166b of the movement restraining mechanism 1150 are controlled in accordance with commands supplied from a parking brake ECU (PKBECU) 1200, which is constituted principally by a computer and includes an input/output portion 1202, an executing portion 1204 and a storage portion 1206. To the input/output portion 1202, there are connected a parking brake switch 1210 operable by the vehicle driver, the above-described tension sensor 1090 (see FIG. 20), the above-described electric motor 1010 (as an actuator of the electrically-operated parking brakes 1018, 1020) via a drive circuit 1212, and the above-described solenoids 1166a, 1166b via respective drive circuits 1213. The parking brake ECU 1200 is connected, via a CAN (Car Area Network) 1214, to other computers provided in the vehicle such as a slip control ECU (VSCECU) 1220 and an engine transmission ECU (ETCECU) 1222. To the slip control ECU 1220, there are connected a longitudinal acceleration sensor 1226 as a slop detector and a service brake switch 1227, for example. To the engine transmission ECU 1222, there is connected a longitudinal acceleration sensor 1226 as a slop detector, for example. Thus, information such as an actual longitudinal acceleration, state of the service brake switch 1227 and a current shift position is supplied to the parking brake ECU 1200 via the slip control ECU 1220, engine transmission ECU 1222 and CAN 1214.

The parking brake switch 1210 is to be operated for commanding activation (hereinafter referred to as "locking" where appropriate) of the parking brakes 1018, 1020 and also for commanding release of the parking brakes 1018, 1020. For example, the parking brake switch 1210 may have a locking operation portion and a releasing operation portion. When the locking operation portion is operated, it is judged that there is issued a command requesting activation or locking of the parking brakes 1018, 1020. When the releasing operation portion is operated, it is judged that there is issued a command requesting release of the parking brakes 1018, 1020. The longitudinal acceleration sensor 1226 is provided to detect an acceleration of the vehicle in the longitudinal direction. The service brake switch 1227 is placed in its ON state when a service brake operating member (not shown) is being operated, and is placed in its OFF state when the service brake operating member is not being operated. The service brakes 1099 can be effective when the service brake operating member is being operated. In this sense, the service brake switch 1227 can be considered as a switch for detecting effect state of the service brakes 1099. For example, where the caliper 1098 is to be operated by a brake cylinder, the service brake switch 1227 may be arranged to detect a hydraulic pressure of the brake cylinder, so as to detect the effect state of the service brakes 1099 based on the detected hydraulic pressure. Where the caliper 1098 is to be operated by an electric motor, the service brake switch 1227 may be arranged to detect an electric current flowing through the electric motor and a pressing force of the caliper 1098, so as to detect the effect state of the service brakes 1099 based on the detected electric current and pressing force. The shift-position sensor 1228 may be configured to detect either or indirectly a selected shift position of a transmission of the vehicle. For detecting directly the selected shift position, the shift-position sensor 1228 may be arranged to detect a currently established state of supply of an electric current to solenoid-operated valves, which state corresponds to the selected shift position. For detecting indirectly the selected shift position, the shift-position sensor 228 may be arranged to detect a current position of a shift operation lever of the vehicle. It can be considered that the current position of the shift operation lever corresponds to the currently selected shift position of the transmission during stop of the vehicle.

The vehicle is stopped by activation of the disk brakes 1099 as the service brakes, and then the drum brakes 1018, 1020 as the parking brakes are activated. It is common that the service brakes 1099 are released after the parking brakes 1018, 1020 become effective. Upon release of the service brakes 1099, each of the wheels 1014, 1016 receives a torque originating from a gravity when the vehicle is being stopped on an uphill or a downhill. Further, the currently selected shift position of the transmission is other than a parking position and a neutral position, each of the wheels 1014, 1016 receives a drive torque (i.e., torque originating from a vehicle drive power source). Upon activation of each of the drum brakes 1018, 1020, the pressing device 1120 applies, to the respective brake shoes 1110a, 1110b, the pressing forces that are the same in amount, as described. However, when the left-sided brake shoe 1110a is easier to be moved than the right-sided brake 1110b due to some factor, the left-sided brake shoe 1110a is spread by the pressing force applied from the pressing device 1120, without the right-sided brake shoe 1110b being spread. The pressing force thus applied to the left-sided brake shoe 1110a constitutes a circumferential force, and is transmitted to the right-sided brake shoe 1110b via the adjuster 1108, so that the right-sided brake shoe 1110b is pressed against the anchor member 1106. In this brake effect state, each of the cables 1022, 1024 is slackened by only a small amount in the event of application of a torque acting in the forward rotation direction P. However, in the event of application of a torque acting in the reverse rotation direction Q, each of the cables 1022, 1024 is slackened by such a degree that reduces the braking force. This is because, upon application of the torque acting in the reverse rotation direction Q, the right-sided brake shoes 1110b is separated from the anchor member 1106 so as to be moved in a circumferential direction, and the circumferential force is transmitted to the left-sided brake shoe 1110a via the adjuster 1108, whereby the left-sided brake shoe 1110a is brought into contact with the anchor member 1106. The pair of brake shoes 1110a, 1110b are moved in the circumferential direction, and the pressing device 1120 also is moved in the circumferential direction, whereby each of the cables 1022, 1024 is slackened. It is not commonly known which one of the brake shoes 1110a, 1110b is relatively easy to be moved or which one of them is relatively difficult to be moved. In view of this, in the present embodiment, a selected one of the brake shoes 1110a, 1110b is made difficult to be moved while the other of the brake shoes 1110a, 1110b is necessarily moved by activation of the pressing device 1120.

Figure 25:
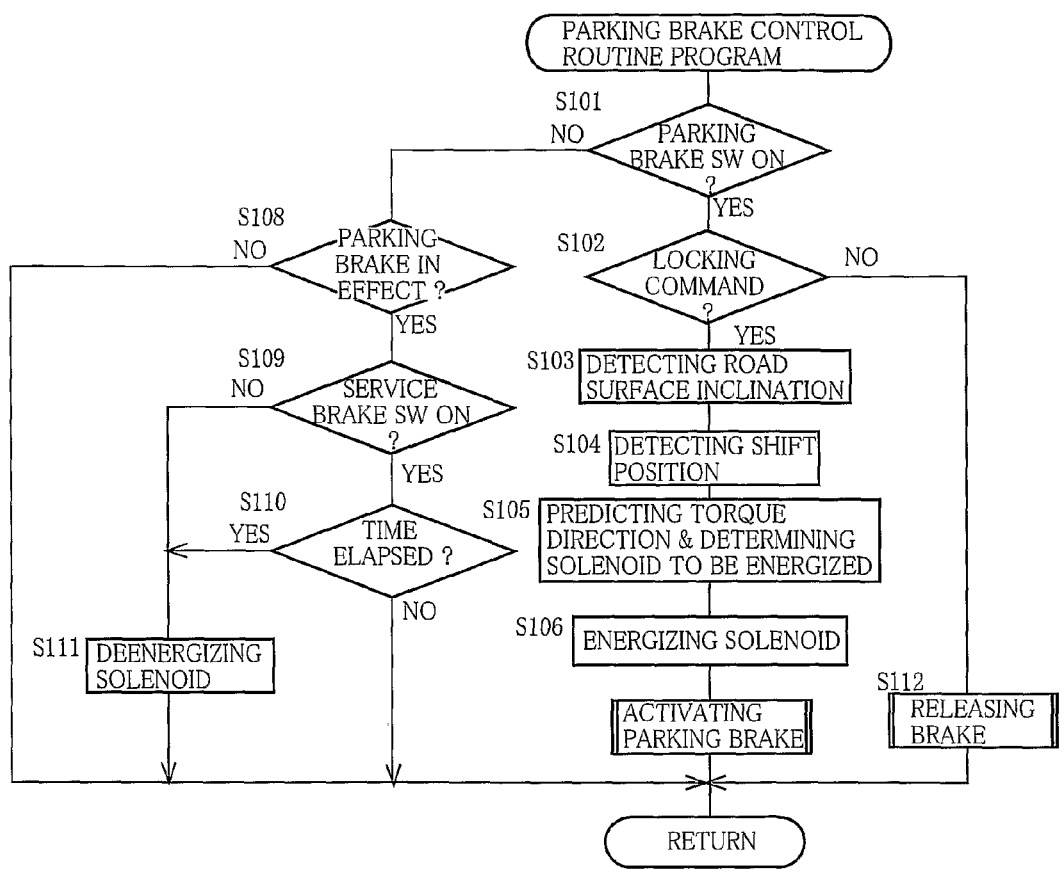
FIG. 25 is a flow chart showing a parking brake control routine program that is stored in a storage portion of a parking brake ECU of the parking brake system.

FIG. 25 is a flow chart showing a parking brake control routine program that is repeatedly executed at a predetermined time interval. This routine program is initiated with step S101 that is implemented to judge whether the parking brake switch 1210 has been operated or not. When it has been operated, step S102 is implemented to judge whether the locking operation portion of the parking brake switch 1210 has been operated or not, namely, a locking command has been issued or not. When the locking command has been issued, step S103 is implemented to obtain a direction of the inclination of the road surface, based on a value detected by the longitudinal acceleration sensor 1226, and step S104 is implemented to obtain a direction of the drive torque, based on a detection made by the shift-position sensor 1228. Step S105 is implemented to predict the torque application direction (i.e., a direction of a torque that is to be applied to each wheel upon release of the service brakes 1099), and then to select one of the solenoids 1116a, 1116b that is provided for a secondary one of the brake shoes 1110a, 1110b that serves as the secondary shoe upon application of the torque. For example, when the predicted torque application direction corresponds to the forward rotation direction P, the solenoid 1166b is selected as the one of the solenoids that is provided for the secondary shoe, since the solenoid 1166b is for the right-sided brake shoe 1110b serving as the secondary shoe. When the predicted torque application direction corresponds to the reverse rotation direction Q, the solenoid 1166a is selected as the one of the solenoids that is provided for the secondary shoe, since the solenoid 1166a is for the left-sided brake shoe 1110a serving as the secondary shoe. Step S105 is followed by step S106 that is implemented to supply an electric current to the selected solenoid 1166b (for example, when the predicted torque application direction corresponds to the forward rotation direction P), whereby the pin 1160b is moved to the engaging position so as to be engaged with the brake shoe 1110b. Then, in step S107, the cables 1022, 1024 are pulled whereby the pressing device 1120 is activated.

Figure 26:
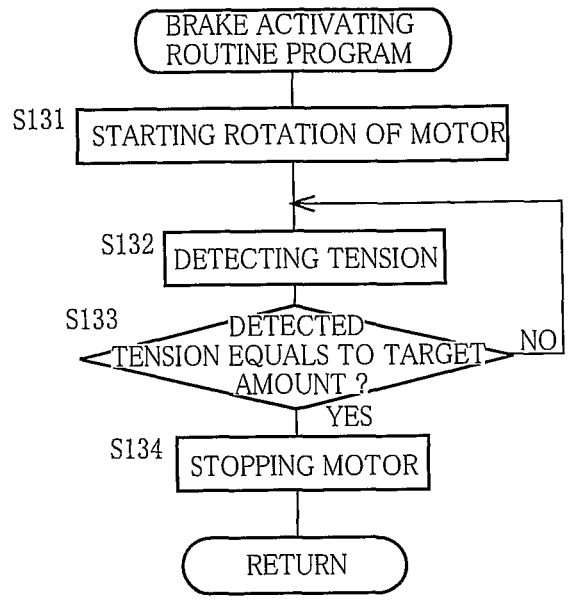
FIG. 26 is a flow chart showing a brake activating routine program as a sub-routine program of the parking brake control routine program of FIG. 25.

In step S107, a brake activating routine program as a subroutine program of the parking brake control routine program is executed as shown in a flow chart of FIG. 26. The brake activating routine program is initiated with step S131 that is implemented to rotate the electric motor 1010 in a predetermined direction. Then, in step S132, the cable tension is detected by the tension sensor 1090. Step S132 is followed by step S133 that is implemented to judge whether the detected tension amount has reached a target tension amount. In the present embodiment, the target tension amount is a predetermined amount that enables the vehicle to be held stopped. For, example, the target tension amount is made larger when the degree of inclination of the road surface (on which the vehicle is being stopped) is larger than when the degree of inclination of the road surface is small. In a case where the vehicle is being stopped on a downhill, the target tension amount is made larger when the currently selected shift position is a forward drive position (commanding a forward running of the vehicle) than when the currently selected shift position is not the forward drive position. In a case where the vehicle is being stopped on an uphill, the target tension amount is made larger when the currently selected shift position is a reverse drive position (commanding a reverse running of the vehicle) than when the currently selected shift position is not the reverse drive position. In any one of these cases, when the detected tension amount has reached the target tension amount, step S134 is implemented to stop the electric motor 1010.

When the cables 1022, 1024 are to be pulled, the pin 1160b is engaged with the brake shoe 1110b as the secondary shoe so that the brake shoe 1110b is made difficult to be separated from the anchor member 1106. Therefore, the brake shoe 1110a as the primary shoe is moved by activation of the pressing device 1120, while the brake shoe 1110b as the secondary shoe is not moved by activation of the pressing device 1120. The circumferential force applied to the brake shoe 1110a (by activation of the pressing device 1120) is transmitted to the brake shoe 1110b via the adjuster 1108, whereby the brake shoe 1110b is pressed against the anchor member 1106.

When the operation of the parking brake switch 1210 is not detected in step S101 of the parking brake control routine program of FIG. 25, the control flow goes to step S108 that is implemented to judge whether each of the parking brakes 1018, 1020 is being in effect. When it is judged that it is being in effect, namely, when a positive judgment (YES) is obtained in step S108, step S109 is implemented to judge whether the service brake switch 1227 is being placed in its ON state (whether the service brakes 1099 are being in effect). When it is judged that it is being placed in the ON state, namely, when a positive judgment (YES) is obtained in step S109, step S110 is implemented to judge whether a predetermined length of time has elapsed since the parking brakes 1018, 1020 have been activated (since the electric motor 1010 has been stopped when the detected cable tension amount has reached the target tension amount). The predetermined length of time is determined based on a length of time from when the locking operation portion of the parking brake switch 214 is operated by the vehicle driver to when operation of the service brake operating member (not shown) is terminated. Steps S101, S108, S109 and S110 are repeatedly implemented so that the solenoid 1166b is held energized, until the predetermined length of time has elapsed while the serve brakes 1099 as well as the parking brakes 1018, 1020 are being in effect. During the repeated implementation of steps S101, S108, S109 and S110, if the service brakes 1099 are released, a negative judgment (NO) is obtained in step S109 whereby step S111 is implemented to deenergize the solenoid 1166b. Then, the right-sided brake shoe 1110b as the secondary shoe is further pressed against the anchor member 1106 owing to the torque (whose direction has been predicted). In this state, the pin 1160b does not have to be held in engagement with the right-sided brake shoe 1110b. Further, even if the service brakes 1099 are not released, step S111 is implemented when the predetermined length of time has elapsed, whereby the solenoid 1166b is deenergized. This is because it is not desirable that the solenoid 1166b is energized for an excessively large length of time.

Thus, in each of the parking brakes 1018, 1020, the engagement of the pin 1160 and the secondary shoe is maintained until the torque is actually applied to each wheel, thereby making it possible to satisfactorily avoid movement of the pressing device 1120 in a circumferential direction and accordingly restrain each of the cables 1022, 1024 from being slackened. Further, since the pins 1160a, 1160b are constantly forced or biased toward their respective disengaging positions by the respective springs 1164a, 1164b, the pair of brake shoes 1110a, 1110b can be reliably spread even in the event of failure of the electric system.

On the other hand, when the releasing operation portion of the parking brake switch 1210 is operated, a negative judgment (NO) is obtained in step S102 whereby the control flow goes to step S112 that is implemented to release the parking brakes 1018, 1020. In step S112, a brake releasing routine program as a sub-routine program of the parking brake control routine program is executed as shown in a flow chart of FIG. 26. The brake releasing routine program is initiated with step S151 in which the electric motor 1010 is rotated in a reverse direction that is opposite to the direction of the rotation made in the brake activating routine program of S27. Steps S151 is followed by steps S152 and S153. In step S152, the cable tension is detected by the tension sensor 1090. In step S153, it is judged whether the detected tension amount has reached substantially zero, namely, whether the detected tension amount becomes not larger than a predetermined threshold amount that can be regarded as substantially zero. Steps S152 and S153 are repeatedly implemented until the detected tension amount becomes not larger than the predetermined threshold amount. When the detected tension amount has become not larger than the predetermined threshold amount, the electric current supplied to the electric motor 1010 is zeroed in step S154, so that the pair of brake shoes 1110a, 1110b are returned, by the return spring 1115, to their respective non-effect positions, namely, so that a diameter defined by the pair of brake shoes 1110a, 1110b is reduced whereby the brake shoes 1110a, 1110b are returned to the respective non-effect positions. Step S154 is followed by step S155 that is implemented to stop supply of the electric current to the solenoid 1166b. In most cases, the supply of the electric current to the solenoid 1166b is stopped before the releasing operation portion of the parking brake switch 1210 is operated. However, there is a case where the releasing operation portion of the parking brake switch 1210 is operated before the supply of the electric current to the solenoid 1166b is stopped. It is not desirable that the supply of the electric current to the solenoid 1166b is maintained. Step S155 is implemented to avoid such an undesirable situation.

In the present embodiment, the parking brake ECU 1200 includes portions which are assigned to store and implement steps S101-S106 of the parking brake control routine program and which constitute at least a part of a movement-restraining controller. The movement-restraining controller cooperates with the movement restraining mechanism 1150 (that includes the solenoids 1166 as the electric drive source and the pins 1160 as the movement restraining members) to constitute a movement restraining device. The movement-restraining controller includes portions which are assigned to store and implement steps S101, S102 and S106 of the parking brake control routine program and which constitute at least a part of a drive-source controlling portion. The movement-restraining controller includes portions which are assigned to store and implement steps S103, S104 and S105 of the parking brake control routine program and which constitute at least a part of a torque direction predictor. The torque direction predictor cooperates with the pressing device 1120 and the movement restraining device to constitute at least a part of a parking-brake operating apparatus. Further, the parking brake ECU 1200 includes portions which are assigned to store and implement steps S105 and S106 and which constitute at least a part of pressing-force controller.

The supply of the electric current to the solenoid 1166 may be stopped immediately after the detected cable tension amount has reached the target tension amount. This modified arrangement makes it possible to further reduce an electric power consumed by the solenoid 1166, and is effective especially where the pressing device 1120 is fixed disposed on the backing plate 1100. Further, the construction of the movement restraining mechanism 1150 is not limited to that described in the above-described embodiment. For example, while the springs 1164 are arranged to force the respective pins 1160 toward the respective disengaging positions in the above-described embodiment, the springs may be arranged to force the respective pins toward the respective engaging positions. In such a modified arrangement, the solenoids 1166 may be held deenergized while the parking brakes 1018, 1020 are being in effect. Further, the housings 1162 and the solenoids 1166 may be disposed on one of opposite sides of the backing plate 1100 that is remote from the brake shoes 1110a, 1110b.

Figure 28:
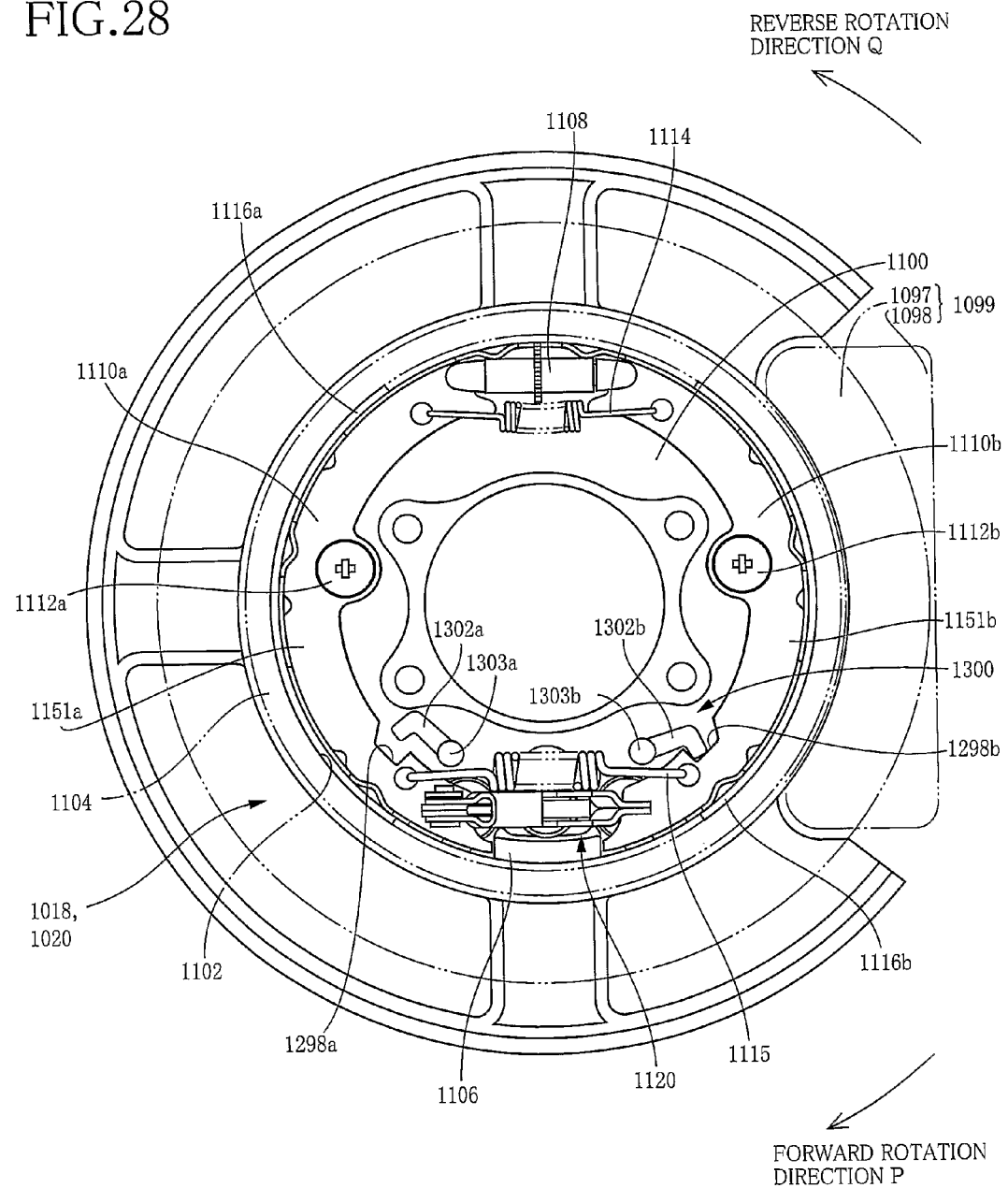
FIG. 28 is a plan view showing another movement restraining mechanism which can be provided, in place of the movement restraining mechanism of FIG. 23, in the drum brake of FIG. 22.
Figure 29:
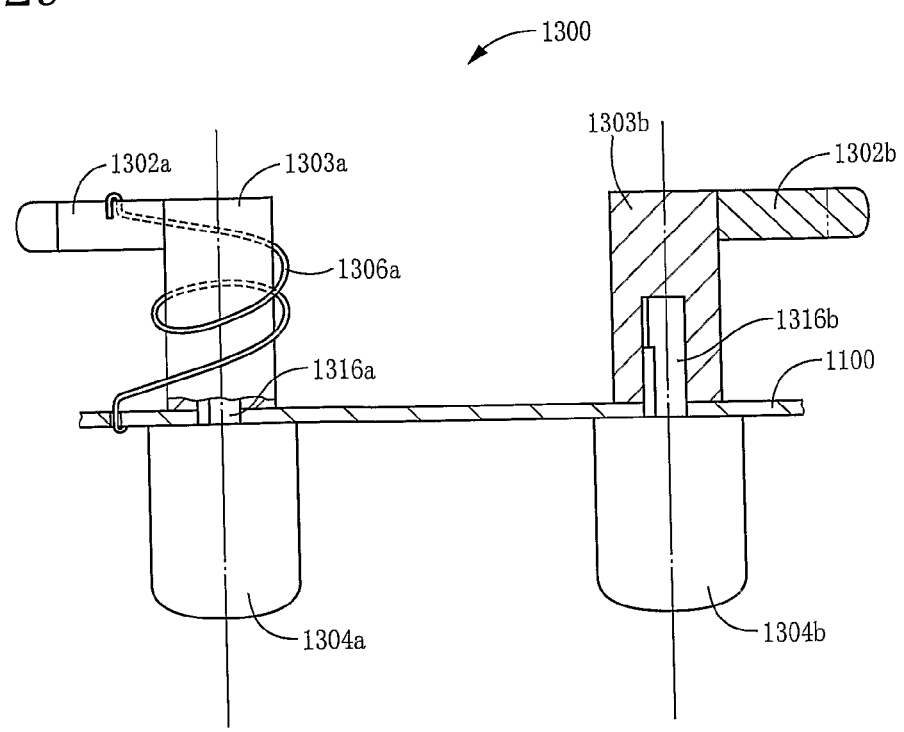
FIG. 29 is a front view showing, partially in cross section, the movement restraining mechanism of FIG. 28.

FIGS. 28 and 29 show a movement restraining mechanism 1300 which can be provided, in place of the movement restraining mechanism 1150, in each of the drum brakes 1018, 1020. The movement restraining mechanism 1300 includes: a pair of movement restraining members in the form of engaging pawls 1302a, 1302b; a restraining member holder having a pair of holder portions in the form of housings 1303a, 1303b holding the respective engaging pawls 1302a, 1302b; a pair of electric drive sources in the form of electric motors 1304a, 1304b that are provided for the respective engaging pawls 1302a, 1302b; and a pair of springs 1306a, 1306b (one of which is not shown) configured to bias or force the respective engaging pawls 1302a, 1302b toward their respective disengaging positions. Each of the engaging pawls 1302a, 1302b can be engaged with a corresponding one of engaging portions in the form of cutouts 1298a, 1298b that are provided in the webs 1151a, 1151b of the respective shoes 1110a, 1110b. Each of the cutouts 1298a, 1298b is located in a portion of a corresponding one of the webs 1151a, 1151b, which portion is located on an anchor-member-sided one of opposite sides of a central portion of the corresponding one of the webs 1151a, 1151b. Each of the housings 1303a, 1303b is disposed in a portion of the backing plate 1100, which portion enables a corresponding one of the engaging pawls 1302a, 1302b to be engaged with a corresponding one of the cutouts 1298a, 1298b during the non-effect state in which the parking brakes 1018, 1020 are not being in effect. Each of the housings 1303a, 1303b is unrotatable relative to a corresponding one of output shafts 1316a, 1316b of the respective motors 1304a, 1304b. Each of the engaging pawls 1302a, 1302b is rotatable integrally with a corresponding one of the housings 1303a, 1303b. Each of the springs 1306a, 1306b is disposed between the backing plate 1100 and a corresponding one of the engaging pawls 1302a, 1302b. The motors 1304a, 1304b are fixedly disposed on one of opposite surfaces of the backing plate 1100 that is remote from the pair of brake shoes 1110a, 1110b. Each of the cutouts 1298a, 1298b may have a size and a shape which restrain a corresponding one of the brake shoes 1110a, 1110b in a direction away from the anchor member 1106 and which allows the corresponding one of the brake shoes 1110a, 1110b in a direction toward the anchor member 1106, during engagement of each of the cutouts 1298a, 1298b with a corresponding one of the engaging pawls 1302a, 1302b.

Figure 27:
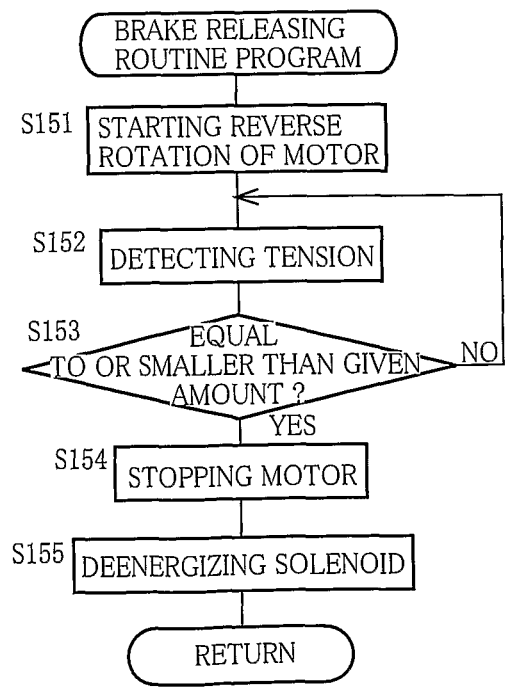
FIG. 27 is a flow chart showing a brake releasing routine program as another sub-routine program of the parking brake control routine program of FIG. 25.

The movement restraining mechanism 1300 is controlled according to routine programs, which are substantially the same as those of FIGS. 25-27 except that: step S105 is replaced with a step that is implemented to predict the torque application direction and then to select one of the motors 1304a, 1304b that is provided for the secondary shoe; step S6 is replaced with a step that is implemented to supply an electric current to the selected motor; and steps S111 and S155 are replaced with steps that are implemented to stop the supply of the electric current to the selected motor. When the predicted torque application direction corresponds to the forward rotation direction P, the motor 1304b is selected to be activated. By the activation of the motor 1304b, the engaging pawl 1302b is pivoted against biasing force of the spring 1306b, clockwise as seen n FIG. 28, so as to be engaged with the cutout 1298b. By the engagement of the engaging pawl 1302b with the cutout 1298b, the brake shoe 1110b as the secondary shoe is restrained from being moved in a direction away from the anchor member 1106. After activation of the parking brakes 1018, 1020, the supply of the electric current to the motor 1304b is stopped upon release of the service brakes 1099. The engaging pawl 1302b is returned, by the biasing force of the spring 1306b, to the disengaging position. When the predicted torque application direction corresponds to the reverse rotation direction Q, the motor 1304a is selected to be activated. By the activation of the motor 1304a, the engaging pawl 1302a is pivoted against biasing force of the spring 1306a, counterclockwise as seen in FIG. 28, so as to be engaged with the cutout 1298a. By the engagement of the engaging pawl 1302a with the cutout 1298a, the brake shoe 1110a as the secondary shoe is restrained from being moved in a direction away from the anchor member 1106. Thus, the reduction of the braking force can be restrained upon actual application of the torque to each wheel, irrespective of whether the direction of the applied toque corresponds to the forward rotation direction P or reverse rotation direction Q.

In this arrangement shown in FIGS. 28 and 29, the springs 1306a, 1306b are not essential. In such a case without the springs 1306a, 1306b, even if the electric current supplied to the motor 1304 is zeroed while the engaging pawl 1302 is engaged with the cutout 1298, the engagement of the pawl 1302 with the cutout 1298 can be maintained.

Figure 30:
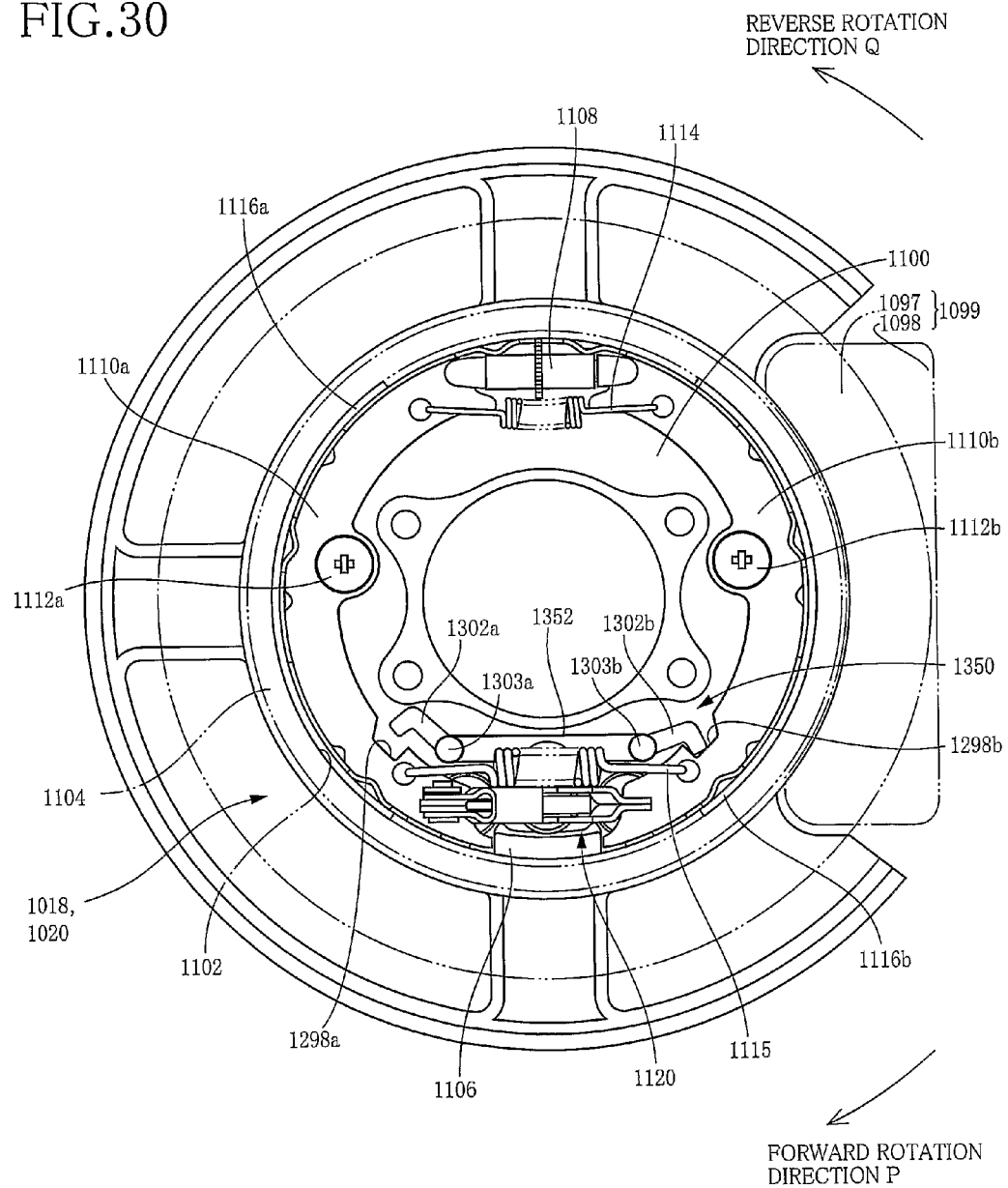
FIG. 30 is a plan view showing still another movement restraining mechanism which can be provided, in place of the movement restraining mechanism of FIG. 23, in the drum brake of FIG. 22.
Figure 31:
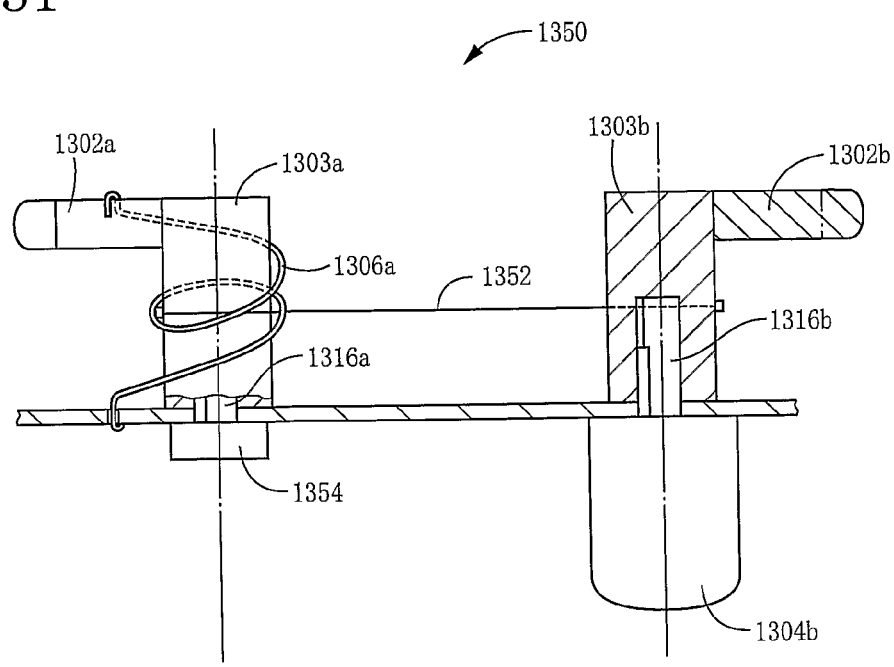
FIG. 31 is a front view showing, partially in cross section, the movement restraining mechanism of FIG. 30.

FIGS. 30 and 31 show a movement restraining mechanism 1350 which can be provided, in place of the movement restraining mechanism 1150, in each of the drum brakes 1018, 1020. This movement restraining mechanism 1350 is substantially identical with the movement restraining mechanism 1300 of FIGS. 28 and 29 except for: presence of a wire 1352 interconnecting the housings 1303a, 1303b of the respective engaging pawls 1302a, 1302b; presence of a supporting pin 1354 supporting the housing 1303a that is rotatable relative to the supporting pin 1354; absence of the electric motor 1304a provided for the engaging pawl 1302a; and absence of the spring 1306b provided for the engaging pawl 1302b. The wire 1352 is wound on the housings 1303a, 1303b such that the housings 1303a, 1303b are unrotatable relative to each other.

The movement restraining mechanism 1350 is placed in its first state in which the engaging pawl 1302b is positioned in the engaging position while the engaging pawl 1302a is positioned in the disengaging position owing to a biasing force of the spring 1306a, in absence of an electric current supplied to the electric motor 1304b. When the predicted torque application direction corresponds to the forward rotation direction P, the electric current is not supplied to the motor 1304b so that the movement restraining mechanism 1350 is held in the first state. In this first state, since the engaging pawl 1302b is engaged with the brake shoe 1110b, the brake shoe 1110b is restrained from being separated from the anchor member 1106, upon activation of the pressing device 1120. The first state is maintained during in the brake effect state (in which the parking brakes 1018, 1020 are being in effect) and also after release of the parking brakes 1018, 1020. Any problem is not caused by the engagement of the engaging pawl 1302b with the brake shoe 1110b, which is maintained irrespective of whether the parking brakes 1018, 1020 are being in effect or not. The movement restraining mechanism 1350 is held in its first state until the mechanism 1350 has to be switched to its second state.

When the predicted torque application direction corresponds to the reverse rotation direction Q, the electric motor 1304b is activated whereby the engaging pawl 1302b is pivoted to the disengaging position while the engaging pawl 1302a is pivoted to the engaging position against the biasing force of the spring 1306a. The movement restraining mechanism 1350 is thus placed in its second state in which the engaging pawl 1302a is engaged with the cutout 1298a while the engaging pawl 1302*b* is not engaged with the cutout 1298*b*. As a result of the placement of the mechanism 1350 in the second state, the brake shoe 1110*a* is restrained from being moved in a direction away from the anchor member 1106. During the second state, the electric current is kept supplied to the motor 1304*b* for maintaining an angular position of the output shaft 1316*b*. The electric current supplied to the motor 1304*b* is zeroed, for example, when the service brakes 1099 are released. Although the engaging pawls 1302*a*, 1302*b* are pivoted, by the biasing force of the spring 1306*a*, clockwise as seen in FIG. 30, the engaging pawl 1302*b* is not brought into engagement with the cutout 1298*b*. However, when the brake shoes 1110*a*, 1110*b* are returned to their respective non-effect positions so as to release the parking brakes 1018, 1020, the engaging pawl 1302*b* is brought into engagement with the cutout 1298*b* whereby the mechanism 1350 is placed in its first state.

Figure 32:
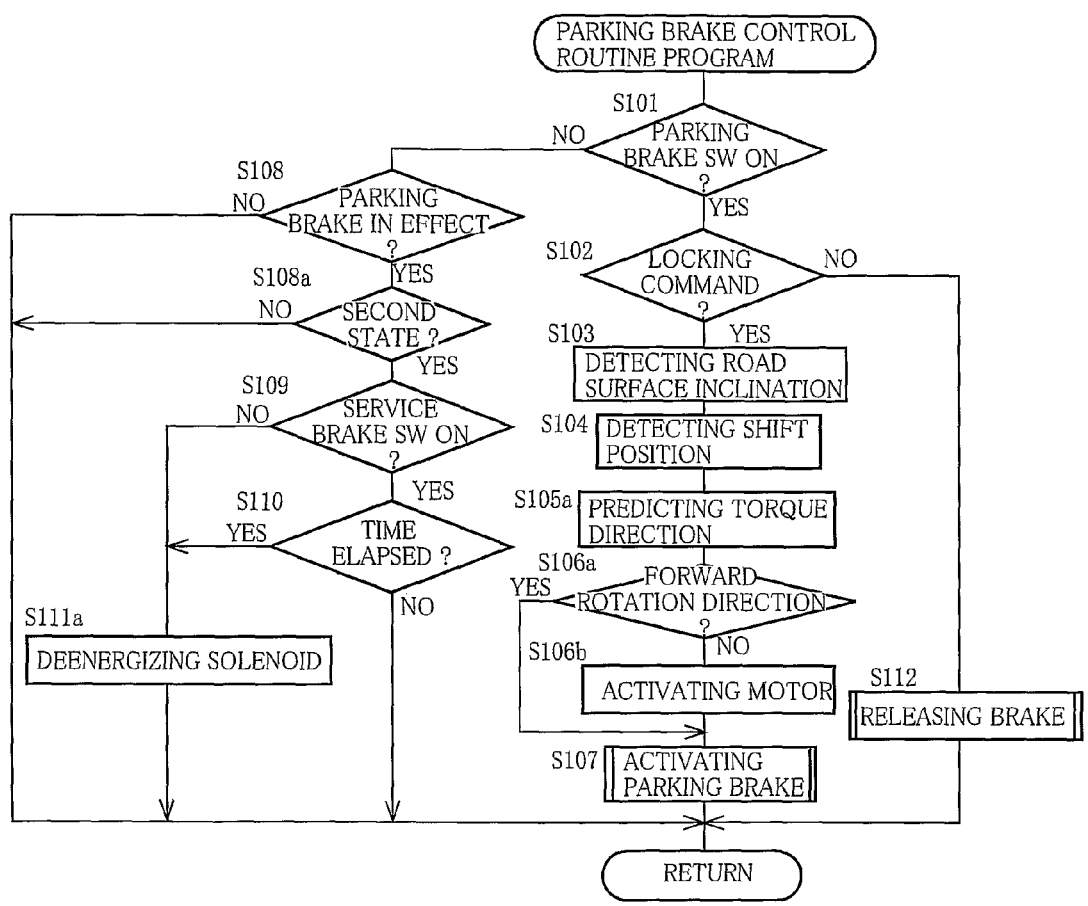
FIG. 32 is a flow chart showing another parking brake control routine program that can be stored in the above-described storage portion of the parking brake ECU.

FIG. 32 is a flow chart showing a parking brake control routine program that is repeatedly executed at a predetermined time interval in the arrangement shown in FIGS. 30 and 31. The same step numerals will be used to represent steps having the same procedures as those in the above-described parking brake control routine program of FIG. 25, and description of these steps will be omitted. Step S105*a* is implemented to predict the torque application direction, and step S106*a* is implemented to judge whether the predicted torque application direction corresponds to the forward rotation direction P. When the predicted torque application direction corresponds to the forward rotation direction P, step S107 is implemented to pull the cables 1022, 1024. When the predicted torque application direction corresponds to the reverse rotation direction Q, step S106*b* is implemented to activate the motor 1304*b*, so that step S107 is implemented to pull the cables 1022, 1024 after the mechanism 1350 has been switched to its second state. While the parking brakes 1018, 1020 are being in effect, step S108*a* is implemented to judge whether the mechanism 1350 is in its second state. When the mechanism 1350 is in its first state, steps S109 and S110 are not implemented. When the mechanism 1350 is in its second state, steps S109 and S110 are implemented so that the electric motor 1304*b* is deenergized in step S111*a* upon release of the service brakes 1099 or upon elapse of a predetermined length of time after activation of the parking brakes 1018, 1020.

In the arrangement shown in FIGS. 30 and 31, as described above, there is an advantage that it is not necessary to activate the motor 1304*b* when the predicted torque application direction corresponds to the forward rotation direction P. Further, when the parking brakes 1018, 1020 are activated during stop of the vehicle on a horizontal road surface, a possibility that the selected shift position is a forward drive position is higher than a possibility that the selected shift position is a reverse drive position, so that the predicted torque application direction corresponds to the forward rotation direction P more frequently than the predicted torque application direction corresponds to the reverse rotation direction Q. It is therefore possible to reduce a consumed electric power in this arrangement in which the first state can be maintained without supply of the electric current to the motor 1304*b*. Further, as long as the mechanism 1350 is in its first state, the parking brakes 1018, 1020 can be brought into effect since the brake shoe 1110*a* can be moved in a circumferential direction even in the event of failure of the electric system.

It is noted that the engaging portion provided in each of the webs 1151 of the respective brake shoes 1110 may take the form of an engaging protrusion in place of the cutout. For example, the engaging protrusion may be provided in a portion of the brake shoe 1110, which portion is located between the engaging pawl 1302 and the anchor member 1160 when the engaging protrusion is engaged with the engaging pawl 1302. By the engagement of the engaging protrusion and the engaging pawl 1302, the brake shoe 1110 is retrained from being moved in a direction away from the anchor member 1106.

Figure 33:
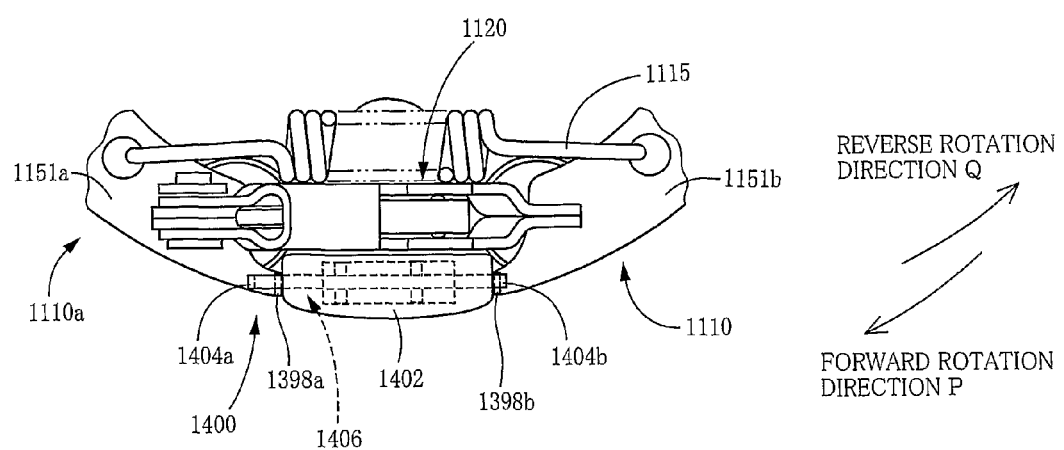
FIG. 33 is a view showing still another movement restraining mechanism which can be provided, in place of the movement restraining mechanism of FIG. 23, in the drum brake of FIG. 22.

FIG. 33 shows a movement restraining mechanism 1400 which can be provided, in place of the movement restraining mechanism 1150, in each of the drum brakes 1018, 1020. The movement restraining mechanism 1400 includes: a housing (holder portion) 1402 fixed relative to the anchor member 1106; a pair of movement restraining members in the form of engaging pawls 1404*a*, 1404*b*; and an engaging rod 1406 having longitudinally opposite end portions that provide the engaging pawls 1404*a*, 1404*b*. The housing 1402 may be provided by either at least a portion of the anchor member 1106 or at least one member fixed to the anchor member 1106. Each of the engaging pawls 1404*a*, 1404*b* can be engaged with a corresponding one of engaging portions in the form of engaging protrusions 1398*a*, 1398*b* that are provided in the webs 1151*a*, 1151*b* of the respective shoes 1110*a*, 1110*b*. Each of the engaging protrusions 1398*a*, 1398*b* is located in the anchor-member-side end portion of a corresponding one of the webs 1151*a*, 1151*b*, and protrudes from one of opposite surfaces of the corresponding one of the webs 1151*a*, 1151*b* that is remote from the backing plate 1100. The engaging rod 1406 is held by the housing 1402, and is movable, by activation of electric drive sources, relative to the housing 1402 in a longitudinal direction of the rod 1406. The electric drive sources may include solenoids 1408*a*, 1408*b* as shown in FIG. 33, or piezoelectric elements in place of the solenoids 1408*a*, 1408*b*. The solenoids 1408*b* is configured to generate an electromagnetic drive force forcing the engaging rod 1406 in a leftward direction as seen in FIG. 33 (hereinafter referred to as the forward rotation direction P although, more precisely, corresponding to a direction tangent to the forward rotation direction P), while the solenoids 1408*a* is configured to generate an electromagnetic drive force forcing the engaging rod 1406 in a rightward direction as seen in FIG. 33 (hereinafter referred to as the reverse rotation direction Q although, more precisely, corresponding to a direction tangent to the reverse rotation direction Q). By the movement of the engaging rod 1406 in the longitudinal direction, a selected one of the engaging pawls 1404*a*, 1404*b* can be brought into engagement with a corresponding one of the engaging protrusions 1398*a*, 1398*b* of the respective brake shoes 1110*a*, 1110*b*. The engaging pawls 1404*a*, 1404*b*, which are provided by the respective longitudinally opposite end portions of the engaging rod 1406, are opposed to the respective brake shoes 1110*a*, 1110*b* and protrude toward the respective brake shoes 1110*a*, 1110*b*. A distance between the engaging pawls 1404*a*, 1404*b* in the longitudinal direction of the engaging rod 1406 is larger than a distance between engaging protrusions 1398*a*, 1398*b* of the respective brake shoes 1110*a*, 1110*b* in the non-effect state (i.e., in a state in which the brake shoes 1110*a*, 1110*b* are returned to the respective non-effect positions). When one of the engaging pawls 1404*a*, 1404*b* is engaged with a corresponding one of the engaging protrusions 1398*a*, 1398*b* of the respective brake shoes 1110*a*, 1110*b*, the other of the engaging pawls 1404*a*, 1404*b* is disengaged from the other of the engaging protrusions 1398*a*, 1398*b* of the respective brake shoes 1110*a*, 1110*b*, thereby allowing movement of one of the brake shoes 1110*a*, 1110*b* having the other of the engaging protrusions 1398*a*, 1398*b*, in a direction away from the anchor member 1106.

When the predicted torque application direction corresponds to the forward rotation direction P, the solenoid 1408*b* is energized to generate the electromagnetic drive force forcing the engaging rod 1406 in the forward rotation direction P. The engaging rod 1406 is linearly moved in the forward rotation direction P whereby the mechanism 1400 is placed in its first state in which the engaging pawl 1404*b* is engaged with the engaging protrusion 1398*b* while the engaging pawl 1404*a* is disengaged from the engaging protrusion 1398*a*. The brake shoe 1110*b* is connected to the anchor member 1106 through the engaging rod 1406 whereby the brake shoe 1110*b* is restrained from being moved in a direction away from the anchor member 1106. Then, by activation of the pressing device 1120, the brake shoe 1110*a* is moved whereby the parking brakes 1018, 1020 are brought into effect. Thereafter, when the service brake switch 1227 is placed in its OFF state, the supply of the electric current to the solenoid 1408*b* is stopped whereby the application of the electromagnetic drive force to the engaging rod 1406 is stopped. When the predicted torque application direction corresponds to the reverse rotation direction Q, the solenoid 1408*a* is energized to generate the drive force forcing the engaging rod 1406 in the reverse rotation direction Q. The engaging rod 1406 is linearly moved in the reverse rotation direction Q whereby the mechanism 1400 is placed in its second state in which the engaging pawl 1404*a* is engaged with the engaging protrusion 1398*a* while the engaging pawl 1404*b* is disengaged from the engaging protrusion 1398*b*. The brake shoe 1110*a* is connected to the anchor member 1106 through the engaging rod 1406 whereby the brake shoe 1110*a* is restrained from being moved in a direction away from the anchor member 1106. In this arrangement shown in FIG. 33, the engaging rod 1406 can be considered to serve as a common movement restraining member that is common to the brake shoes 1110*a*, 1110*b*. It is noted that the solenoid 1408*b* may be replaced with a spring which is disposed between the engaging rod 1406 and the housing 1402 so as to bias or force the engaging rod 1406 in the forward rotation direction P, i.e., in a direction for establishing the first state. In this modified arrangement, for establishing the second state, the engaging rod 1406 is moved, by the electromagnetic drive force of the solenoid 1408*a*, in the reverse rotation direction Q against a biasing force of the spring.

Figure 34A:
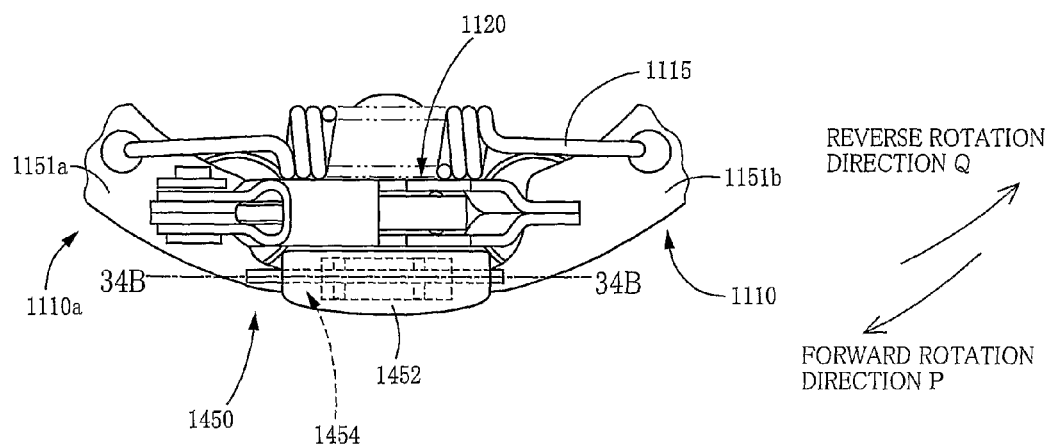
FIG. 34A is a view showing still another movement restraining mechanism which can be provided, in place of the movement restraining mechanism of FIG. 23, in the drum brake of FIG. 22.
Figure 34B:
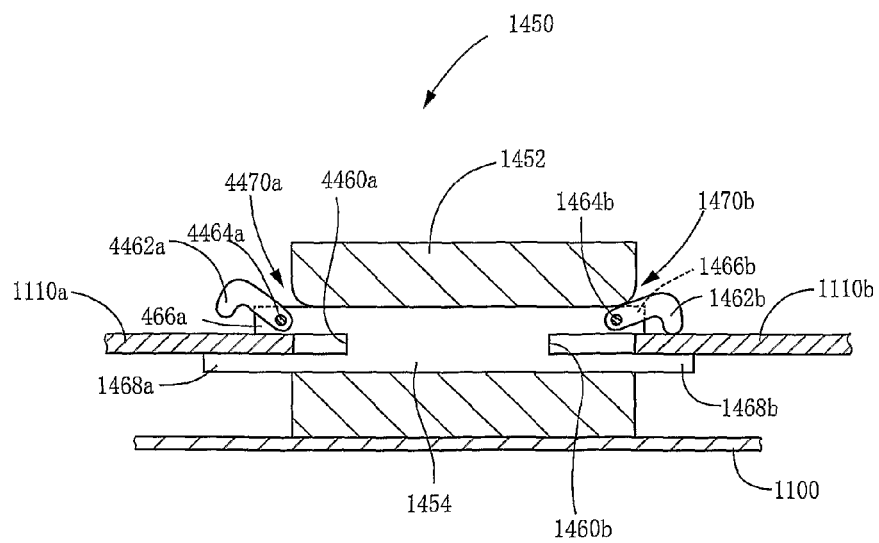
FIG. 34B is a cross sectional view taken along line 34B-34B of FIG. 34A.

FIGS. 34A and 34B show a movement restraining mechanism 1450 which can be provided, in place of the movement restraining mechanism 1150, in each of the drum brakes 1018, 1020. The movement restraining mechanism 1450 includes: a housing 1452 provided by the anchor member 1106; a pair of movement restraining members in the form of engaging pawls 1462*a*, 1462*b*; and an engaging rod 1454 held by the housing 1452 and movable in its longitudinal direction relative to the housing 1452. The engaging rod 1454 has slots 1460*a*, 1460*b* provided in its longitudinally opposite end portions. The engaging pawls 1462*a*, 1462*b* are disposed in the longitudinally opposite end portions of the engaging rod 1454 such that the pawls 1462*a*, 1462*b* are rotatable about respective pivot shafts 1464*a*, 1464*b*. The engaging pawls 1462*a*, 1462*b* are biased or forced, by respective springs (not shown), toward their respective disengaging positions. Each of the slots 1460*a*, 1460*b* is elongated in the longitudinal direction of the engaging rod 1454, and has a width and a length which permit a corresponding one of the brake shoes 1110*a*, 1110*b* to be accommodated therein and to be movable relative thereto. The slot 1460*a* has widthwise opposite ends that are defined by respective protruding portions 1466*a*, 1468*a* of the engaging rod 1454, while the slot 1460*b* has widthwise opposite ends that are defined by respective protruding portions 1466*b*, 1468*b* of the engaging rod 1454. The protruding portions 1468*a*, 1468*b* are longer than the protruding portions 1466*a*, 1466*b* that hold the respective engaging pawls 1462*a*, 1462*b*. The brake shoe 1110*a* is gripped between the protruding portion 1468*a* and the engaging pawl 1462*a* that are opposed to each other, while the brake shoe 1110*b* is gripped between the protruding portion 1468*b* and the engaging pawl 1462*b* that are opposed to each other. The housing 1452 has pressing portions (cam portions) 1470*a*, 1470*b* provided by its longitudinal opposite end portions. Each of the pressing portions 1470*a*, 1470*b* has a curved surface such that a distance between the curved surface between a corresponding one of the brake shoes 1110*a*, 1110*b* is increased as the curved surface extends outwardly in the longitudinal direction. The engaging rod 1454 is movable, by activation of electric drive sources, relative to the housing 1452 in the longitudinal direction of the rod 1454. As in the arrangement shown in FIG. 33, the electric drive sources may include solenoids 1408*a*, 1408*b*, or piezoelectric elements in place of the solenoids 1408*a*, 1408*b*.

During the non-effect state, the brake shoes 1110*a*, 1110*b* are held in contact at their respective anchor-member-side end portions with the housing 1452 serving as the anchor member. When the predicted torque application direction corresponds to the forward rotation direction P, the engaging rod 1454 is moved in the forward rotation direction P. In this instance, although the bake shoe 1110*a* is moved relative to the slot 1460*a*, the brake shoe 1110*a* is not brought into contact with a bottom of the slot 1460*a*, so that a pressing force is not applied to the brake shoe 1110*a*. Meanwhile, the engaging pawl 1462*b* is pressed by the pressing portion 1470*b* so as to be pivoted to its engaging position, whereby the brake shoe 1110*b* is gripped by the engaging pawl 1462*b* and the protruding portion 1468*b* so as to be restrained from being moved in a circumferential direction. When the pressing device 1120 provides at least one of the brake shoes 1110*a*, 1110*b* with a pressing force acting in a direction causing the brake shoes 1110*a*, 1110*b* to be spread, the brake shoe 1110*b* is held in contact with the housing 1452 serving as the anchor member, since the brake shoe 1110*b* is restrained from being moved in a direction away from the housing 1452. Meanwhile, the brake shoe 1110*a* is moved in a circumferential direction, and a circumferential force is transmitted to the brake shoe 1110*b* via the adjuster 1108 whereby the brake shoe 1110*b* is pressed onto the housing 1452. In this arrangement shown in FIGS. 34A and 34B, even if the supply of the electric current to the electric drive sources is stopped in this state, the brake shoe 1110*b* is restrained from being moved in a circumferential direction. Thus, there is an advantage that it is not necessary to supply an electric power to the electric drive sources until the service brakes 1099 are released. When the predicted torque application direction corresponds to the reverse rotation direction Q, the engaging rod 1454 is moved in the reverse rotation direction Q. In this instance, the brake shoe 1110*b* is moved relative to the slot 1460*b*, while the brake shoe 1110*a* is gripped by the engaging pawl 1462*a* and the protruding portion 1468*a* so as to be restrained from being moved in a direction away from the housing 1452. When the pressing device 1120 provides at least one of the brake shoes 1110*a*, 1110*b* with a pressing force acting in a direction causing the brake shoes 1110*a*, 1110*b* to be spread, the brake shoe 1110*a* is restrained from being moved in a direction away from the housing 1452 and is pressed onto the housing 1452.

In the arrangement shown in FIGS. 34A and 34B, the brake shoes 1110*a*, 1110*b* are not provided with respective engaging portions. However, the engaging portions may be provided in respective portions of the webs 1151a, 1151b of the respective brake shoes 1110a, 1110b which are opposed to the respective engaging pawls 1462a, 1462b. Each of the engaging portions may be a recess or a hole which may be, for example, shaped to extend in a circumferential direction. In such a case with provision of the engaging portions in the brake shoes 1110a, 1110b, the protruding portions 1468a, 1468b do not have to be longer than the protruding portions 1466a, 1466b.

While the presently preferred embodiments of the invention have been described above in detail by reference to the accompanying drawings, for illustrative purpose only, it is to be understand that the present invention may be embodied with various other changes, modifications and improvements, such as those described in the SUMMARY OF THE INVENTION, which may occur to those skilled in the art.

The invention claimed is:

1. A parking brake system for a vehicle, comprising:
a non-rotary body;
a rotary drum rotatable together with a wheel of the vehicle, and having an inner circumferential surface that serves as a friction surface;
a pair of brake shoes disposed on an inner peripheral side of said rotary drum, and having respective outer circumferential surfaces on each of which a friction material member is disposed;
an anchor member fixed to said non-rotary body, and disposed between anchor-member-side end portions of the respective brake shoes, each of said anchor-member-side end portions being provided by one of opposite end portions of a corresponding one of said brake shoes;
a transmitting member interconnecting transmitting-member-side end portions of said respective brake shoes, each of said transmitting-member-side end portions being provided by the other of said opposite end portions of a corresponding one of said brake shoes, said transmitting member being configured, in presence of a force applied to one of said brake shoes and acting in a direction of circumference of said non-rotary body, to transmit the force from said one of said brake shoes to the other of said brake shoes; and
a parking-brake operating apparatus configured to predict a torque application direction in which a torque is to be applied to the wheel upon release of a service brake of the vehicle during stop of the vehicle, and to press said friction material of each of said brake shoes against said inner circumferential surface of said rotary drum, by moving a primary one of said brake shoes in a direction away from said anchor member prior to application of the torque to the wheel during stop of the vehicle, without moving a secondary one of said brake shoes prior to application of the torque to the wheel during stop of the vehicle, said primary one of said brake shoes serving as a primary shoe upon application of the torque to the wheel, said secondary one of said brake shoes serving as a secondary shoe upon application of the torque to the wheel.

2. The parking brake system according to claim 1,
wherein said parking-brake operating apparatus is configured to press said friction material member of said brake shoes against said inner circumferential surface of said rotary drum, by moving said primary one of said brake shoes in the direction away from said anchor member, without moving said secondary one of said brake shoes, irrespective of whether the torque application direction corresponds to a forward rotation direction or a reverse rotation direction, so that said non-rotary body, said rotary drum, said brake shoes, said anchor member, said transmitting member and said parking-brake operating apparatus cooperate with each other to constitute a duo-servo drum brake,
wherein said parking-brake operating apparatus has a pressing device disposed between said anchor-member-side end portions of said respective brake shoes,
and wherein said pressing device includes an electric drive source, a pressing mechanism having at least one acting member which is capable of acting directly on said brake shoes such that a pressing force can be applied to a selected one of said brake shoes through a corresponding one of said at least one acting member that is to be driven by said electric drive source, and a pressing-force controller which is configured to make prediction of the torque application direction and to control said electric drive source based on the prediction of the torque application direction such that the pressing force is applied through said one of said at least one acting member to said primary one of said brake shoes as said selected one of said brake shoes.

3. The parking brake system according to claim 2,
wherein said electric drive source has an electric motor,
wherein said pressing mechanism has an acting member as said at least one acting member which is capable of acting directly on said brake shoes such that the pressing force can be applied to the selected one of said brake shoes through said acting member that is to be driven by said electric drive source, and a motion converting mechanism configured to convert a rotary motion that is to be given from said electric motor, into a linear motion that is to be given to said acting member,
and wherein said pressing-force controller has a motor controlling portion configured to control a direction of rotation of said electric motor, for thereby controlling a direction of movement of said acting member.

4. The parking brake system according to claim 3,
wherein said motion converting mechanism has a housing, a first threaded member held by said housing such that said first threaded member is rotatable relative to said housing and is axially unmovable relative to said housing, and a second threaded member held by said housing such that said second threaded member is unrotatable relative to said housing and is axially movable relative to said housing,
wherein said first and second threaded members have respective first and second threaded portions that are held in thread engagement with each other,
and wherein said first threaded member is rotatable by said electric motor while said second threaded member provides said acting member, such that said acting member provided by said second threaded member is linearly moved when said first threaded member is rotated by said electric motor.

5. The parking brake system according to claim 2,
wherein said electric drive source has an electric motor such that said at least one acting member can be driven by said electric motor,
wherein said pressing device includes a maintaining mechanism that is configured, in absence of an electric current supplied to said electric motor, to maintain the pressing force which is applied to the selected one of said brake shoes and which forces said friction material member against said inner circumferential surface of said rotary drum serving as said friction surface,
wherein said pressing mechanism has a motion converting mechanism configured to convert a rotary motion that is to be given from said electric motor, into a linear motion that is to be given to said at least one acting member, and wherein said maintaining mechanism includes a worm that is to be rotated by said electric motor and a worm wheel which meshes with said worm and which is connected to said at least one acting member via said motion converting mechanism.

6. The parking brake system according to claim 1, for the vehicle having a drive power source from which a drive power is to be transmitted toward the wheel via a transmission with a plurality of shift positions including a parking position, wherein said parking-brake operating apparatus has at least one slope detector configured to detect a direction of slope of a road surface on which the vehicle is being stopped, and a shift-position detector configured to detect a currently selected one of the plurality of shift positions of the transmission during activation of the drive power source, and wherein said parking-brake operating apparatus further has a torque direction predictor configured to predict the torque application direction based on at least one of the direction of the slope of the road surface which is detected by said slope detector and the currently selected one of the shift positions which is detected by said shift-position detector.

7. The parking brake system according to claim 1, wherein said parking-brake operating apparatus is configured to move said primary one of said brake shoes in the direction away from said anchor member and to leave said secondary one of said brake shoes in contact with said anchor member, by controlling an electric actuator based on prediction of the torque application direction.

8. A parking brake system for a vehicle, comprising:
a non-rotary body;
a rotary drum rotatable together with a wheel of the vehicle, and having an inner circumferential surface that serves as a friction surface;
a pair of brake shoes disposed on an inner peripheral side of said rotary drum, and having respective outer circumferential surfaces on each of which a friction material member is disposed;
an anchor member fixed to said non-rotary body, and disposed between anchor-member-side end portions of the respective brake shoes, each of said anchor-member-side end portions being provided by one of opposite end portions of a corresponding one of said brake shoes;
a transmitting member interconnecting transmitting-member-side end portions of said respective brake shoes, each of said transmitting-member-side end portions being provided by the other of said opposite end portions of a corresponding one of said brake shoes, said transmitting member being configured, in presence of a force applied to one of said brake shoes and acting in a direction of circumference of said non-rotary body, to transmit the force from said one of said brake shoes to the other of said brake shoes; and
a parking-brake operating apparatus configured to predict a torque application direction in which a torque is to be applied to the wheel upon release of a service brake of the vehicle during stop of the vehicle, and to press said friction material of each of said brake shoes against said inner circumferential surface of said rotary drum, by moving a primary one of said brake shoes that serves as a primary shoe upon application of the torque to the wheel, in a direction away from said anchor member, without moving a secondary one of said brake shoes that serves as a secondary shoe upon application of the torque to the wheel, wherein said parking-brake operating apparatus is configured to press said friction material member of said brake shoes against said inner circumferential surface of said rotary drum, by moving said primary one of said brake shoes in the direction away from said anchor member, without moving said secondary one of said brake shoes, irrespective of whether the torque application direction corresponds to a forward rotation direction or a reverse rotation direction, so that said non-rotary body, said rotary drum, said brake shoes, said anchor member, said transmitting member and said parking-brake operating apparatus cooperate with each other to constitute a duo-servo drum brake, wherein said parking-brake operating apparatus has a pressing device disposed between said anchor-member-side end portions of said respective brake shoes, and wherein said pressing device includes an electric drive source, a pressing mechanism having at least one acting member which is capable of acting directly on said brake shoes such that a pressing force can be applied to a selected one of said brake shoes through a corresponding one of said at least one acting member that is to be driven by said electric drive source, and a pressing-force controller which is configured to make prediction of the torque application direction and to control said electric drive source based on the prediction of the torque application direction such that the pressing force is applied through said one of said at least one acting member to said primary one of said brake shoes as said selected one of said brake shoes.

9. The parking brake system according to claim 8,
wherein said electric drive source has an electric motor,
wherein said pressing mechanism has an acting member as said at least one acting member which is capable of acting directly on said brake shoes such that the pressing force can be applied to the selected one of said brake shoes through said acting member that is to be driven by said electric drive source, and a motion converting mechanism configured to convert a rotary motion that is to be given from said electric motor, into a linear motion that is to be given to said acting member, and wherein said pressing-force controller has a motor controlling portion configured to control a direction of rotation of said electric motor, for thereby controlling a direction of movement of said acting member.

10. The parking brake system according to claim 9,
wherein said motion converting mechanism has a housing, a first threaded member held by said housing such that said first threaded member is rotatable relative to said housing and is axially unmovable relative to said housing, and a second threaded member held by said housing such that said second threaded member is unrotatable relative to said housing and is axially movable relative to said housing, wherein said first and second threaded members have respective first and second threaded portions that are held in thread engagement with each other, and wherein said first threaded member is rotatable by said electric motor while said second threaded member provides said acting member, such that said acting member provided by said second threaded member is linearly moved when said first threaded member is rotated by said electric motor.

11. The parking brake system according to claim 8,
wherein said electric drive source has an electric motor such that said at least one acting member can be driven by said electric motor,
wherein said pressing device includes a maintaining mechanism that is configured, in absence of an electric current supplied to said electric motor, to maintain the pressing force which is applied to the selected one of said brake shoes and which forces said friction material member against said inner circumferential surface of said rotary drum serving as said friction surface,
wherein said pressing mechanism has a motion converting mechanism configured to convert a rotary motion that is to be given from said electric motor, into a linear motion that is to be given to said at least one acting member,
and wherein said maintaining mechanism includes a worm that is to be rotated by said electric motor and a worm wheel which meshes with said worm and which is connected to said at least one acting member via said motion converting mechanism.

12. A parking brake system for a vehicle, comprising:
a non-rotary body;
a rotary drum rotatable together with a wheel of the vehicle, and having an inner circumferential surface that serves as a friction surface;
a pair of brake shoes disposed on an inner peripheral side of said rotary drum, and having respective outer circumferential surfaces on each of which a friction material member is disposed;
an anchor member fixed to said non-rotary body, and disposed between anchor-member-side end portions of the respective brake shoes, each of said anchor-member-side end portions being provided by one of opposite end portions of a corresponding one of said brake shoes;
a transmitting member interconnecting transmitting-member-side end portions of said respective brake shoes, each of said transmitting-member-side end portions being provided by the other of said opposite end portions of a corresponding one of said brake shoes, said transmitting member being configured, in presence of a force applied to one of said brake shoes and acting in a direction of circumference of said non-rotary body, to transmit the force from said one of said brake shoes to the other of said brake shoes; and
a parking-brake operating apparatus configured to predict a torque application direction in which a torque is to be applied to the wheel upon release of a service brake of the vehicle during stop of the vehicle, and to press said friction material of each of said brake shoes against said inner circumferential surface of said rotary drum, by moving a primary one of said brake shoes that serves as a primary shoe upon application of the torque to the wheel, in a direction away from said anchor member, without moving a secondary one of said brake shoes that serves as a secondary shoe upon application of the torque to the wheel,
wherein said parking-brake operating apparatus is configured to move said primary one of said brake shoes in the direction away from said anchor member and to leave said secondary one of said brake shoes in contact with said anchor member, by controlling an electric actuator based on prediction of the torque application direction.

* * * * *